US010887610B2

(12) United States Patent
Keinert et al.

(10) Patent No.: US 10,887,610 B2
(45) Date of Patent: Jan. 5, 2021

(54) TRANSFORM BLOCK CODING

(71) Applicant: Fraunholder-Gesellschaft zur Foerderung der angewandten Forschung e.V., Munich (DE)

(72) Inventors: Joachim Keinert, Erlangen (DE); Thomas Richter, Erlangen (DE); Herbert Thoma, Erlangen (DE); Christian Scherl, Erlangen (DE); Manuel De Frutos López, Erlangen (DE); Siegfried Foessel, Erlangen (DE); Wolfgang Heppner, Erlangen (DE); Miguel Ángel Martínez Del Amor, Erlangen (DE); Sergej Wtjurin, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/360,634

(22) Filed: Mar. 21, 2019

(65) Prior Publication Data

US 2019/0222853 A1 Jul. 18, 2019

Related U.S. Application Data

(63) Continuation of application No. PCT/EP2016/074730, filed on Oct. 14, 2016.

(30) Foreign Application Priority Data

Sep. 23, 2016 (EP) .................................... 16190491

(51) Int. Cl.
*H04N 7/18* (2006.01)
*H04N 19/18* (2014.01)
(Continued)

(52) U.S. Cl.
CPC ........... *H04N 19/18* (2014.11); *H04N 19/129* (2014.11); *H04N 19/156* (2014.11);
(Continued)

(58) Field of Classification Search
CPC .... H04N 19/18; H04N 19/184; H04N 19/645; H04N 19/647; H04N 19/129; H04N 19/156; H04N 19/176; H04N 19/463
(Continued)

(56) References Cited

U.S. PATENT DOCUMENTS 6,546,674 B1    4/2003    Emerling et al.
9,332,258 B2    5/2016    Pellegrin et al.
(Continued)

FOREIGN PATENT DOCUMENTS

EP          2773122 A1    9/2014
WO    2010091930 A2    8/2010
(Continued)

OTHER PUBLICATIONS

Ambroise, Renaud et al., "Method and Device for Display Stream Compression", U.S. Pat. No. 9,332,258 B2, May 3, 2016, Equivalent to U.S. Pat. No. 9,332,258.
(Continued)

*Primary Examiner* — Shan E Elahi
(74) *Attorney, Agent, or Firm* — Perkins Coie LLP; Michael A. Glenn

(57) ABSTRACT

Transform block coding is performed very efficiently in terms of computational complexity and compression ratio, by coding the magnitude bits of the transform coefficients distributed in a matrix, in which the magnitude bits of the spectral coefficients are arranged column-wise with the spectral coefficients of the transform block ordered along a row direction of the matrix. That is, magnitude bits within a certain column of the matrix belong to a certain spectral
(Continued)

coefficient, while magnitude bits within a certain row of the matrix belong to a certain bit plane. In this configuration, the distribution of non-zero magnitude bits may be condensed towards one corner of the matrix, corresponding to, for instance, the least significant bit plane and corresponding to, by using a scan order among the transform coefficients which sorts the transform coefficients generally in a manner from lowest to highest frequency, the lowest frequency. Various low complexity variants are presented.

11 Claims, 42 Drawing Sheets

(51) Int. Cl.
*H04N 19/184* (2014.01)
*H04N 19/645* (2014.01)
*H04N 19/64* (2014.01)
*H04N 19/129* (2014.01)
*H04N 19/156* (2014.01)
*H04N 19/176* (2014.01)
*H04N 19/463* (2014.01)

(52) U.S. Cl.
CPC ......... *H04N 19/176* (2014.11); *H04N 19/184* (2014.11); *H04N 19/463* (2014.11); *H04N 19/645* (2014.11); *H04N 19/647* (2014.11)

(58) Field of Classification Search
USPC .................................................. 375/240.02
See application file for complete search history.

(56) References Cited

U.S. PATENT DOCUMENTS

| | | | |
|---|---|---|---|
| 2009/0304273 | A1 | 12/2009 | Fukuhara |
| 2010/0329342 | A1* | 12/2010 | Joshi ............... H04N 19/105 375/240.16 |
| 2012/0057788 | A1 | 3/2012 | Fukuhara et al. |
| 2014/0247999 | A1 | 9/2014 | Pellegrin et al. |
| 2015/0016537 | A1* | 1/2015 | Karczewicz ........... H04N 19/91 375/240.18 |
| 2018/0286075 | A1* | 10/2018 | Jones ..................... G06T 7/13 |

FOREIGN PATENT DOCUMENTS

| | | |
|---|---|---|
| WO | 2018041379 A1 | 3/2018 |
| WO | 2018041840 A1 | 3/2018 |
| WO | 2018041843 A1 | 3/2018 |

OTHER PUBLICATIONS

Elias, Peter, "Universal Codeword Sets and Representations of the Integers", IEEE Transactions on Information Theory. 21 (2): 194—203. doi:10.1109/tit.1975.1055349, Mar. 1975.

Keinert, Joachim, "Low complexity entropy coder for image/video coding", WO 2018041379 A1, WO 2018041840 A1, WO 2018041843 A1, Mar. 8, 2018, Equivalent to WO2018041379, WO2018041840, WO2018041843.

Renaud, Ambroise, "Method and Device for display stream compression", EP 2773122 A1, Mar. 9, 2014, Equivalent to EP2773122.

Richter, Thomas et al., "Coding Strategies and Performance Analysis of", 2013 Picture Coding Symposium (PCS), Dec. 8-12, 2013, Dec. 2013.

Richter, Thomas et al., "Comparison of CPU and GPU Based Coding on", Proc. SPIE 8856, Applications of Digital Image Processing XXXVI, Sep. 2013, Sep. 2013.

Golomb, Solomon W., "Run-Length Encodings", IEEE Transactions on Information Theory IT-12 (3). 1966, pp. 399-401, 1966, 399-401.

Huffman, David A., "A method for the construction of minimum-redundancy codes", Proceedings of the I.R.E., vol. 40, Issue 9, Sep. 1952, 1098-1101.

Kojima, Toshiaki, "LLVC—Low Latency VIdeo Codec for Network Transfer", SMPTE RDD 34:2015, 2015, 1-32.

Lorent, Jean-Baptiste, "TICO Lightweight Codec Used in IP Networked or in SDI Infrastructure", SMPTE RDD 35:2016, 2016, 1-53.

Pennebaker, W B. et al., "An overview of the basic principles of the Q-Coder adaptive binary arithmetic coder", IBM. J. Res. Develop, vol. 32, No. 6, Nov. 1988, 717-726.

Xilinx, "7 Series FBGAs Data Sheet: Overview", http://www.xilinx.com/support/documentation/data_sheets/ds180_7Series_Overview.pdf, accessed Oct. 8, 2014, Feb. 27, 2018, 1-18.

\* cited by examiner

| frequency | $f_0$ | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ |
|---|---|---|---|---|---|---|---|---|---|---|---|---|---|---|---|---|
| sign | X | X | X | X | X | X | X | X | X | X | X | X | X | X | X | X |
| bit n-1 (MSB) | 0 | 0 | 0 | 0 | 0 | 0 | 0 | 0 | 0 | 0 | 0 | 0 | 0 | 0 | 0 | 0 |
| bit n-2 | 0 | 0 | 0 | 0 | 0 | 0 | 0 | 0 | 0 | 0 | 0 | 0 | 0 | 0 | 0 | 0 |
| bit n-3 | 0 | 0 | 0 | 0 | 1 | 0 | 0 | 0 | 0 | 0 | 0 | 0 | 0 | 0 | 0 | 0 |
| ⋮ | 0 | 0 | 0 | 0 | X | 0 | 1 | 0 | 0 | 1 | 0 | 0 | 0 | 0 | 0 | 0 |
| ⋮ | 0 | 0 | 0 | 0 | X | 0 | X | 0 | 0 | X | 0 | 0 | 0 | 0 | 0 | 0 |
| ⋮ | 0 | 0 | 0 | 0 | X | 1 | X | 0 | 0 | X | 0 | 0 | 0 | 0 | 0 | 0 |
| ⋮ | 1 | 0 | 0 | 0 | X | X | X | 0 | 1 | X | 1 | 0 | 0 | 0 | 0 | 0 |
| bit 2 | X | 0 | 0 | 0 | X | X | X | 1 | X | X | X | 1 | 1 | 0 | 0 | 0 |
| bit 1 | X | 1 | 0 | 0 | X | X | X | X | X | X | X | X | X | 0 | 0 | 0 |
| bit 0 (LSB) | X | X | 0 | 0 | X | X | X | X | X | X | X | X | X | 0 | 0 | 0 |

Fig. 1

| frequency | $f_0$ | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ |
|---|---|---|---|---|---|---|---|---|---|---|---|---|---|---|---|---|
| sign | x | x | x | x | x | x | x | x | x | x | x | x | x | x | x | x |
| bit n−1 (MSB) | 0 | 0 | 0 | 0 | 0 | 0 | 0 | 0 | 0 | 0 | 0 | 0 | 0 | 0 | 0 | 0 |
| bit n−2 | 1 | | | | | | | | | | | | | | | |
| bit n−3 | x | | | | | | | | | | | | | | | |
| ... | x | | | | | | | | | | | | | | | |
| bit 8 | x | 0 | 0 | 0 | 0 | 0 | 0 | 0 | 0 | 0 | 0 | 0 | 0 | 0 | 0 | 0 |
| bit 7 | x | 0 | 0 | 0 | 0 | 0 | 0 | 0 | 0 | 0 | 0 | 0 | 0 | 0 | 0 | 0 |
| bit 6 | x | 0 | 0 | 0 | 1 | 0 | 1 | 0 | 0 | 1 | 0 | 0 | 0 | 0 | 0 | 0 |
| bit 5 | x | 0 | 0 | 0 | x | 0 | x | 0 | 0 | x | 0 | 0 | 0 | 0 | 0 | 0 |
| bit 4 | x | 0 | 0 | 0 | x | 1 | x | 0 | 0 | x | 0 | 0 | 0 | 0 | 0 | 0 |
| bit 3 | x | 0 | 0 | 0 | x | x | x | 0 | 1 | x | 1 | 0 | 0 | 0 | 0 | 0 |
| bit 2 | x | 0 | 0 | 0 | x | x | x | 1 | x | x | x | 1 | 1 | 0 | 0 | 0 |
| bit 1 | x | 1 | 0 | 0 | x | x | x | x | x | x | x | x | x | 0 | 0 | 0 |
| bit 0 (LSB) | x | x | 0 | 0 | x | x | x | x | x | x | x | x | x | 0 | 0 | 0 |

Fig. 9

```
Tail_pos[][] = -1; // For all blocks and components
For all significant bitplanes p
    Run_mode[][] = 0; // For all blocks and components
    Block_component_done[][] = 0; // For all blocks and components
    Frequency_loop: For all frequencies f
        For all components c
            For all blocks b If (no bits left)
                    Exit all loops;
                End if If Block_component_done[c][b] == 1
     A ⇒          {    // All frequencies are encoded
                       Continue; // block loop
                End If If coeff[c][b][f] significant
     B ⇒          {    assert(f < tail_pos[c][b]);
                       Output bitplane(p,coeff[c][b][f])
                Elif f < tail_pos[c][b]
                      // Highly probably that coefficient gets
                      // significant, since surrounding coefficients
                      // are larger
                      If bitplane(p,coeff[c][b][f]) == 0
                          Output 0
     C ⇒         {    Else
                          // Coefficient gets significant
                          Output 1
                          Output sign(coeff[c][b][f])
                      End If
                Elif run_mode[c][b] == 1
```

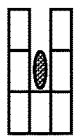

Fig. 10A

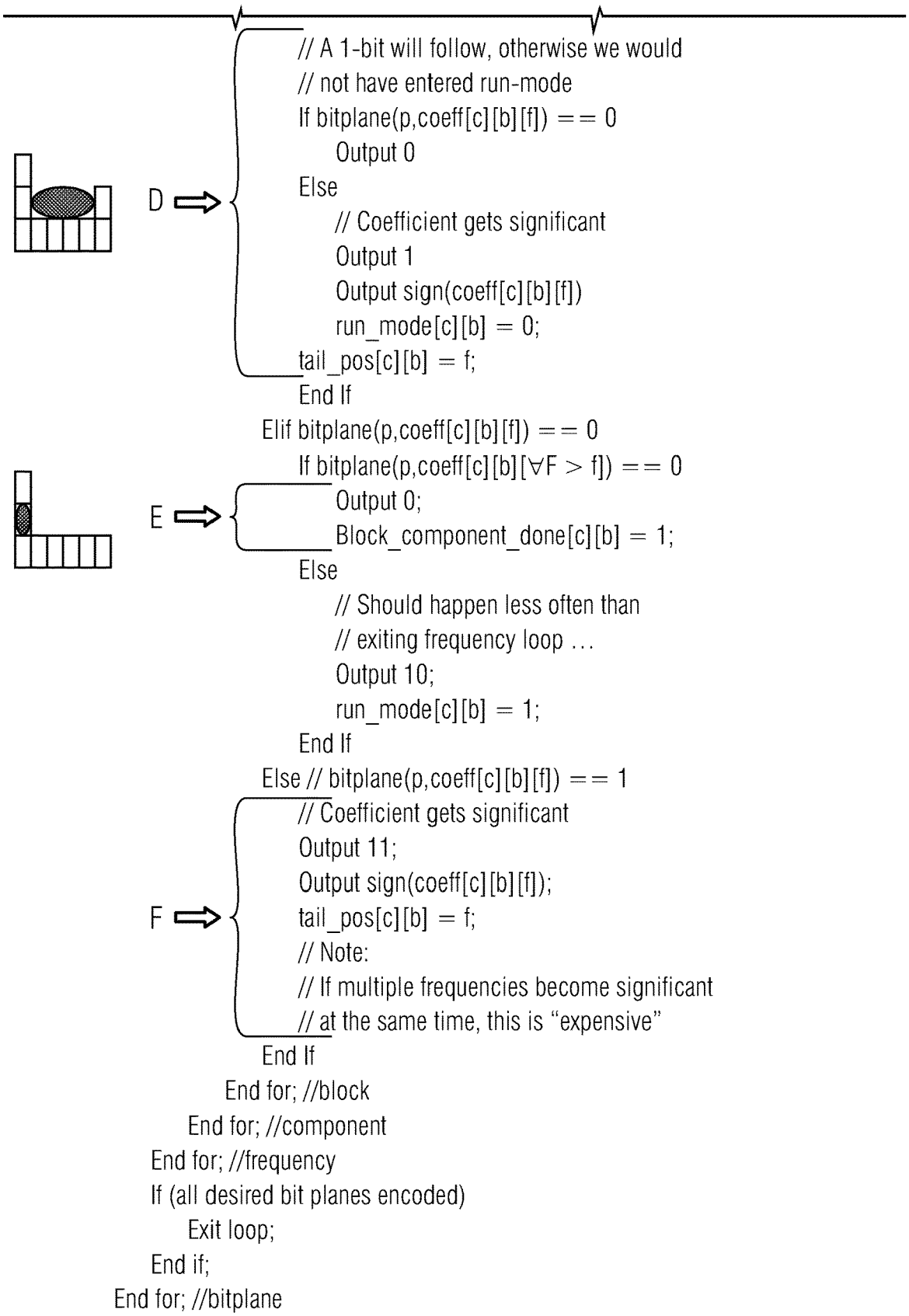

```
                  // A 1-bit will follow, otherwise we would
                  // not have entered run-mode
                  If bitplane(p,coeff[c][b][f]) == 0
                      Output 0
          D ⇒      Else
                      // Coefficient gets significant
                      Output 1
                      Output sign(coeff[c][b][f])
                      run_mode[c][b] = 0;
                      tail_pos[c][b] = f;
                  End If
              Elif bitplane(p,coeff[c][b][f]) == 0
                  If bitplane(p,coeff[c][b][∀F > f]) == 0
          E ⇒          Output 0;
                      Block_component_done[c][b] = 1;
                  Else
                      // Should happen less often than
                      // exiting frequency loop ...
                      Output 10;
                      run_mode[c][b] = 1;
                  End If
              Else // bitplane(p,coeff[c][b][f]) == 1
                  // Coefficient gets significant
                  Output 11;
                  Output sign(coeff[c][b][f]);
          F ⇒     tail_pos[c][b] = f;
                  // Note:
                  // If multiple frequencies become significant
                  // at the same time, this is "expensive"
              End If
            End for; //block
          End for; //component
        End for; //frequency
        If (all desired bit planes encoded)
            Exit loop;
        End if;
      End for; //bitplane
```

Fig. 10B

```
// encode profile/"hull" of data
last_bp = maxNumACBitplanes-1;

if (bitbudget>0)
    bitplane_loop: for bitlane bp = maxNumACBitplanes-1 downto 0 && (bitbudget > 0)
        frequency_loop: for all frequencies f && (bitbudget>0)
            for all blocks b in current working group && (bitbudget > 0)
                //Encode all frequencies whose MSB is in bitplane bp
                if (f <= tailPos[b])
                    // Frequency has already been encoded in a previous bitplane
                    Continue;
                end if;

If (f == maxFreq[b][bp]+1)
                    // bitplane is finished. Send EOP (End of profile)
                    Output('0');
                    bitbudget -= 1;
                    continue;
                else if (f > maxFreq[b][bp]+1)
                    // Nothing to do in this bitplane
                    continue;
                end if;

bitmask = (1 << bp);
                if (zeroRun[b])
                    // Currently in run mode
                    if (coeff[b][f] & bitmask)
                        // end of run
                        // Encode number of zeros (which is sizeOfRun[c][b])

// Terminate run
                        Output('1')
                        bitbudget -= 1;

If (bitbudget >= 1)
                            // Include the size of sign coding
```

Fig. 11A

```
                    Output(sign(coeff[b][f]))
                    bitbudget -= 1;

// Only increment the coded frequency
                    // we sufficient space for sign bit
                    tailPos[b] = f;
                End if;
                zeroRun[b] = 0;
            else
                // Continue run
                Output('0');
                bitbudget--;

If (bitbudget >= 1)
                    // Include the size of sign coding
                    Output(sign(coeff[b][f]))
                    bitbudget -= 1;
                end if
            end if;
        else if (coeff[b][f] & bitmask)
            // Output a single significant coefficient
            If (bitbudget >= 2)
                Output('11');
                bitbudget-=2;
                If (bitbudget >= 1)
                    // take sign bit into considation
                    bitbudget-=1;
                    Output(sign(coeff[b][f]))
                    // Only increase coded frequency,
                    // if enough space for sign bit
                    tailPos[b] = f;
                end if;
            else
                //We can only encode an EOF
                Output('0');
                Bitbudget = 0;
```

Fig. 11B

```
            end if;
        else
            // Enter run mode
            zeroRun[b] = 1;

// It is important, that we start the run right here
            // otherwise the decoder will read the wrong bits
            If (bitbudget >= 2)
                Output('10');
                Bitbudget -= 2;
                If (Bitbudget >= 1)
                    Output(sign(coeff[b][f]))
                    Bitbudget -= 1;
                End if
            Else
                // Can only send end of block
                Output('0');
                bitbudget--;
            End if;
        end if;
    end for; // blocks
end for; // frequencies // We are moving to a new bitplane
// We need to allocate data for refinement bitplanes
bitbudgetBeforeRefinement = bitbudget;
if (bitbudget > 0) && (bp>1)
    last_bp = bp-1;
    for all components c
        for all blocks b in current working group
            // tailPos starts counting with zero
            bitbudget -= (tailPos[b]+1);
        end for; //blocks
    end for; //components
end if;
```

Fig. 11C

```
          ─────────────∨─────────────  ─────────∨─────────
              end for // bitplanes;

// output data
          // Only some blocks can be refined till bitplane last_bp
          // The other ones have to stop one bitplane earlier.
          // Use a simple first-come-first-served method for distributing
          // the bits to the different blocks
          for all blocks b in current working group
              currentBitplane = maxNumACBitplanes-1;
              for all frequencies f <= tailPos[b]
                  while(f > maxFreq[b][currentBitplane])
                      currentBitplane--;
                      assert(currentBitplane >= 0);
                  end
                  // The MSB has already been transmitted ...
                  If (currentBitplane > 0)
                      bit_mask = 1 << (currentBitplane-1);
                      bit_mask -= 1;
                      coeffValue = coeff[b][f] & bit_mask;
                      coeffValue >>= last_bp;
                      Output(coeffValue, currentBitplane-1-last_bp bits);
                  End if;

// The coefficient consumed an extra bit
                  if (bitbudgetBeforeRefinement > 1)
                      bitbudgetBeforeRefinement--;
                  else if (bitbudgetBeforeRefinement == 1)
                      bitbudgetBeforeRefinement--;
                      last_bp++;
                  end if;
              end for; //frequencies
          end for; //blocks
      end if
```

Fig. 11D

```
// decode profile/"hull" of data
last_bp = maxNumACBitplanes-1;

bitplane_loop: for bitlane bp = maxNumACBitplanes-1 downto 0 && (bitbudget > 0)
    frequency_loop: for all frequencies f && (bitbudget>0)
        for all blocks b in current working group && (bitbudget > 0)
            //Encode all frequencies whose MSB is in bitplane bp
            if (f <= tailPos[b])
                // Frequency has already been encoded in a previous bitplane
                Continue;
            end if;

If peekBits(1) == 0
                // bitplane is finished.
                readBits(1);
                bitbudget -= 1;
                continue;
            end if;

maxFreq[b][bp] = f;
            tailPos[b] = f;
            abs(coeff[b][f]) = 0;

bitmask = (1 << bp);
            if (zeroRun[b])
                // Currently in run mode
                if (readBits(1) == '1')
                    // end of run
                    bitbudget -= 1;

If (bitbudget >= 1)
                        // Include the size of sign coding
                        bitbudget -= 1
                        abs(coeff[b][f]) = bitmask;
                        sign(coeff[b][f]) = readBits(1)
                    End if;
                    zeroRun[b] = 0;
                else
```

Fig. 12A

```
                bitbudget--;
                If (bitbudget >= 1)
                    // Include the size of sign coding
                    sign(coeff[b][f]) = readBits(1);
                    bitbudget -= 1;
                end if
            end if;
        else if peekBits(2) == '11'
            // Output a single significant coefficient
            bitbudget-=2;
            If (bitbudget >= 1)
                // take sign bit into considation
                bitbudget-=1;
                sign(coeff[b][f]) = readBits(1);
                abs(coeff[b][f]) = bitmask;
            end if;
        else
            // Enter run mode
            zeroRun[b] = 1;
            bitbudget-=2;

// It is important, that we start the run right here
            // otherwise the decoder will read the wrong bits
            If (Bitbudget >= 1)
                sign(coeff[b][f]) = readBits(1);
                Bitbudget -= 1;
            End if;
        end if;
    end for; // blocks
end for; // frequencies // We are moving to a new bitplane
// We need to allocate data for refinement bitplanes
bitbudgetBeforeRefinement = bitbudget;
if (bitbudget > 0) && (bp>1)
    last_bp = bp-1;
    for all components c
        for all blocks b in current working group
```

Fig. 12B

```
            // tailPos starts counting with zero
            bitbudget -= (tailPos[b]+1);
        end for; //blocks
    end for; //components
  end if;
end for // bitplanes;

// read data
// Only some blocks can be refined till bitplane last_bp
// The other ones have to stop one bitplane earlier.
// Use a simple first-come-first-served method for distributing
// the bits to the different blocks
for all blocks b in current working group
    currentBitplane = maxNumACBitplanes-1;
    for all frequencies f <= tailPos[b]
        while(f > maxFreq[b][currentBitplane])
            currentBitplane--;
            assert(currentBitplane >= 0);
        end
        // The MSB is already set
        If (currentBitplane > 0)
            coeffValue = readBits(currentBitplane-1-last_bp);
            coeffValue <<= last_bp;
            abs(coeff[b][f] |= coeffValue);
        End if;

// The coefficient consumed an extra bit
        if (bitbudgetBeforeRefinement > 1)
            bitbudgetBeforeRefinement--;
        else if (bitbudgetBeforeRefinement == 1)
            bitbudgetBeforeRefinement--;
            last_bp++;
        end if;
    end for; //frequencies
end for; //blocks
```

Fig. 12C

```
currentProfileBitplane[][] = {#bitplanes-1};

if (remainingExtraBits) && (lsbNumber > 0)
    // The first couple of coefficients will use one additional bit plane
    lsbNumber--;
end if;

frequency_loop: for all frequencies f
    for all components c
        for all blocks b in current working group if (blockFinished[c][b]) continue;

// Encoding the profile
            while (f == maxFreq[c][b][currentProfileBitPlane[c][b]]+1)
                // bitplane is finished. Send EOP (End of profile)
                Output('0');
                currentProfileBitplane[c][b]--;
                if (currentProfileBitplane[c][b] < lsbNumber)
                    if (remainingExtraBits)
                        // we have just consumed one of the extra bits
                        remainingExtraBits --;
                        if (remainingExtraBits == 0) lsbNumber++;
                    end if;
                    blockFinished[c][b] = 1;
                    exit while loop;
                end if;
            end while;

if (blockFinished[c][b]) continue;

profileBitmask = (1 << currentProfileBitplane[c][b]);
            if (zeroRun[c][b])
                // We are in the run mode
                if (abs(coeff[c][b][f]) & profileBitmask)
                    // Terminate run
                    Output('1')
                    zeroRun[c][b] = 0;
```

Fig. 14A

```
            else
                // Continue run
                Output('0');
            end if;
            // Note: that bits that we have output might have been
            //       extra bits.
            //       This is taken into account when refining the bit
        else if (abs(coeff[c][b][f]) & profileBitmask)
            // Output a single significant coefficient
            if (remainingExtraBits) &&
                  (currentProfileBitplane[c][b] == lsbNumber)
                // We need to output at least two extra bits
                If (remainingExtraBits > 1)
                    Output('11');
                    remainingExtraBits -= 1;
                    // The other extra bit is taken into account
                    // when doing the refinement
                else
                    // Output EOP
                    Output('0');
                    blockFinished[c][b] = 1;
                    remainingExtraBits = 0;
                    lsbNumber++;
                    // Do not enter the refinement section, since we haven't
                    // any space left
                    continue;
                End if;
            Else
                Output('11');
            end if;
        else
            // Enter run mode
            if (remainingExtraBits) &&
                  (currentProfileBitplane[c][b] == lsbNumber)
                // We will output at least two extra bits
                If (remainingExtraBits > 1)
                    Output('10');
                    zeroRun[c][b] = 1;
```

Fig. 14B

```
                    remainingExtraBits -= 1;
                    // The other extra bit is taken into account
                    // when doing the refinement
                else
                    // Output EOP
                    Output('0');
                    blockFinished[c][b] = 1;
                    remainingExtraBits = 0;
                    lsbNumber++;
                    // Do not enter the refinement section, since we haven't
                    // any space left
                    continue;
                End if;
            Else
                Output('10');
                zeroRun[c][b] = 1;
            end if;
        end if;

// Encoding the coefficient value including the sign bit, if necessary
        // Get the necessary data bits
        coeffValue = abs(coeff[c][b][f]);
        coeffValue = coeffValue >> lsbNumber;

// Check, whether we need a sign bit
        if (coeffValue)
            signBitNecessary = 1;
        else
            signBitNecessary = 0;
        end // Strip MSB (since already transmitted)
```

Fig. 14C

```
                    coeffValueStripped = coeffValue & ~profileBitmask;

// Output the relevant data bits
                    Output(coeffValueStripped,currentProfileBitplane[c][b]-lsbNumber);

if (remainingExtraBits)
                        // We have added one bit plane more
                        remainingExtraBits--;
                        if (remainingExtraBits == 0) lsbNumber++;
                    end if;

if (coeffValue >> 1) == 0
                        // Sign bit also consumes an extra bit
                        If (remainingExtraBits)
                            remainingExtraBits--;
                            if (remainingExtraBits == 0) lsbNumber++;
                        else
                            // No possibility to output sign bit
                            signBitNecessary = 0;
                        end if
                    end if if (signBitNecessary)
                        Output(sign(coeff[c][b][f]));
                    End if;

end for; // blocks
        end for; // components
    end for; // frequencies if (remainingExtraBits)
        // Padding (or attribute it the the next work group)
    End if;
```

Fig. 14D

```
//coeff[][][] = {0};
currentProfileBitplane[][] = {#bitplanes-1};

if (remainingExtraBits) && (lsbNumber > 0)
    // The first couple of coefficients will use one additional bit plane
    lsbNumber--;
end if;

frequency_loop: for all frequencies f
    for all components c
        for all blocks b in current working group if (blockFinished[c][b]) continue;

// Decoding the profile
            while (peekBits(1) == '0')
                // Received EOP (End of profile)
                // bitplane is finished
                currentProfileBitplane[c][b]--;
                readBits(1); // consume bit
                if (currentProfileBitplane[c][b] < lsbNumber)
                    if (remainingExtraBits)
                        // we have just consumed one of the extra bits
                        remainingExtraBits --;
                        if (remainingExtraBits == 0) lsbNumber++;
                    end if;
                    blockFinished[c][b] = 1;
                    break;
                end if;
            end while;

if (blockFinished[c][b]) continue;

profileBitmask = (1 << currentProfileBitplane[c][b]);
            if (zeroRun[c][b])
                // We are in the run mode
                If (peekBits(1) == '1')
```

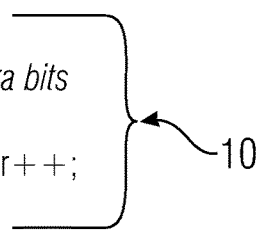

Fig. 15A

```
            // Terminate run
            coeff[c][b][f] = profileBitmask;
            zeroRun[c][b] = 0;
        else
            // Continue run
            coeff[c][b][f] = 0;
        end if;
        readBits(1);

else if (peekBits(2) == '11')
        // Read a single significant coefficient
        if (remainingExtraBits) &&
            (currentProfileBitplane[c][b] == lsbNumber)
            // We nead to read at least two extra bits
            assert(remainingExtraBits > 1)
            readBits(2);
            remainingExtraBits -= 1;
            // The other extra bit is taken into account
            // when doing the refinement
        end if;
        readBits(2);
        coeff[c][b][f] = profileBitmask;
    else
        // Enter run mode
        Assert(peekBits(2) = '10');
        if (remainingExtraBits) &&
            (currentProfileBitplane[c][b] == lsbNumber)
            // We will consume two extra bits
            assert(remainingExtraBits > 1)
            remainingExtraBits -= 1;
            // The other extra bit is taken into account
            // when doing the refinement
        end if;
        zeroRun[c][b] = 1;
        readBits(2);
    end if;
```

Fig. 15B

```
// Decode the coefficient value including the sign bit, if necessary
// Get the necessary data bits
coeffValue = readBits(currentProfileBitplane[c][b]-lsbNumber);
coeffValue = coeffValue << lsbNumber;

// Add MSB
coeffValue = coeffValue | coeff[c][b][f];

// Check, whether we need a sign bit
if (coeffValue)
    signBitNecessary = 1;
else
    signBitNecessary = 0;
end
```

10 {
```
if (remainingExtraBits)
    // We have added one bit plane more
    remainingExtraBits--;
    if (remainingExtraBits == 0) lsbNumber++;
end if;

if (coeffValue >> 1) == 0
    // Sign bit also consumes an extra bit
    If (remainingExtraBits)
```

Fig. 15C

```
                    remainingExtraBits--;
                    if (remainingExtraBits == 0) lsbNumber++;
             else
10           // No possibility to read sign bit
                    signBitNecessary = 0;
                    coeffValue = 0;
             end if
       end if // do rounding
       If (coeffValue) && (lsbNumber > 0)
            coeffValue += 1 << (lsbNumber-1);
       end if;

if (signBitNecessary)
            if (readBits(1)) coeffValue*= -1;
       End if;

coeff[c][b][f] = coeffValue;

end for; // blocks
    end for; // components
 end for; // frequencies

ReadPaddingData();
```

Fig. 15D

```
currentProfileBitplane[][] = {#bitplanes-1};

lsbNumberOrig = lsbNumber;
if (remainingExtraBits) && (lsbNumber > 0)
    // The first couple of coefficients will use one additional bit plane
    /lsbNumber--;
end if;

frequency_loop: for all frequencies f
    for all components c
        for all blocks b in current working group if (blockFinished[c][b]) continue;

// Encoding the profile
            while (f == maxFreq[c][b][currentProfileBitPlane[c][b]]+1)
                // bitplane is finished. Send EOP (End of profile)
                Output('0');
                currentProfileBitplane[c][b]--;
                if (currentProfileBitplane[c][b] < lsbNumberOrig)
                    blockFinished[c][b] = 1;
                    exit while loop;
                end if;
            end while;

if (blockFinished[c][b]) continue;

profileBitmask = (1 << currentProfileBitplane[c][b]);
            if (zeroRun[c][b])
                // We are in the run mode
                if (abs(coeff[c][b][f]) & profileBitmask)
                    // Terminate run
                    Output('1')
                    zeroRun[c][b] = 0;
                else
                    // Continue run
                    Output('0');
                end if;
```

Fig. 16A

```
            // Note: that bits that we have output might have been
            //       extra bits.
            //       This is taken into account when refining the bit
        else if (abs(coeff[c][b][f]) & profileBitmask)
            // Output a single significant coefficient
            Output('11');
        else
            // Enter run mode
            Output('10');
            zeroRun[c][b] = 1;
        end if;

// Encoding the coefficient value including the sign bit, if necessary
        // Get the necessary data bits
        coeffValue = abs(coeff[c][b][f]);
        coeffValue = coeffValue >> lsbNumber;

// Check, whether we need a sign bit
        if (coeffValue)
            signBitNecessary = 1;
        else
            signBitNecessary = 0;
        end // Strip MSB (since already transmitted)
        coeffValueStripped = coeffValue & ~profileBitmask;

// Output the relevant data bits
        Output(coeffValueStripped,currentProfileBitplane[c][b]-lsbNumber);

if (remainingExtraBits)
            // We have added one bit plane more
  10 {       remainingExtraBits--;
            if (remainingExtraBits == 0) lsbNumber++;
        end if;

if (coeffValue >> 1) == 0
```

Fig. 16B

```
                    // Sign bit also consumes an extra bit
                    If (remainingExtraBits)
                        remainingExtraBits--;
                        if (remainingExtraBits == 0) lsbNumber++;
    10              else
                        // No possibility to output sign bit
                        signBitNecessary = 0;
                    end if
                end if if (signBitNecessary)
                    Output(sign(coeff[c][b][f]));
                End if;

end for; // blocks
        end for; // components
    end for; // frequencies if (remainingExtraBits)
        // Padding (or attribute it the the next work group)
    End if;
```

Fig. 16C

```
//coeff[][][] = {0};
currentProfileBitplane[][] = {#bitplanes-1};

lsbNumberOrig = lsbNumber;
if (remainingExtraBits) && (lsbNumber > 0)
    // The first couple of coefficients will use one additional bit plane
    lsbNumber--;
end if;

frequency_loop: for all frequencies f
    for all components c
        for all blocks b in current working group if (blockFinished[c][b]) continue;

// Decoding the profile
            while (peekBits(1) == '0')
                // Received EOP (End of profile)
                // bitplane is finished
                currentProfileBitplane[c][b]--;
                readBits(1); // consume bit
                if (currentProfileBitplane[c][b] < lsbNumberOrig)
                    blockFinished[c][b] = 1;
                    break;
                end if;
            end while;

if (blockFinished[c][b]) continue;

profileBitmask = (1 << currentProfileBitplane[c][b]);
            if (zeroRun[c][b])
                // We are in the run mode
                If (peekBits(1) == '1')
                    // Terminate run
                    coeff[c][b][f] = profileBitmask;
                    zeroRun[c][b] = 0;
                else
```

Fig. 17A

```
            // Continue run
            coeff[c][b][f] = 0;
        end if;
        readBits(1);

else if (peekBits(2) == '11')
        // Read a single significant coefficient
        readBits(2);
        coeff[c][b][f] = profileBitmask;
    else
        // Enter run mode
        Assert(peekBits(2) = '10');
        zeroRun[c][b] = 1;
        readBits(2);
    end if;

// Decode the coefficient value including the sign bit, if necessary
    // Get the necessary data bits
    coeffValue = readBits(currentProfileBitplane[c][b]-lsbNumber);
    coeffValue = coeffValue << lsbNumber;

// Add MSB
    coeffValue = coeffValue | coeff[c][b][f];

// Check, whether we need a sign bit
    if (coeffValue)
        signBitNecessary = 1;
    else
        signBitNecessary = 0;
    end if (remainingExtraBits)
        // We have added one bit plane more
        remainingExtraBits--;
        if (remainingExtraBits == 0) lsbNumber++;
    end if;
```

Fig. 17B

```
            if (coeffValue >> 1) == 0
                // Sign bit also consumes an extra bit
                If (remainingExtraBits)
                    remainingExtraBits--;
                    if (remainingExtraBits == 0) lsbNumber++;
                else
                    // No possibility to read sign bit
                    signBitNecessary = 0;
                    coeffValue = 0;
                end if
            end if // do rounding
            If (coeffValue) && (lsbNumber > 0)
                coeffValue += 1 << (lsbNumber-1);
            end if;

if (signBitNecessary)
                if (readBits(1)) coeffValue*= -1;
            End if;

coeff[c][b][f] = coeffValue;

end for; // blocks
    end for; // components
end for; // frequencies

ReadPaddingData();
```

Fig. 17C

TRANSFORM BLOCK CODING

CROSS-REFERENCE TO RELATED APPLICATIONS

This application is a continuation of copending International Application No. PCT/EP2016/074730, filed Oct. 14, 2016, which is incorporated herein by reference in its entirety, and additionally claims priority from European Application No. 16190491.7, filed Sep. 23, 2016, which is also incorporated herein by reference in its entirety.

BACKGROUND OF THE INVENTION

The present application is concerned with transform block coding as applicable, for instance, in image and video coding.

Entropy coding is a crucial step in every compression algorithm. By using variable length code words, it eliminates redundancy contained in a sequence of symbols, such that the data can be represented with less bits per symbol compared to a fixed length code word representation without introducing any losses.

Once the probability distribution of a symbol source is known, generation of a nearly optimal code word representation is a solved problem. However, such implementations come along with a complexity that is too large for applications like mezzanine compression in video over IP applications.

In the following, let us consider a compression of two-dimensional images that have been processed with a frequency transform as illustrated in FIG. 28. The output of the frequency transform consists of $n_c$ arrays of coefficients, whereas $n_c$ is the number of color components. The size of the coefficient array equals the size of the input image plus some possible padding rows or columns.

The coefficients resulting from the frequency transform are arranged in blocks of a given width and height and those blocks of coefficients are entropy encoded. Each block contains coefficients belonging to different frequencies. In case of a 2D-DCT (discrete cosine transform), block building is trivial, since the output of the 2D-DCT is already a block of coefficients belonging to different horizontal and vertical frequencies. In case of a wavelet transform, a block groups a different number of coefficients from different subbands as illustrated in FIG. 29.

Such a block is then entropy coded for a more efficient representation without information theoretical redundancy. Since the result needs to obey rate and latency constraints, a rate control allocates an admissible bit budget to each block. The entropy coder then tries to include as many bit planes as possible for each block, given the rate constraint, while starting with the most significant bit plane (MSB).

Entropy coding is a very well-studied field of research having brought up many different solutions, such as Huffman coding [9], Arithmetic coding or binary arithmetic coding [10]. All of them have in common to rely on constant or even dynamic image statistics and are hence very complex to implement in hardware like FPGAs.

Other algorithms like Golomb [11], Elias-Delta-Coding [12] etc. operate on single coefficients and assume certain statistics like geometric distribution. Unfortunately, in reality such statistics are not exactly met, which causes a possibly tremendous loss in coding efficiency.

Interestingly, these negative impacts can be diminished by not only considering one coefficient at a time, but several of them [5][6][7][8].

Reference [7], for instance groups four coefficients belonging to the same frequency, and splits them into two parts:
Leading zero bit planes
Non-zero bit planes The leading zero bit planes can be efficiently represented by counting their number and by performing entropy encoding of this value. A prediction of the leading zero bit plane count results in a roughly geometric distribution that can be easily encoded using a unary code. Given that this unary code is only generated for every $4^{th}$ coefficient, a mismatch in the statistics is not as critical as if we encode individual coefficients. Moreover, given that the possible value range for the group is limited, and given that neighboring coefficients are expected to have similar values, a uniform distribution of the remainder is a good approximation, at least when the number of non-zero bit planes is small.

However, in case the coefficients get larger, the approximation works less well. Moreover, redundancy between different frequencies is not taken into account.

Summarizing the above, there are many picture and video codecs differentiating, for instance, in a different waking up between computational complexity for an encoder and decoder on the one hand and compression rate on the other hand. It would be favorable to have a picture and/or video codec at hand which allows for low complexity coding/decoding at a nevertheless acceptable compression ratio.

Thus, the object of the present invention is to provide a concept for coding a transform block which allows for lower computational or implementation complexity at a certain compression ratio or alternatively, higher compression ratio at a certain computational complexity.

SUMMARY

An embodiment may have an encoder for encoding a transform block into a data stream, configured to code first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and code second magnitude bits of the spectral coefficients residing in the matrix at a lower significance side of the profile, wherein the encoder is configured to code the first magnitude bits into the data stream prior to, and in a non-interleaved manner relative to, the second magnitude bits.

Another embodiment may have an encoder for encoding a transform block into a data stream, configured to code first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and code second magnitude bits of the spectral coefficients residing in the matrix at a lower significance side of the profile, wherein the encoder is further configured to determine a first predetermined bit plane among bit planes of the spectral coefficients with signaling information revealing the first predetermined bit plane in the data stream, or performing the determination uniquely depending on an amount of data consumed in the data stream by a previously coded portion of the data stream; and identify the second magnitude bits out of the magnitude bits of the spectral coefficients using the first predetermined bit plane.

Another embodiment may have an encoder for encoding a transform block into a data stream, configured to code first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and code second magnitude bits of the spectral coefficients residing in the matrix at a lower significance side of the profile, wherein the encoder is further configured to signal in the data stream information on a second predetermined bit plane for a transform block group to which the transform block belongs, and which represents spectral decompositions of a group of different portions of a two-dimensional image, and restrict the coding of the first magnitude bits and the coding of the second magnitude bits to bit planes which are not more significant than the second predetermined bit plane and to spectral coefficients of a first subset of spectral coefficients, and further code a second subset of spectral coefficients, at least having a DC coefficient, into the data stream in a manner taking into account magnitude bits of the second subset of spectral coefficients lying in bit planes more significant than the second predetermined bit plane.

Still another embodiment may have an encoder for encoding a transform block into a data stream, configured to code first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and code second magnitude bits of the spectral coefficients residing in the matrix at a lower significance side of the profile, wherein the encoder is further configured to select a scan order ordering the spectral coefficients out of a plurality of scan orders, use the selected scan order so that the magnitude bits of the spectral coefficients are arranged in the matrix with the spectral coefficients of the transform block ordered along the row direction of the matrix in accordance with the selected scan order, and code a signalization into the data stream which identifies the selected scan order.

Another embodiment may have an image encoder configured to encode a two-dimensional image having a spectral decomposer configured to spectrally decompose portions into which the two-dimensional image is subdivided, into a plurality of transform blocks; and an inventive encoder for coding a transform block of the plurality of transform blocks into a data stream as mentioned above.

Another embodiment may have a decoder for decoding a transform block from a data stream, configured to decode first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decode second magnitude bits of the spectral coefficients residing in the matrix at a lower significance side of the profile, wherein the decoder is configured to decode the first magnitude bits from the data stream prior to, and in a non-interleaved manner relative to, the second magnitude bits.

Another embodiment may have a decoder for decoding a transform block from a data stream, configured to decode first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decode second magnitude bits of the spectral coefficients residing in the matrix at a lower significance side of the profile, wherein the decoder is further configured to determine a first predetermined bit plane among bit planes of the spectral coefficients with deriving the first predetermined bit plane from information signaled in the data stream, or performing the determination uniquely depending on an amount of data consumed in the data stream by a previously decoded portion of the data stream; and identify the second magnitude bits out of the magnitude bits of the spectral coefficients using the first predetermined bit plane.

Another embodiment may have a decoder for decoding a transform block from a data stream, configured to decode first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decode second magnitude bits of the spectral coefficients residing in the matrix at a lower significance side of the profile, wherein the decoder is further configured to derive from a signalization in the data stream a second predetermined bit plane for a transform block group to which the transform block belongs, and which represents spectral decompositions of a group of different portions of a two-dimensional image, and restrict the decoding of the first magnitude bits and the decoding of the second magnitude bits to bit planes which are not more significant than the second predetermined bit plane and to spectral coefficients of a first subset of spectral coefficients, and further decode a second subset of spectral coefficients, at least having a DC coefficient, from the data stream, the further decoding revealing magnitude bits of the second subset of spectral coefficients lying in bit planes more significant than the second predetermined bit plane.

Still another embodiment may have a decoder for decoding a transform block from a data stream, configured to decode first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decode second magnitude bits of the spectral coefficients residing in the matrix at a lower significance side of the profile, wherein the decoder is further configured to decode a signalization from the data stream which identifies a selected scan order out of a plurality of scan orders, and use the selected scan order so that the magnitude bits of the spectral coefficients are entered into the matrix with the spectral coefficients of the transform block ordered along the row direction of the matrix in accordance with the selected scan order.

Another embodiment may have an image decoder configured to decode a two-dimensional image, having an inventive decoder for decoding a transform block from a data stream as mentioned above; and a spectral decomposition inverter configured to spectrally compose portions into which the two-dimensional image is subdivided, from a plurality of transform blocks to which the transform block belongs.

According to another embodiment, a method for encoding a transform block into a data stream may have the steps of: coding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and coding second magnitude bits of the spectral coefficients residing in the matrix at a lower significance side of the profile, wherein the first magnitude bits are coded into the data stream prior to, and in a non-interleaved manner relative to, the second magnitude bits.

According to another embodiment, a method for encoding a transform block into a data stream may have the steps of: coding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and coding second magnitude bits of the spectral coefficients residing in the matrix at a lower significance side of the profile, wherein the method further has determining a first predetermined bit plane among bit planes of the spectral coefficients with signaling information revealing the first predetermined bit plane in the data stream, or performing the determination uniquely depending on an amount of data consumed in the data stream by a previously coded portion of the data stream; and identifying the second magnitude bits out of the magnitude bits of the spectral coefficients using the first predetermined bit plane.

According to another embodiment, a method for encoding a transform block into a data stream may have the steps of: coding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and coding second magnitude bits of the spectral coefficients residing in the matrix at a lower significance side of the profile, wherein the method further has signaling in the data stream information on a second predetermined bit plane for a transform block group to which the transform block belongs, and which represents spectral decompositions of a group of different portions of a two-dimensional image, and wherein the coding of the first magnitude bits and the coding of the second magnitude bits is restricted to bit planes which are not more significant than the second predetermined bit plane and to spectral coefficients of a first subset of spectral coefficients, and the method further has further coding a second subset of spectral coefficients, at least having a DC coefficient, into the data stream in a manner taking into account magnitude bits of the second subset of spectral coefficients lying in bit planes more significant than the second predetermined bit plane.

According to still another embodiment, a method for encoding a transform block into a data stream may have the steps of: coding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and coding second magnitude bits of the spectral coefficients residing in the matrix at a lower significance side of the profile, wherein the method further has selecting a scan order ordering the spectral coefficients out of a plurality of scan orders, using the selected scan order so that the magnitude bits of the spectral coefficients are arranged in the matrix with the spectral coefficients of the transform block ordered along the row direction of the matrix in accordance with the selected scan order, and coding a signalization into the data stream which identifies the selected scan order.

According to another embodiment, a method for decoding a transform block from a data stream may have the steps of: decoding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decoding second magnitude bits of the spectral coefficients residing in the matrix at a lower significance side of the profile, wherein the first magnitude bits are decoded from the data stream prior to, and in a non-interleaved manner relative to, the second magnitude bits.

According to another embodiment, a method for decoding a transform block from a data stream may have the steps of: decoding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decoding second magnitude bits of the spectral coefficients residing in the matrix at a lower significance side of the profile, wherein the method further has determining a first predetermined bit plane among bit planes of the spectral coefficients with deriving the first predetermined bit plane from information signaled in the data stream, or performing the determination uniquely depending on an amount of data consumed in the data stream by a previously decoded portion of the data stream; and identifying the second magnitude bits out of the magnitude bits of the spectral coefficients using the first predetermined bit plane.

According to another embodiment, a method for decoding a transform block from a data stream may have the steps of: decoding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decoding second magnitude bits of the spectral coefficients residing in the matrix at a lower significance side of the profile, wherein the method further has deriving from a signalization in the data stream a second predetermined bit plane for a transform block group to which the transform block belongs, and which represents spectral decompositions of a group of different portions of a two-dimensional image, and the decoding of the first magnitude bits and the decoding of the second magnitude bits to bit planes which are not more significant than the second predetermined bit plane and to spectral coefficients of a first subset of spectral coefficients, and the method further has decoding a second subset of spectral coefficients, at least having a DC coefficient, from the data stream, the further decoding revealing magnitude bits of the second subset of spectral coefficients lying in bit planes more significant than the second predetermined bit plane.

According to still another embodiment, a method for decoding a transform block from a data stream may have the steps of: decoding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decoding second magnitude bits of the spectral coefficients residing in the matrix at a lower significance side of the profile, wherein the method further has decoding a signalization from the data stream which identifies a selected scan order out of a plurality of scan orders, and using the selected scan order so that the magnitude bits of the spectral coefficients are entered into the matrix with the spectral coefficients of the transform block ordered along the row direction of the matrix in accordance with the selected scan order.

Another embodiment may have a non-transitory digital storage medium having stored thereon a computer program for performing a method for encoding a transform block into a data stream, having coding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and coding second magnitude bits of the spectral coefficients residing in the matrix at a lower significance side of the profile, wherein the first magnitude bits are coded into the data stream prior to, and in a non-interleaved manner relative to, the second magnitude bits, when said computer program is run by a computer.

Another embodiment may have a non-transitory digital storage medium having stored thereon a computer program for performing a method for decoding a transform block from a data stream, having decoding first magnitude bits of spectral coefficients of the transform block into the data stream, the first magnitude bits forming a profile in a matrix in which the magnitude bits of the spectral coefficients are arranged column-wise with the spectral coefficients of the transform block ordered along a row direction of the matrix, the profile enveloping non-zero magnitude bits of the spectral coefficients in the matrix; and decoding second magnitude bits of the spectral coefficients residing in the matrix at a lower significance side of the profile, wherein the first magnitude bits are decoded from the data stream prior to, and in a non-interleaved manner relative to, the second magnitude bits, when said computer program is run by a computer.

Another embodiment may have a data stream formed by the inventive method for encoding as mentioned above.

An idea underlying the present invention is the fact that transform block coding may be achieved very efficiently in terms of computational complexity and compression ratio, by coding the magnitude bits of the transform coefficients distributed in a matrix, in which the magnitude bits of the spectral coefficients are arranged column-wise with the spectral coefficients of the transform block ordered along a row direction of the matrix. That is, magnitude bits within a certain column of the matrix belong to a certain spectral coefficient, while magnitude bits within a certain row of the matrix belong to a certain bit plane. In this configuration, the distribution of non-zero magnitude bits may be condensed towards one corner of the matrix, corresponding to, for instance, the least significant bit plane and corresponding to, by using a scan order among the transform coefficients which sorts the transform coefficients generally in a manner from lowest to highest frequency, the lowest frequency. In particular, the idea of the present invention is to code the transform coefficients within such a matrix with separately treating first magnitude bits and second magnitude bits of the spectral coefficients: the first magnitude bits form a profile in the aforementioned matrix which, in turn, forms an envelope of non-zero magnitude bits of the spectral coefficients in the matrix. The second magnitude bits of the spectral coefficients reside in the matrix at a lower significance side of the profile. They refine the profile bits. On the one hand, the separation mirrors the fact that the first magnitude bits which form the profile, are more important or significant with respect to information content, and, on the other hand, the separation concurrently results in an effective way of restricting the further coding, namely the coding of the refining second magnitude bits, to a small fraction of the matrix, i.e. the area at the lower significance side of the profile. That is, the second magnitude bits to be coded merely reside in this area. In accordance with an embodiment, the coding of the first magnitude bits, which form the profile, are coded in a manner traversing the matrix from higher to lower significance bit planes, such as from top to bottom of the matrix, and traversing magnitude bits of a row of the matrix, which corresponds to a currently traversed bit plane, along the row direction, such as from low to high frequencies so that the profile forms a convex hull in the matrix which envelops, at a more significance side, the non-zero magnitude bits of the spectral coefficients. The profile may, for instance, already comprise some of the non-zero magnitude bits of the spectral coefficients, or alternatively speaking the most significant non-zero magnitude bits of at least some spectral coefficients. The profile may be coded, for instance, by the use of certain symbols which may be code words of a variable length code.

In accordance with a first aspect of the present application, the just-outlined concept of separating the coding of the magnitude bits of the spectral coefficients into a coding of the profile on the one hand and a coding of the lower significance magnitude bits on the other hand, is exploited so as to render the coding and decoding low in computational complexity by coding the first magnitude bits, which form the profile, into the data stream prior to, and in a non-interleaved manner relative to, the second magnitude bits. By this measure, the data stream reveals information on a data amount available in the data stream for coding the second magnitude bits or, the other way around, the data amount having already been allocated to, and consumed by, the coding of the first magnitude bits, which form the profile, at the earliest opportunity possible, i.e. prior to the coding of the second magnitude bits. By this measure, the encoder and decoder may both determine which of the magnitude bits residing in the matrix at a lower significance side of the profile are to be coded as the second magnitude bits of the spectral coefficients after the first magnitude bits, i.e. to identify the second magnitude bits, and in which order. In turn, this the enables encoder and decoder to perform the coding of the second magnitude bits into a data stream in a manner such that the second magnitude bits belonging to different spectral coefficients are not interleaved. That is, the second magnitude bits may be coded into the data stream spectral-coefficient-wise, thereby reducing implementation complexity by avoiding revisiting the coefficients too often. Even any interleaving between second magnitude bits of spectral coefficients of different transform blocks of a transform block group to which the transform block belongs and for which a certain amount of coding rate has been reserved commonly, may be avoided. In turn, this alleviates the implementation complexity, or differently speaking computational complexity, on the encoder and decoder sides.

In accordance with a second aspect of the present application, the above-outlined concept of separating the coding of the magnitude bits of the spectral coefficients into profile on the one hand and lower significance magnitude bits beneath the profile on the other hand, is exploited and made less complex in terms of computational complexity by designing the encoder and decoder in a manner such that both determine a predetermined bit plane using which the second magnitude bits may be identified out of the magnitude bits of the spectral coefficients. Together, the predetermined bit plane and the profile result in an exact identification of a portion of the matrix within which the second magnitude bits reside. That is, the second magnitude bits lying within this fraction of the matrix may be conveyed within the data stream in an advantageous manner such as, for instance, spectral-coefficient-wise without interleaving of second magnitude bits belonging to different spectral coefficients. In other words, the predetermined bit plane may determine a least significant completely coded bit plane so that the second magnitude bits are identified to cover at least all those magnitude bits lying at the lower significance side of the profile and being above, or being above or within, the predetermined bit plane. A next lower significant bit plane may be partially populated with second magnitude bits in order to consume a remaining data amount in the data stream reserved for, or allocated to, the transform block. The encoder and decoder may identify second magnitude bits within this fractional bit plane in a manner so that the same second magnitude bits within this fractional bit plane are identified. However, as this process pertains to merely one bit plane, the computational complexity associated with this identification may be kept low. In other words, the predetermined bit plane determination may be coupled to a rate control and this rate control may involve a signalization of respective information revealing the first predetermined bit plane within the data stream in the form of, for example, an explicitly signaled quantization step size, or the rate control may be performed on encoder and decoder sides depending on a data amount consumed by of a previous decoded portion of the data stream such as, for instance, by surveying a buffer fullness of a virtual or real buffer at encoder and decoder sides.

In accordance with a third aspect of the present application, the above-outlined concept of separating the coding of the magnitude bits of the spectral coefficients into coding of the profile on the one hand and coding of the enveloped magnitude bits on the other hand is made more efficient in terms of coding efficiency by signaling in the data stream from encoder to decoder a second predetermined bit plane for a transform block group to which the transform block belongs, and which represents spectral decompositions of a group of different portions of a two-dimensional image. The second predetermined bit plane is used to restrict the coding of the profile, i.e. the coding of the first magnitude bits which form the profile, and the coding of the second magnitude bits. In particular, the coding of the first and second magnitude bits is restricted to bit planes which are not more significant than the second predetermined bit plane, and to a first subset of spectral coefficients such as all AC spectral coefficients. The second predetermined bit plane signaled in the data stream is set to be high enough, for instance, to cover all non-zero magnitude bits of the subset of spectral coefficients such as all non-DC or AC spectral coefficients, i.e. so that the profile envelops at least the latter non-zero spectral coefficients' magnitude bits. With respect to another, disjoint subset of spectral coefficients which may, for example, merely comprise the DC coefficient, the coding of the coefficient value may be performed separately in a manner considering also magnitude bits thereof lying in bit planes more significant than the second predetermined bit plane. By this measure, the third aspect of the present application takes into account that the statistical spread of the values of DC or lower frequency spectral coefficients may be considerably larger than the spread of the remaining, possibly higher frequency, spectral coefficients in terms of the most significant bit plane populated by any of the non-zero magnitude bits of the respective spectral coefficients. Accordingly, treating transform blocks of the transform block group together in order to allow for a mutual exchange of available code rate among the transform coefficients, may be made more efficient by treating the DC spectral coefficient separately. In order to increase coding efficiency, spatial prediction and/or variable length coding may be used in order to increase the coding efficiency with respect to the coding of the values of the separately coded subset of spectral coefficients.

In accordance with a fourth aspect of the present application, the concept outlined above of separately coding profile magnitude bits and magnitude bits enveloped by the profile is made more efficient in terms of coding efficiency by selecting a scan order ordering the spectral coefficients out of a plurality of scan orders at the encoder side, signaling the selection to the decoder, and using at the encoder and decoder the selected scan order so that the magnitude bits of the spectral coefficients are arranged in the matrix with the spectral coefficients of the transform block ordered along the row direction of the matrix in accordance with the selected scan order. The encoder may perform the selection in a brute force manner, i.e. by testing out all possible scan orders of the plurality of scan orders and using the one leading to the best compression in terms of, for instance, rate/distortion ratio, or may select the scan order heuristically, such as by computing a measure for the transform block's distribution of the spectral coefficients' energy towards low frequencies with respect a first spatial direction, or low frequencies with respect to a second spatial direction such as x- and y-direction. Although the signalization overhead seems to decrease the coding efficiency, the opposite is the case: by providing the encoder with the opportunity to select the most efficient scan order, the aforementioned condensing of the distribution of non-zero magnitude bits may be improved, thereby also increasing the coding efficiency of coding the magnitude bits using profile and magnitude bits enveloped by the profile.

The aspects outlined above may be combined individually or all together.

BRIEF DESCRIPTION OF THE DRAWINGS

Embodiments of the present application are described below with respect to the figures, among which:

FIG. 1 shows an example for a magnitude bit matrix where crosses denote an arbitrary bit value, unshaded bits denote the second magnitude bits or refinement bits, which bits increase the precision of the coefficient representation relative to the bits contained within the profile, which profile bits are, in turn, highlighted using hatching;

Figure 5A:
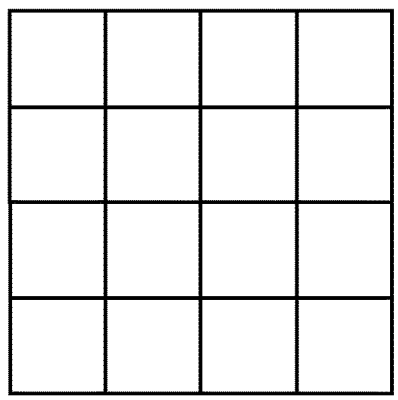
FIGS. 5a-b show sample blocks with a) a vertical edge and b) a horizontal edge therein.
Figure 5B:
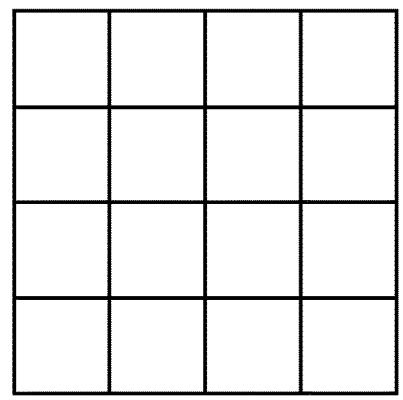
Figure 6A:
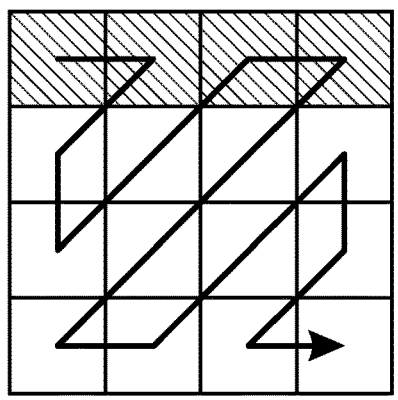
Figure 6B:
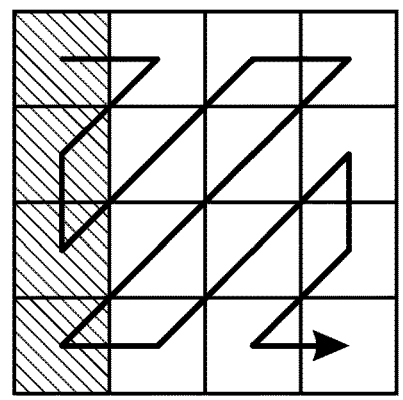
Figure 7A:
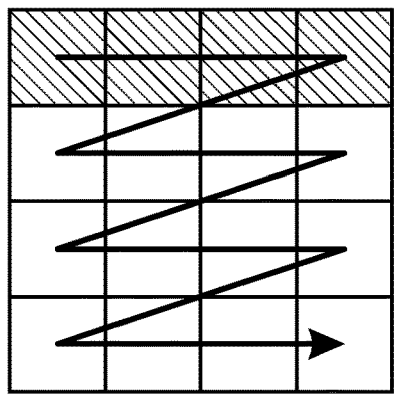
Figure 7B:
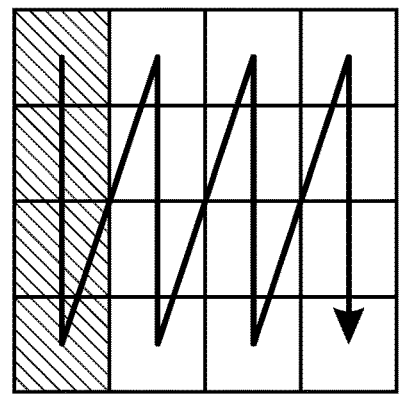
Figure 8C:
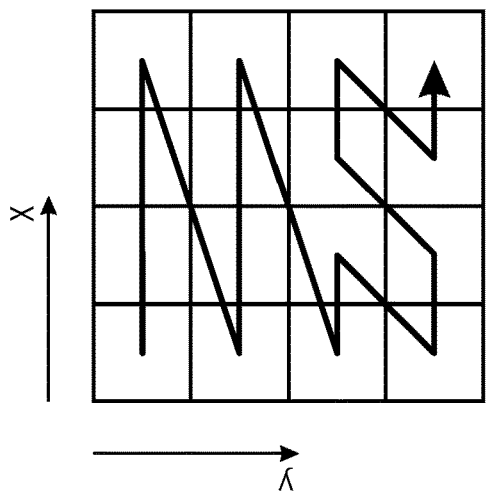
Figure 8B:
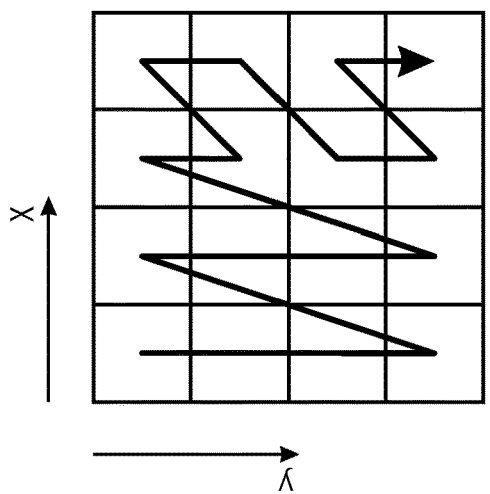
Figure 8A:
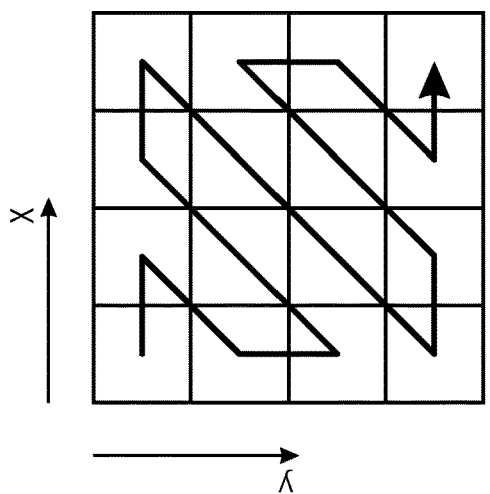
Figure 13A:
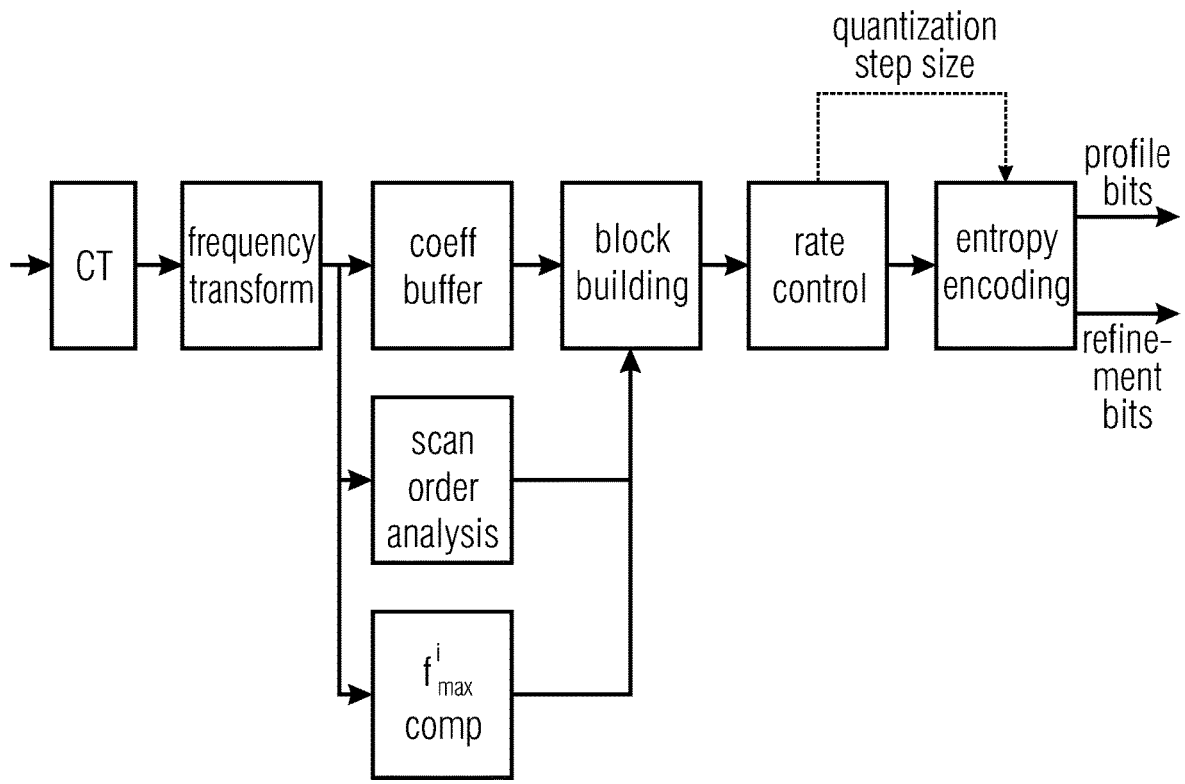
Figure 13B:
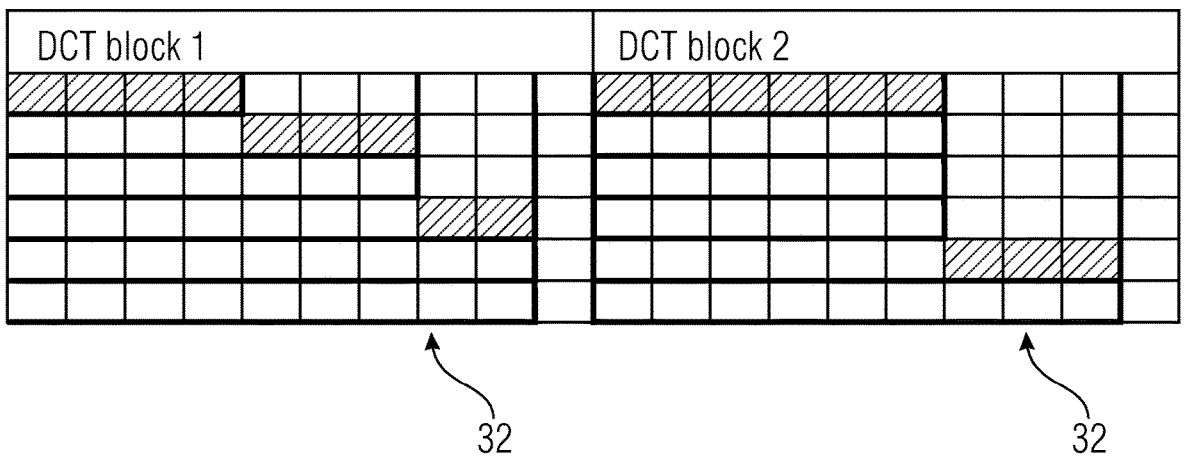
Figure 18:
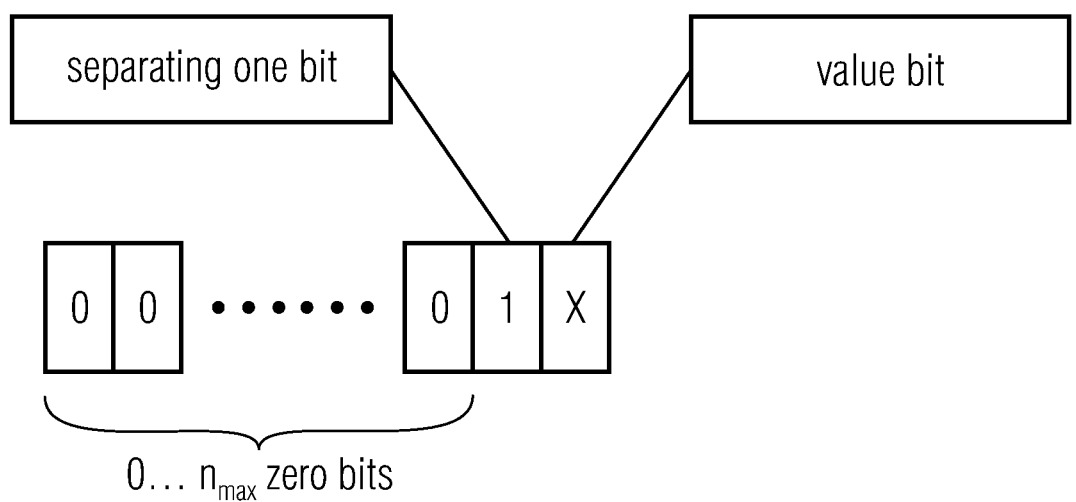
Figure 19:
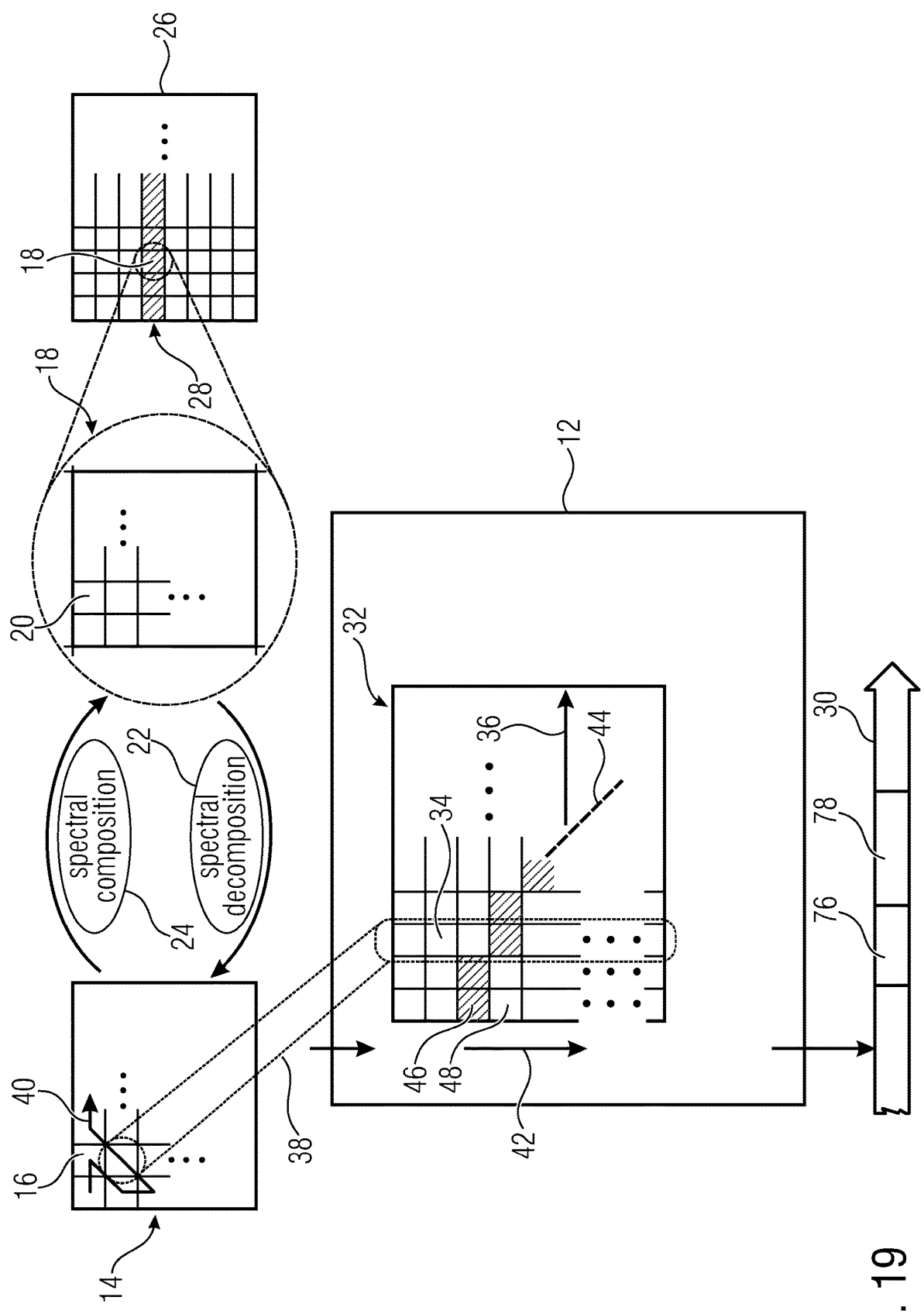
Figure 20:
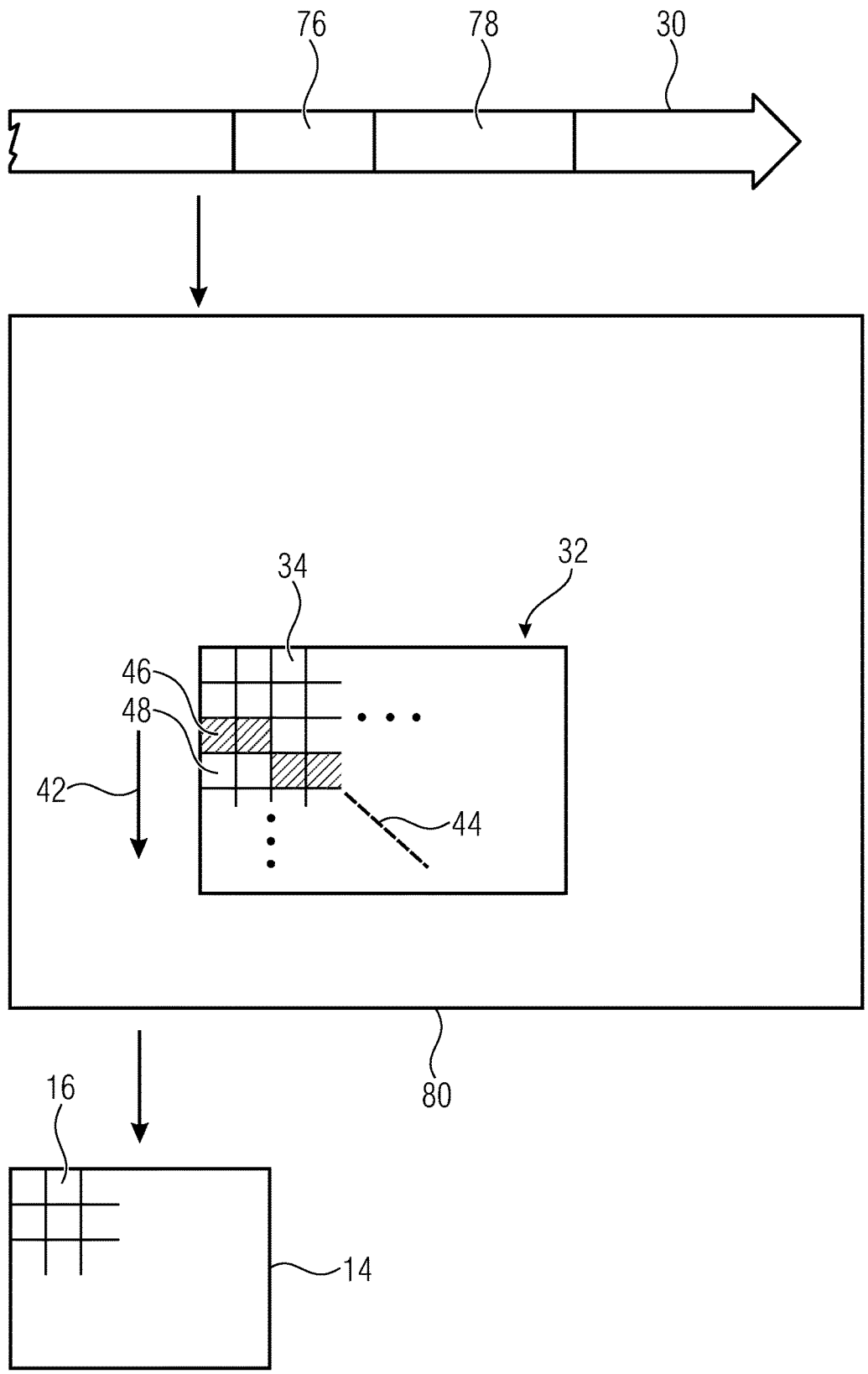
Figure 21:
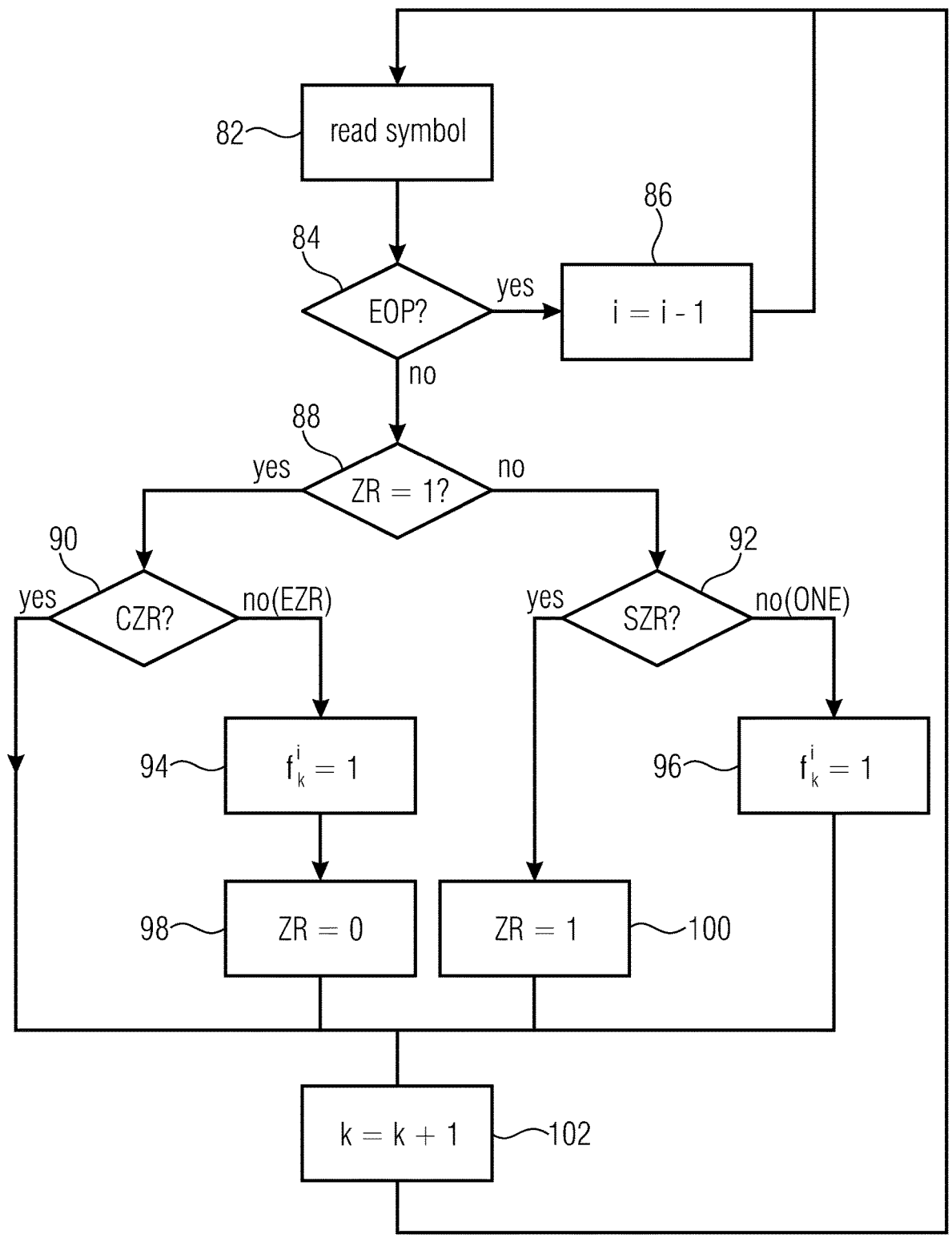
Figure 22A:
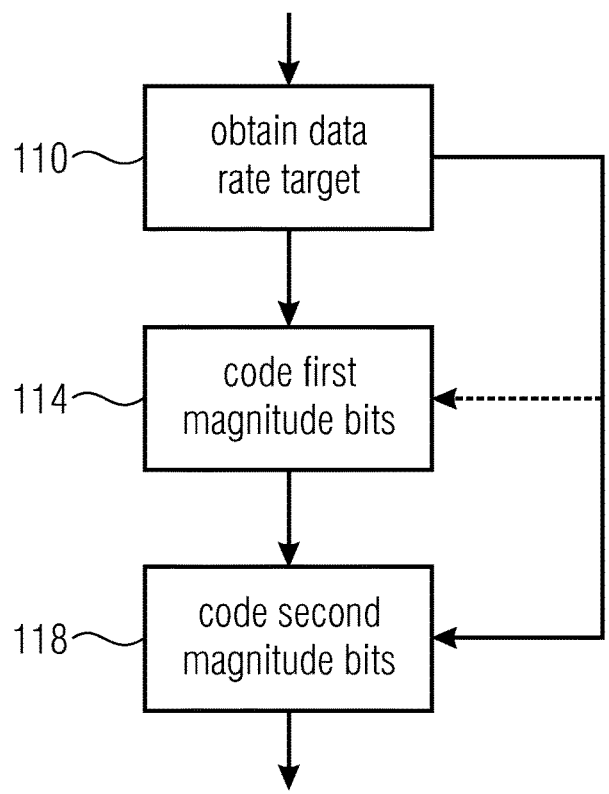
Figure 22B:
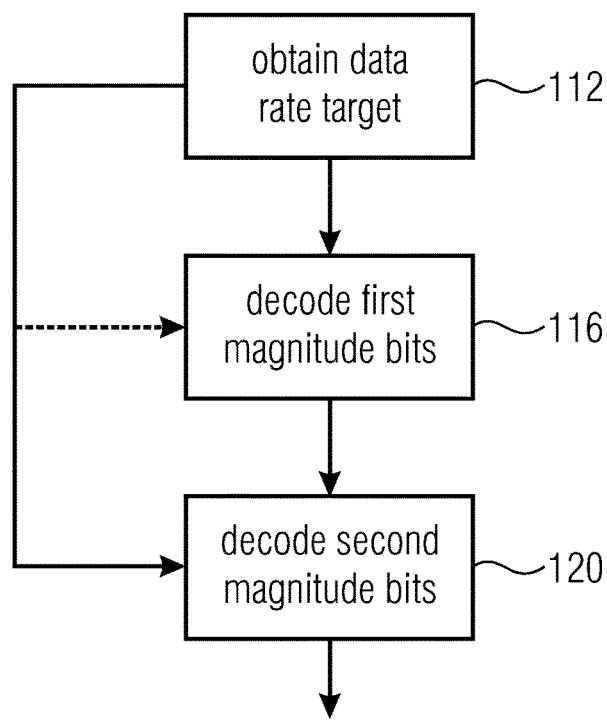
Figure 23B:
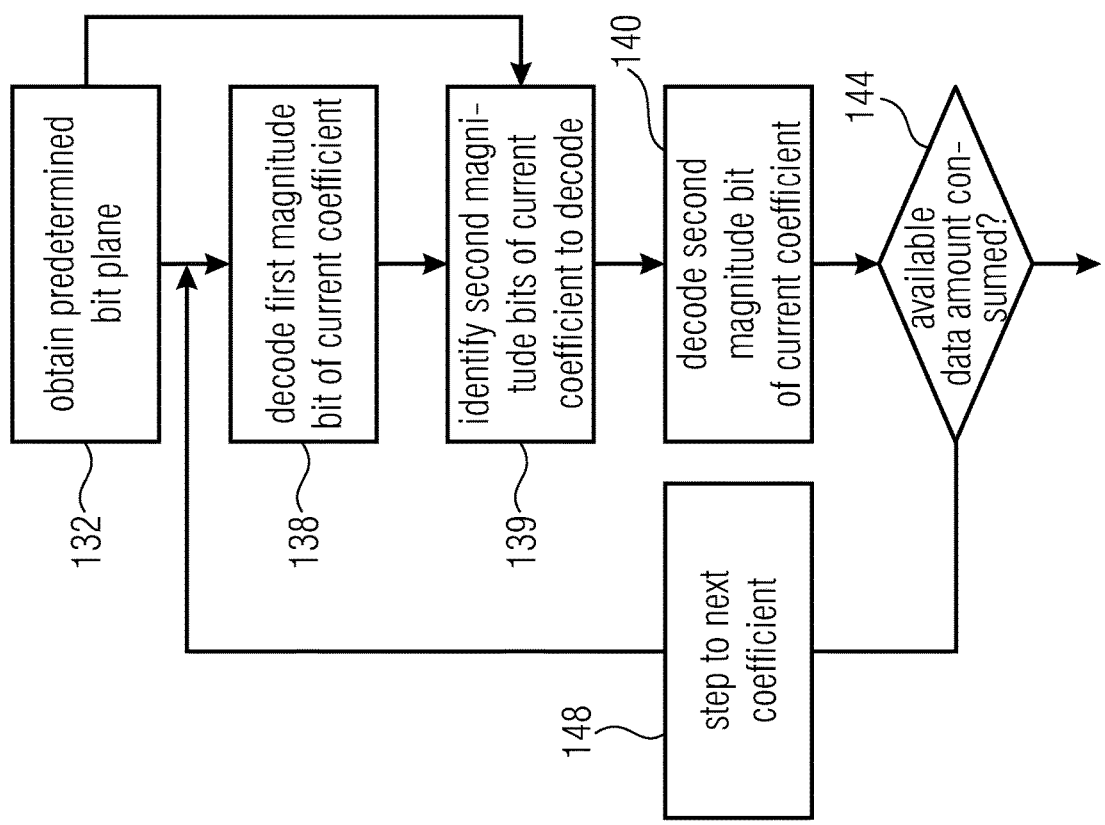
Figure 23A:
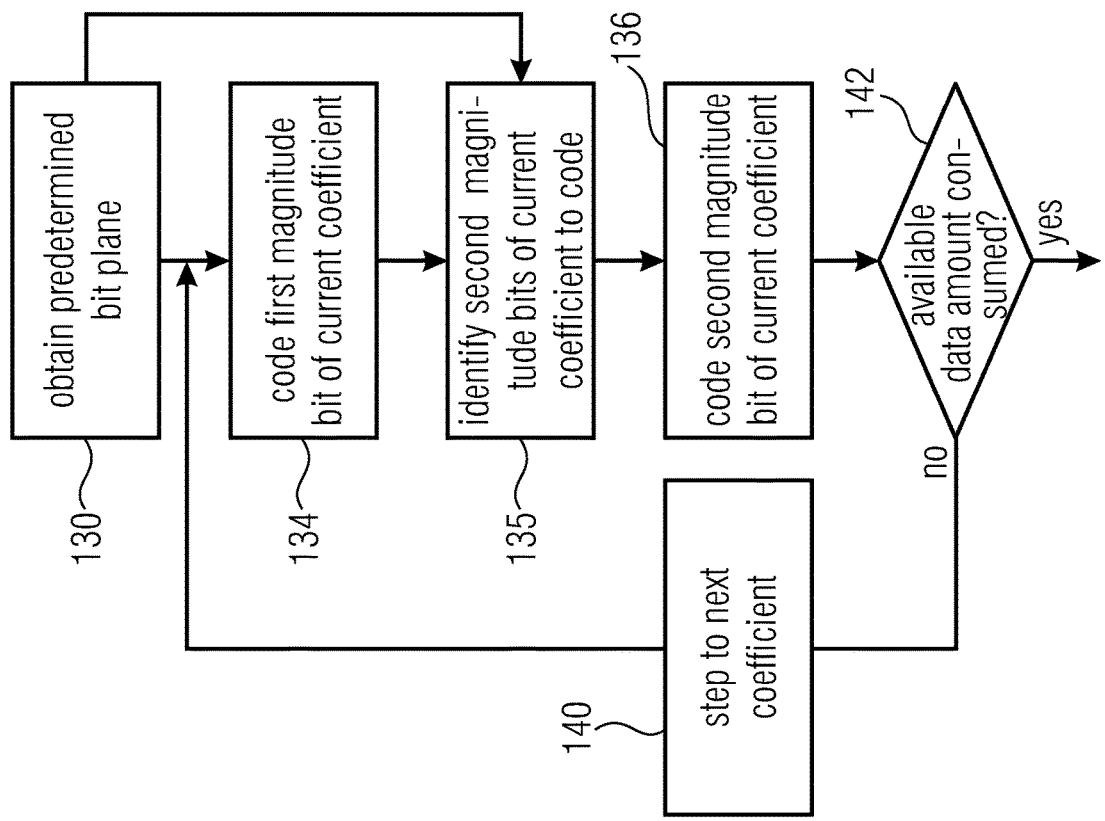
Figure 24A:
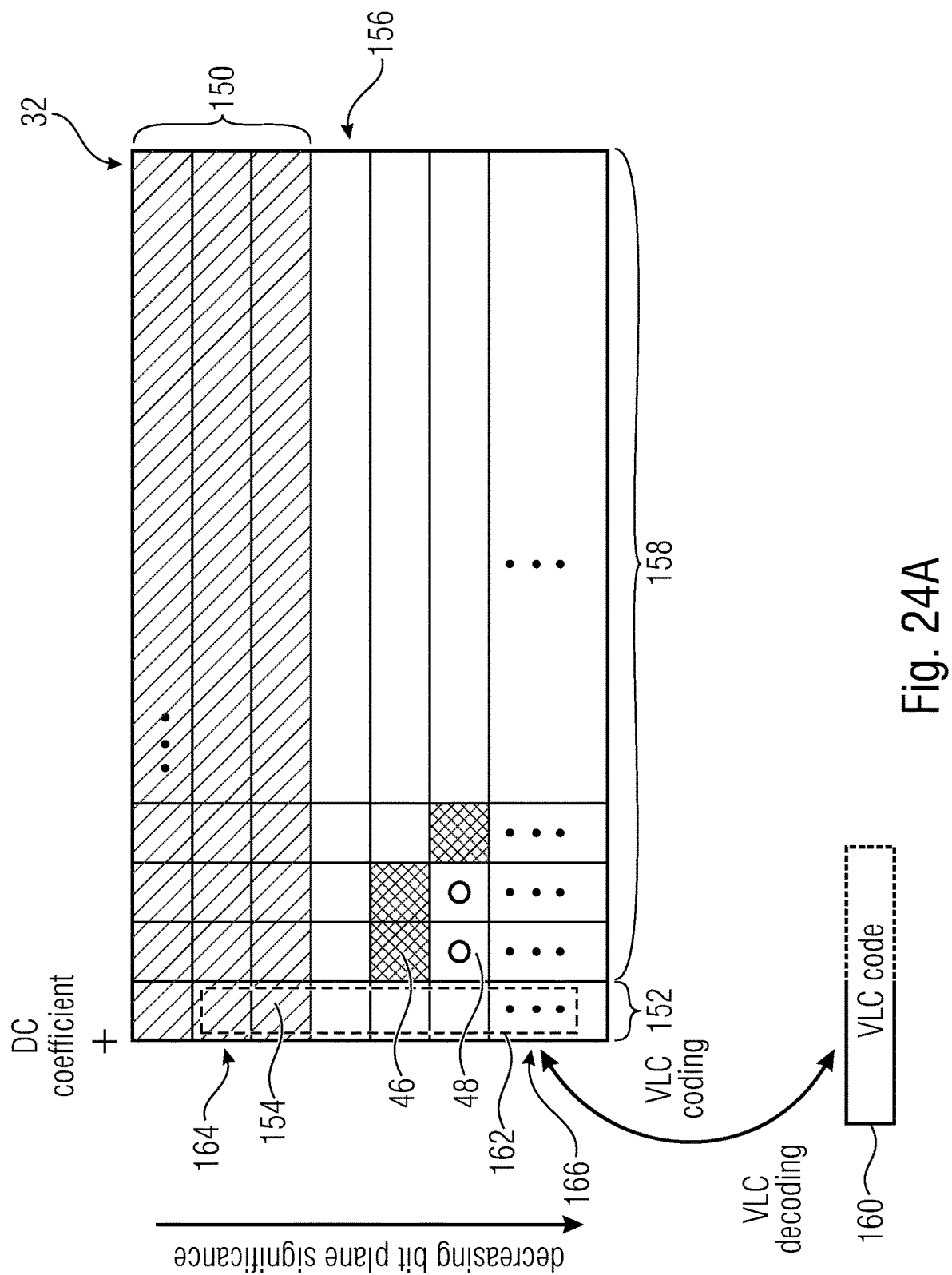
Figure 24B:
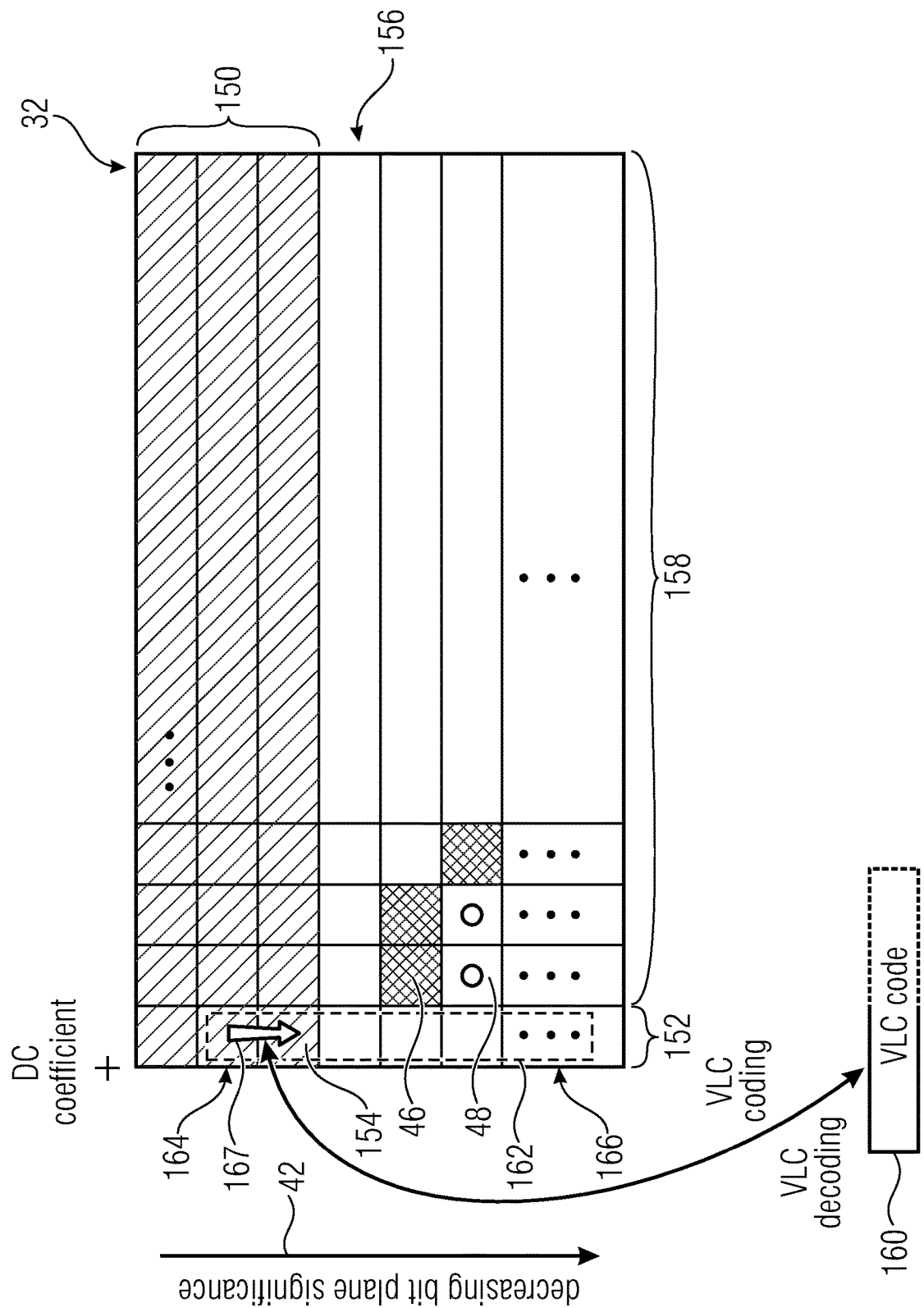
Figure 25:
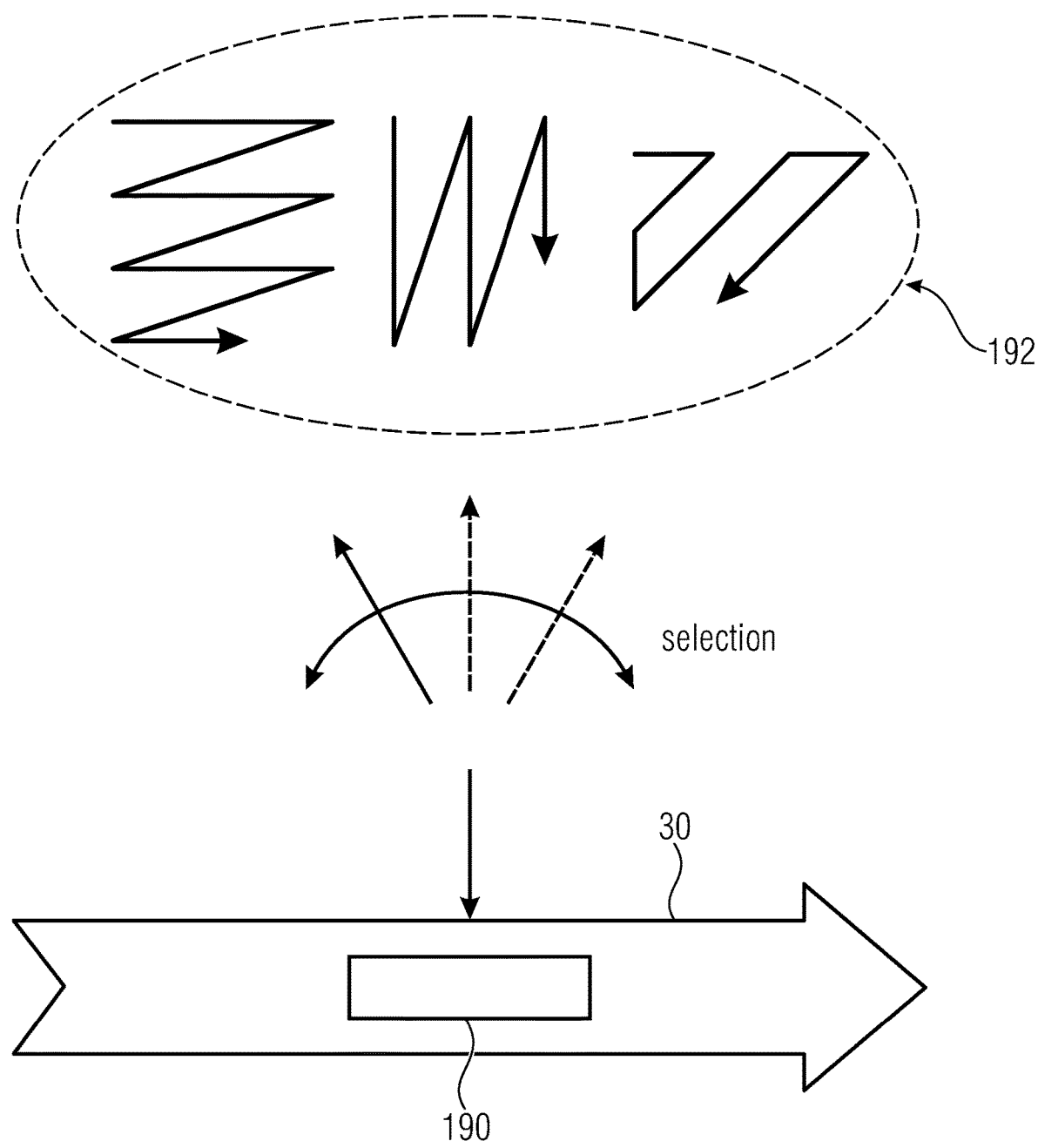
Figure 26:
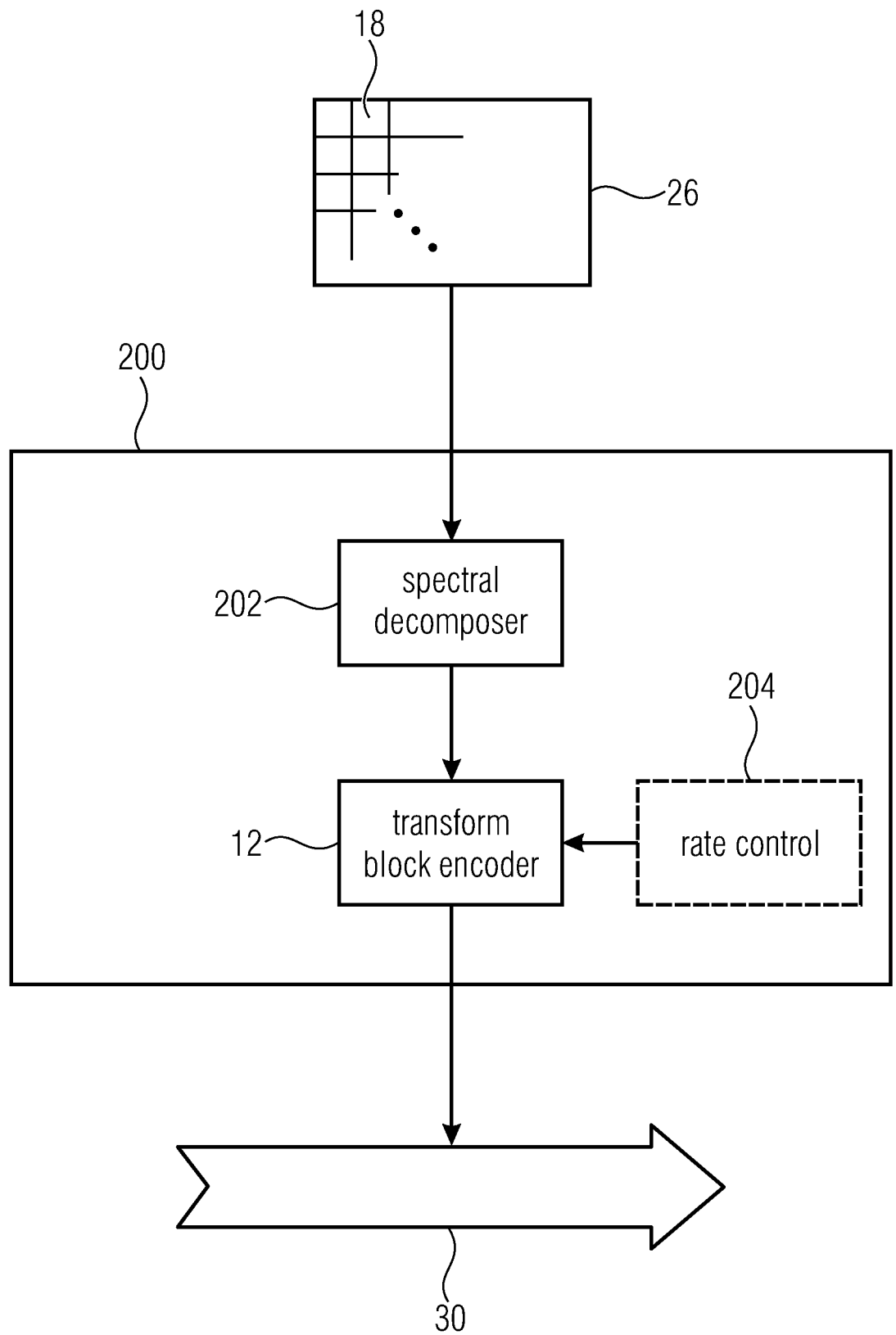
Figure 27:
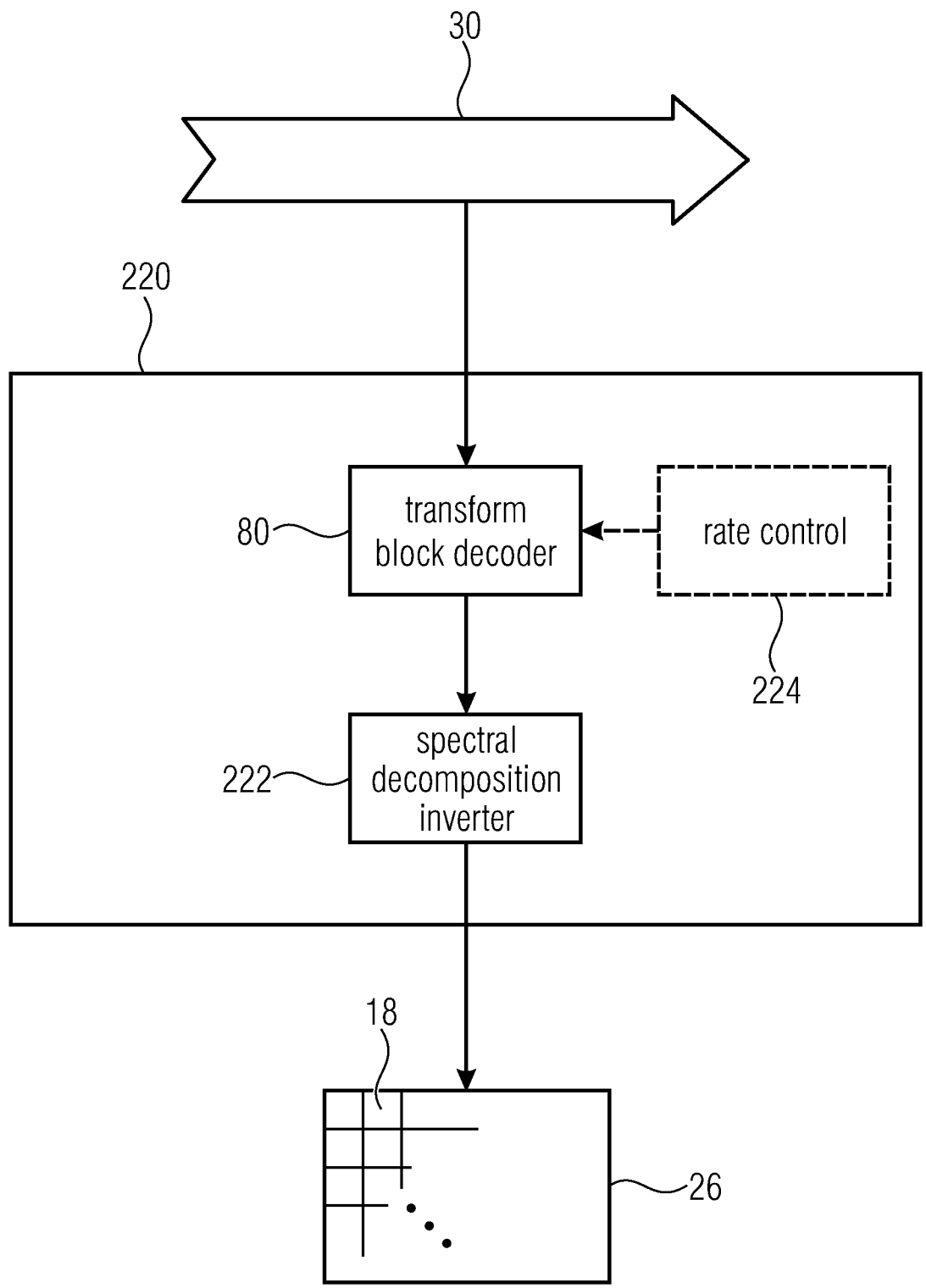
Figure 28:
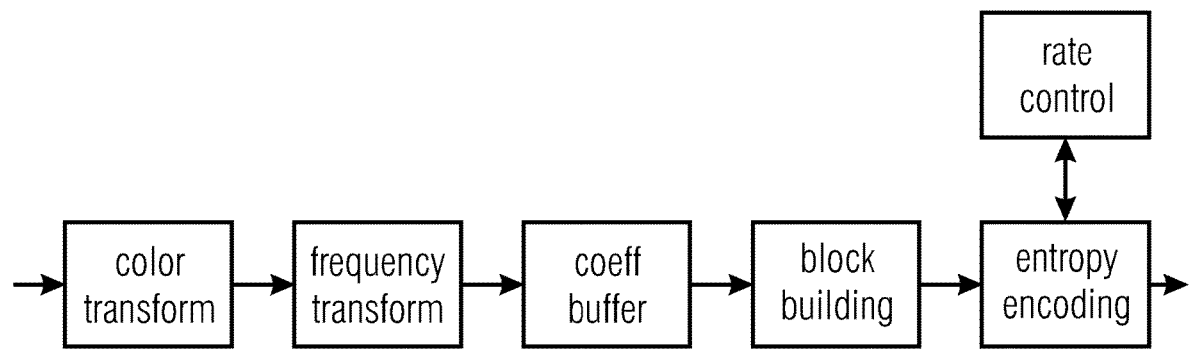
Figure 29:
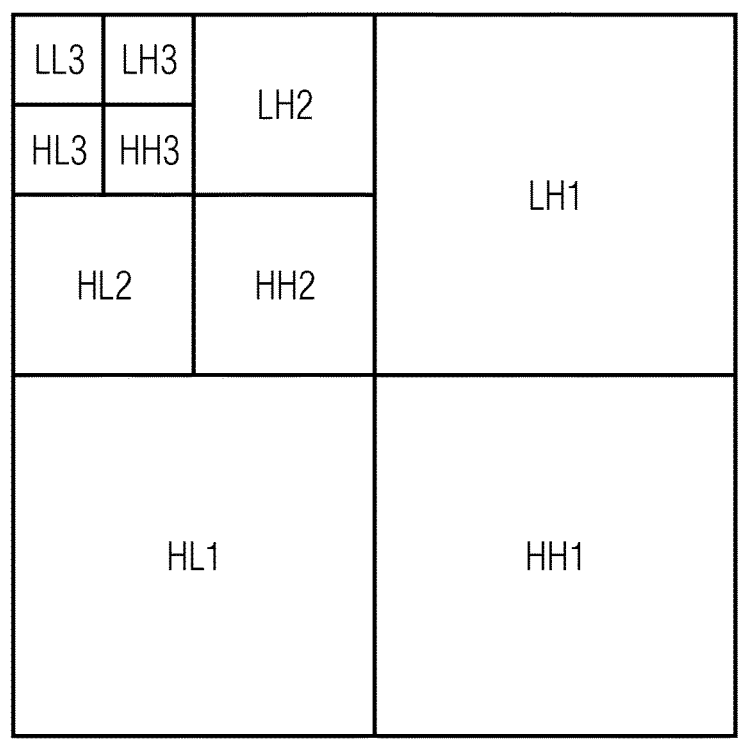

the shading of the samples may correspond, for instance, to a one pixel value, whereas unshaded ones may correspond to a zero pixel value;

FIGS. 6a-b show exemplary DCT representations as examples for transform blocks as resulting from sample blocks of FIGS. 5a and 5b, respectively, with additionally showing therein a typical zig-zag scan order sequentializing the spectral coefficients of the DCT blocks; unshaded coefficients are zero;

FIGS. 7a-b show the transform blocks of FIGS. 6a and 6b with more suited scan orders, namely a horizontal raster scan order for case A and a vertical raster scan order for case B;

FIGS. 8a-c show examples of an exemplary set of available scan orders at the encoder and decoder, namely a) a zig-zag scan order obliquely with respect to x and y scanning the transform coefficient from DC to highest frequency, b) a modified vertical raster scan order, and c) a modified horizontal scan order;

FIG. 9 shows another example of a magnitude bit matrix;

FIG. 10a-b shows a pseudo code of encoding a transform block on a bit plane by bit plane basis as a comparison example;

FIGS. 11a-d denoting an arrangement of FIG. 11A to 11D one on top of the other, shows a listing of a pseudo code for a transform block encoding using a least significant non-fractional bit plane determination in accordance with a second aspect of the present application in accordance with an embodiment;

FIG. 12a-c denoting an arrangement of FIG. 12A to 12C one on top of the other, shows a listing of a pseudo code for a transform block decoding fitting to the encoding process of FIG. 11;

FIG. 13a shows a block diagram of an encoder for encoding a picture or image in accordance with the second aspect of the present application;

FIG. 13b shows an example for a bit plane based quantization as an example for the second aspect of the present application, wherein shaded rectangles correspond to profile bits;

FIGS. 14a-d denoting an arrangement of FIG. 14A to 14D one on top of the other, shows a listing of a pseudo code for a transform block encoding, here exemplarily using the second aspect of the present application;

FIGS. 15a-d denoting an arrangement of FIG. 15A to 15D one on top of the other, shows a listing of a pseudo code for transform block decoding fitting to the example of FIG. 14;

FIGS. 16a-c denoting an arrangement of FIG. 16A to 16C one on top of the other, shows an example of a pseudo code simplified relative to FIG. 14 with respect to the coding of fractional bit planes;

FIGS. 17a-c denoting an arrangement of FIG. 17A to 17C one on top of the other, shows a listing of a pseudo code of a transform block decoding fitting to the encoding of FIG. 16;

FIG. 18 shows a schematic diagram illustrating a variable code word structure for profile coding when run-state is non-active;

FIG. 19 shows a schematic diagram illustrating an encoder 12 and the magnitude bit matrix it codes, in accordance with an embodiment of the present application which may be implemented to corresponding to any of the first to fourth aspects of the present application;

FIG. 20 shows a schematic diagram illustrating a decoder fitting to the encoder of FIG. 19;

FIG. 21 shows a flow diagram for decoding profile bits in accordance with an embodiment;

FIGS. 22a-b show flow diagrams of the mode of operation of the encoder and decoder of FIGS. 19 and 20 when implemented to operate in accordance with a first aspect of the present application;

FIGS. 23a-b show flow diagrams of the mode of operation of the encoder and decoder of FIGS. 19 and 20, in accordance with an embodiment where same are implemented in a way corresponding to the second aspect of the present application;

FIG. 24A shows a schematic diagram of a matrix of the magnitude bits or spectral coefficients of a transform block to illustrate a mode of operation of the encoder and decoder of FIGS. 19 and 20 when implemented in accordance with a third aspect of the present application;

FIG. 24B shows a schematic diagram of a matrix of the magnitude bits or spectral coefficients of a transform block to illustrate an alternative mode of operation of the encoder and decoder of FIGS. 19 and 20 when implemented in accordance with a third aspect of the present application, differing from FIG. 24 in the manner as to how the extra set of coefficients, here exemplarily merely including the DC coefficient, is coded;

FIG. 25 shows a schematic diagram of a signalization of a selected scan order to illustrate a mode of operation of the encoder and decoder of FIGS. 19 and 20 when implemented in accordance with a fourth aspect of the present application;

FIG. 26 shows a block diagram of an image or video encoder using any of the above described transform block encoding concepts;

FIG. 27 shows a block diagram of an image or video decoder fitting to FIG. 26, using any of the above described transform block decoding concepts;

FIG. 28 shows a block diagram of an encoder for encoding a picture or image; and FIG. 29 shows a block composed of coefficients from different subbands.

DETAILED DESCRIPTION OF THE INVENTION

The following description of embodiments of the present application starts with a motivation of the underlying separated coding of profile magnitude bits and magnitude bits enveloped by the profile. Subsequently, the description involved with this motivation section is extended in three different ways with many variants also being presented. The four different aspects already outlined above are used in respective ones of the presented modified concepts. Finally, embodiments for the encoder and decoder are described, which use the separated coding of profile magnitude bits and magnitude bits enveloped by the profile and for each of the four aspects presented above, another implementation of the encoder and decoder embodiments is described with trying to reference sections of the description of the three modified concepts.

1. Coding Strategy

Frequency transforms used for compression show an energy compaction property. This means that the relevant information is concentrated in a few frequency coefficients, while the other frequency coefficients have only low amplitudes.

This property is exploited by the coding scheme embodiments outlined below. To this end, the frequency coefficients of a transform block as described with respect to Figs. A and B are ordered in such a way that in mean they have decaying amplitude. Since the ordering needs to be known by the decoder for proper decoding, the ordering scheme is fixed, or a limited number of orderings may be chosen as explained later on in Section 1.10. Please note that while for a single block frequency coefficients might not be decaying, this property holds when considering the entirety of blocks occurring in typical images.

1.1 Block Profile

FIG. 1 illustrates a corresponding example block or "matrix". The frequency coefficients $f_0$-$f_{15}$ are displayed in sign-magnitude representation with n magnitude bits. In case of a DCT transform, each of the frequencies $f_k$ represents one of the 2D-frequency coefficients, which have been reordered as described above and then labeled with a linear index. Let $f_k^i$ be the i-th bit of frequency coefficient $f_k$. The hatched bits belong to the so called profile of the block. Mathematically, a bit $f_k^i$ belongs to the profile if and only if $$(\forall a \leq k \wedge \forall j < i : f_a^j = 0) \wedge (\exists a \leq k : f_a^i = 1).$$

In other words, the profile forms the convex hull of the most significant '1'-bits. All bits that are situated in a bit plane below the profile bits are called refinement bits, since they gradually improve the precision of the coefficient value.

With this definition, a block can be entropy encoded by efficiently describing the profile, and copying the refinement bits to the output bit stream without any modifications.

1.2 Definitions

Let $f_k^i$ be the i-th bit of frequency coefficient $f_k$, $f_k^0$ being the LSB. Then the following definitions hold:

$f_k$ is called significant in bit plane j, if and only if $\exists i > j : f_k^i = 1$.

$f_k$ gets significant in bit plane j, if and only if it is significant in bit plane j−1, but not in bit plane j 1.3 Profile Encoding In order to describe the form of the profile, the following symbols are used when encoding a bit $f_k^i$ being part of the profile, where ZR is a so called zero run state:

TABLE 1

Alphabet (symbol table) for profile encoding

| Symbol | Typical value | Meaning | Condition | Explanation |
|---|---|---|---|---|
| EOP | 0 | End of profile | ZR = 0 | All remaining bits $f_a^i$, $a \geq k$ are zero. This avoids explicitly sending the cross hatched bits in FIG. 3. |
| ONE | 11 | '1'-symbol | ZR = 0 | The currently encoded bit $f_k^i$ is one. |
| SZR | 10 | Start Zero Run | ZR = 0 | The currently coded bit $f_k^i$ is zero, and $\exists a > k : f_a^i = 1$. Consequently, the EOP needs not to be expected till reaching the next one bit. Consequently, when the zero-run state is entered (ZR = 1), an EOP symbol is illegal. |
| CZR | 0 | Continue zero run | ZR = 1 | The currently coded bit $f_k^i$ is zero and the zero run is continued (ZR = 1). |
| EZR | 1 | End zero run | ZR = 1 | The currently coded bit $f_k^i$ is one and the zero run is exit (ZR = 0) |

Figure 2:
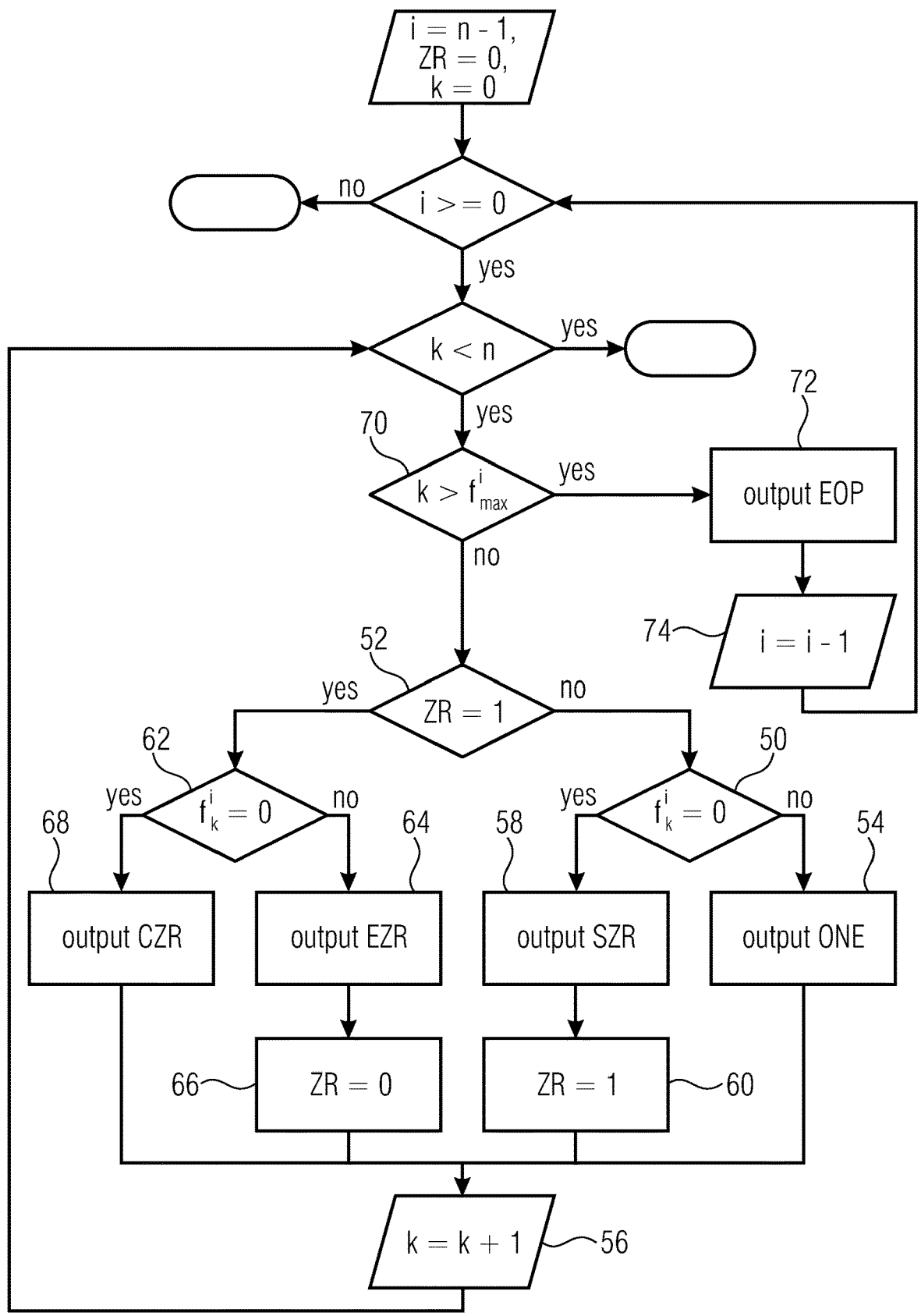
FIG. 2 shows a flow diagram of a process for encoding the profile bits in accordance with an embodiment.

FIG. 2 shows the flow chart for the profile encoding. The encoder knows for every bit plane i the maximum contributing frequency:

$$f_{max}^i = \begin{cases} -1 & f_k < 2^i \forall k \\ \mathrm{argmax}_k(f_k \geq 2^i) & \text{otherwise} \end{cases} \quad (1\text{-}1)$$

Figure 3:
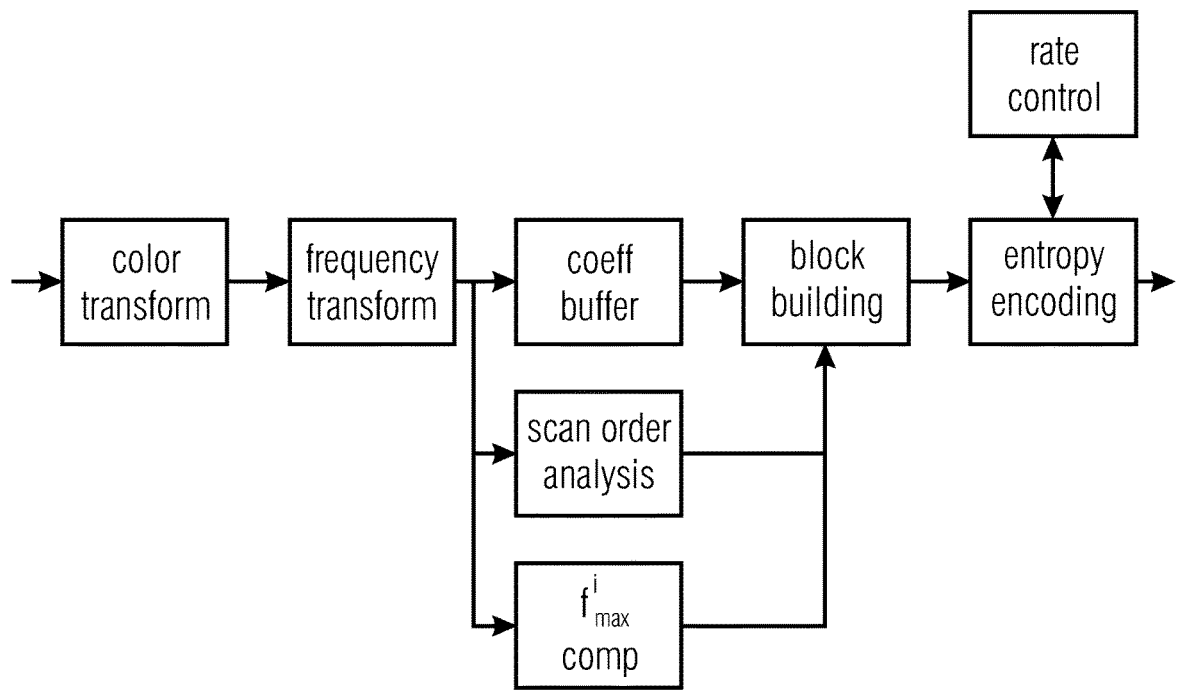
FIG. 3 shows a block diagram of an encoder for encoding a picture or image which may use a transform block encoder in accordance with any of the aspects of the present application in the entropy encoding block.

As illustrated in FIG. 3, this value can be computed while storing the coefficients into a buffer such that they can be put into the correct order.

Encoding starts at the most significant bit plane with zero run disabled. In case no significant bit will appear any more in the current bit plane, and EOP symbol is sent, and encoding continues with the next lower bit plane of the same frequency coefficient. Otherwise, the profile bit is encoded in different ways depending the zero run mode is enabled or not. If zero run-mode is enabled, simply the bit value is output. Otherwise, two bits are used to encode the bit value.

1.4 Profile decoding

In order to be able to decode the profile, the decoder also needs to track a zero run state. In case ZR=1, the decoder simply needs to read one bit in order to determine the value of the next. Otherwise (ZR=0), a two bit symbol needs to be read, possibly prepended by a string of zero-bits with variable length.

1.5 Advantages of the concept described so far are that all (or nearly all) dependencies are within a block, thereby increasing the possible parallelism. No grouping of coefficients is used, thereby reducing possible waste of bits. No negative impact results in case neighboring blocks have very different statistics. However, care should be taken to avoid waste of bits by a hull of a block which is not decaying. Coefficients should be brought into a favorable order.

1.6 Strategies for Encoding the Sign Bits

Besides the profile and the data bits, also the sign bits need to be signaled to the decoder. For this end, two different strategies are possible:

- Whenever a coefficient is included in the profile, immediately emit a sign bit, independently of the coefficient value
- Only encode the sign bit when the quantized coefficient is unequal to zero. While this obviously increases encoding efficiency, it also increases complexity in the decoder due to an additional/longer feedback loop in the decoder. The decoder first needs to decode the coefficient value before it knows whether to read a sign bit or not.

1.7 Controlling the Granularity of Parallelism
1.7.1 General Concept

Given that entropy coding exploits redundancy within a block, but not between blocks (except for possibly the DC coefficient when doing DC prediction), parallel encoding is rather straight forward. Parallel decoding, on the other hand is much more difficult, since the decoder needs to know where a block starts in the bit stream. Two strategies are possible to make this possible:

- Define a fixed coded length per block/slice/unit such that the decoder implicitly knows where to start reading the data for a given unit
- Signal the start of a block/slice/unit by means of length markers or pointers.

Both strategies decrease the coding efficiency:

- Fixed block sizes might cause that a complicated block lacks bit rate, while a simple block disposes of more bits than needed to represent it with sufficient quality
- Length markers or pointers are supplementary information that are only used for parallel, but not for sequential decoding.

Consequently, it is important to control the granularity of parallelism. This is done by the concept of a workgroup. A workgroup is a set of blocks that can only be decoded sequentially. The start of a workgroup, however, can be determined by the decoder without decoding previous workgroups in order to allow sufficient decoder parallelism.

1.7.2 Handling of Color Components

For color images, a pixel consists of three (or even more) samples. These samples are typically processed in parallel by the frequency transform, such that in principle it is also possible to perform entropy encoding and decoding in parallel. Then, however, the entropy decoder needs to be capable to locate the individual color components in the codestream. This means that they need to be placed in different working groups.

Alternatively, blocks belonging to the same spatial region, but different color components can be placed into the same working group. While this simplifies rate control in some cases (see Section 2.3), it increases the memory needed, since then more spatial regions need to be processed in parallel.

Color subsampling is supported by allowing only an even number of blocks for the luminance channel within a workgroup. For each of the chroma channels, only half the number of blocks makes part of the working group.

Figure 4:
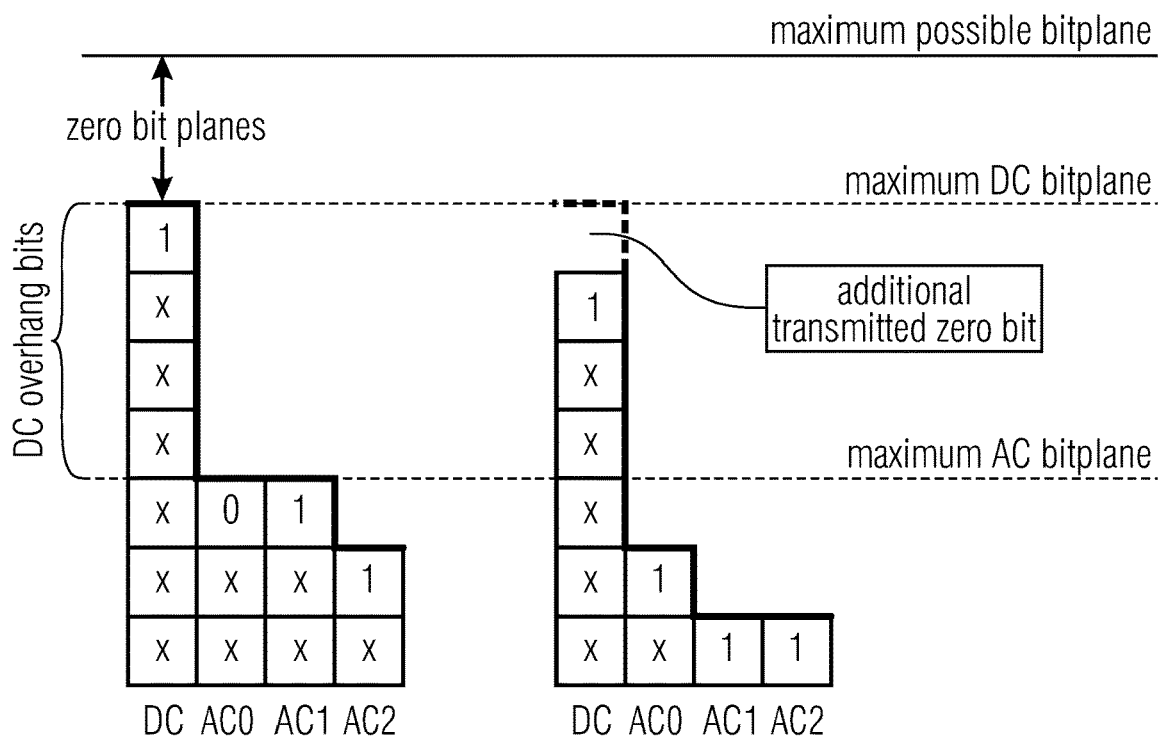
FIG. 4 shows a schematic diagram illustrating an example block configuration for an assumed workgroup or transform block group of here, exemplarily, two blocks (per color component)

1.8 Encoding the Profile of the DC Coefficients
1.8.1 Problem Formulation Frequency transforms, being it a 2D-DCT, or a wavelet transform, have the property to condense the signal energy into the low pass coefficients. Consequently, the DC coefficients have typically much larger values than the other frequency coefficients. This is illustrated in FIG. 4 for two blocks that are assumed to form a corresponding workgroup with one color component only.

In order to allow for proper interpretation, the decoder first of all needs to know the number of zero bit planes. Given that the number of zero bit planes is expected to be similar for neighboring blocks, rate can be saved by signaling this quantity on a workgroup level instead of a block level. This means that the maximum DC coefficient determines the number of bits to transmit for all other blocks (of the same color component) as illustrated in FIG. 4. Moreover, a VLC is typically used for entropy coding.

The next step consists in signaling the profile of the blocks. However, usage of the principles from Section 1.3 would be inefficient, since for every block there is a significant drop in the profile between the DC coefficients and the first AC coefficient. Given that one output bit is used to signal a drop of the profile by one bit plane, this is again not very efficient. Instead, a more efficient representation within the workgroup may be used as outlined in the following.

1.8.2 Proposed Coding Mode

Given that the statistics for the different color channels can be quite different, redundancy in signaling the profile can only be reasonably exploited within a color channel. In case a color channel in a workgroup only contains one block, there is no redundancy that can be exploited. Consequently, normal profile coding as described in section 1.3 can be applied.

This means that in the following we can assume that the workgroup contains at least two blocks for the considered color component. Moreover, our strategy is to only output one variable length code per coefficient, since generation and decoding of VLC codes is relatively expensive in hardware due to the barrel shifters needed (see also Section 4.7).

Let $f_a^i(b, c)$ be the i-th bit of frequency coefficient $f_a$ in block b and color component c of the current workgroup. $f_a^{i=0}(b, c)$ shall be the least significant bit, and $f_0(b, c)$ the DC coefficient. Then the coding algorithm is as follows 1. Compute the maximum number of AC bit planes in the complete workgroup:

$$n_{AC,max} = \begin{cases} 0, & \forall\, a > 0,\, \forall\, b,\, c : f_a(b, c) = 0 \\ \mathrm{argmax}_i(\exists\, a > 0 \wedge \exists\, b, c : f_a^i(b, c) = 1) + 1, & \text{otherwise} \end{cases}$$

2. Compute the maximum number of DC bit planes for all DC coefficients of the first component:

$$n_{DC,0,max} = \begin{cases} n_{AC,max}, & \forall\, b : f_0(b, 0) = 0 \\ \max(\mathrm{argmax}_i(f_0^i(b, 0) = 1 \vee b) + 1,\, n_{AC,max}), & \text{otherwise} \end{cases}$$

3. Signal $n_{max} - n_{DC,0,max}$ with a variable length code, for instance a unary code. $n_{max}$ is the maximum number of bit planes any coefficient can have. All DC coefficients of the first component are assumed to have their most significant bit in bit plane $n_{DC,0,max} - 1$ and are hence refined starting with this bit plane.
4. Emit a variable length code to signal $n_{DC,0,max} - n_{AC,max}$ to the decoder, such that the latter can derive $n_{AC,max}$. By these means, the profile of all AC coefficients of the workgroup can be signaled relative to $n_{AC,max}$.

5. Compute the maximum number of bit planes for all DC coefficients of the remaining components c>0:

$$n_{DC,c,max} = \begin{cases} n_{AC,max}, & \forall b: f_0(b,c) = 0 \\ \max(\mathrm{argmax}_i(f_0^i(b,c) = 1 \forall b) + 1, n_{AC,max}), & \text{otherwise} \end{cases}$$

6. For encoding $n_{DC,c,max}$, two variants are possible:
   Emit a variable length code for $n_{max} - n_{DC,c,max}$
   Emit a variable length code for $n_{DC,c,max} - n_{AC,max}$
   1.8.3 Alternative Coding Mode
   An alternative way for encoding the profile of the DC coefficients is described in the following. It differs from Section 1.8.3 basically in the order by which different parts are signaled to the decoder:
1. Signal $n_{max} - n_{AC,max}$ by a variable length code
2. For every color component, signal $n_{DC,c,max} - n_{AC,max}$ The drawback of this approach is that the decoder needs to decode two variable length codes before it can decode the first DC coefficient. This, however, might have negative consequences on hardware implementations (see Section 3.8.1).

1.9 Scan Pattern Optimization
1.9.1 Problem Formulation

As obvious from Section 1.1, the faster the profile is decaying, the more efficiently a code block can be represented. The form of the profile depends among others on the order by which the frequencies are visited during entropy coding. Thus, the scanning order also determines how fast a code block is decaying.

To this end, consider two extreme cases illustrated in FIG. 5.

The first block consists of a vertical edge. Consequently, a vertical frequency transform can ideally compact the energy into the lowpass coefficients. A subsequent horizontal transform will then show many high frequency coefficients for the vertical low pass coefficients, while the other ones are zero. Similarly, for a horizontal edge, the horizontal transform can condense the signal into the low pass coefficients, such that a subsequent vertical transform will only show large frequencies for the horizontal low pass coefficients.

FIG. 6 exemplarily a corresponding DCT transform of the blocks given in FIG. 5, where shaded squares represent large DCT coefficients, while white squares define DCT coefficients having a value of zero. Obviously, both blocks are not very well represented by the typical zig-zag scan order as illustrated in FIG. 6. Instead, a much better scanning order for a quicker decay of the amplitude is illustrated in FIG. 7.

Consequently, coding efficiency can be significantly improved by defining a set of possible scanning orders, dynamically select them on the encoder side and inform the decoder about this decision. Then both encoder and decoder can use the best possible scanning order in order to reduce the number of bits used to describe a transform block.

1.9.2 Brute Force Selection of the Scanning Order

Let's suppose that we have defined a set of possible scanning orders as motivated in Section 1.9. Then the encoder can obviously perform entropy encoding with each possible scanning order and select that one with the smallest number of bits needed, or the smallest distortion.

The first criterion is only applicable if the entropy coder performs lossless encoding of possibly pre-quantized frequency coefficients. For the more typical scenario of a rate constraint compression as illustrated in FIG. 28, decision of the scanning order needs to base on the smallest distortion.

This can be approximated by selecting the scanning order that includes the largest number of bit planes from a code block for a given bit budget. In case the number of completely included bit planes is the same, the decision needs to be performed based on the included fractional bit planes. A fractional bit plane is a bit plane of a transform block that is only included partially in the codestream.

Given that the typical zig-zag order weights the frequencies accordingly to their (visual) importance, one strategy could consist in selecting that scanning order where the number of contiguously encoded coefficients in the zig-zag scanning order is the largest one. Please note that this does not necessarily select the zig-zag scanning order itself, since it might abort encoding much earlier than a more optimized scanning order.

1.9.3 Heuristic for Selection of the Scanning Order

While brute force selection of the scanning order delivers good image quality, it is typically too complex to be applied in hardware implementations with small footprint. To solve this problem, a measure can be used by the encoder that can select between, e.g. the zig-zag, the predominantly horizontal and the predominantly vertical scanning mode illustrated in FIG. 8. Please note that a block size of 4×4 coefficients has been assumed in the drawing, although other block sizes such as 8×8 are equally possible as well.

If, for instance, the measure is greater than a first certain amount, then the predominantly vertical scanning order shown in FIG. 8(b) could be of advantage.

If the measure is, for instance, smaller than a second certain amount (smaller than the first), then the predominantly horizontal scanning order shown in FIG. 8(c) might be of advantage.

Otherwise, the traditional zig-zag scanning order may be applied.

1.10 Summary

Section 1 has explained some concepts for subsequently exemplified coding schemes. In a nutshell, it exploits that frequency transform coefficients typically show decaying amplitudes. To this end, the profile, being the convex hull of the frequency coefficients is encoded, such that bits lying "outside" of the convex hull do not need to be signaled to the decoder.

Sections 2-4 will now describe three variants of this entropy coding scheme.

2. Bit Plane Based Embodiment

Profile-based entropy coding as explained in Section 1 is most easily applied when encoding the frequency coefficients bit plane by bit plane as done, for instance, in [2]. The following coding scheme renders plane-by-plane based magnitude bit coding more efficient and/or less complex to implement by paying special attention to:
   DC encoding
   Scan pattern adaptation
   Support of different rate control modes (see Section 2.2)
   In more detail, encoding is performed as follows:
1. Signal the selected scan pattern
2. Encode the DC overhang bits as explained in Section 1.8. The DC overhang bits are encoded on a coefficient base. In other words, all overhang bits for a DC coefficient as illustrated in FIG. 13 are placed into the codestream before visiting the next coefficient.
3. Encode the remaining bit planes bit plane by bit plane from MSB to LSB as explained in Section 2.1.

2.1 Bit Plane Coding for a Single Block

In order to explain the bit plane based mode, let's consider the example block illustrated in FIG. 9. It consists of 16 frequency coefficients, with $f_0$ being the DC coefficient.

Furthermore, let's assume that the workgroup containing the block contains 9 AC bit planes (marked by yellow shading), while the block in FIG. 9 only has 8 of them.

Zero bit planes (marked with an orange shading), and DC overhang bits (marked with a gray shading) are handled in a special fashion as described in Section 1.8. Consequently, they shall not be further considered here. Hence, the first bit to encode is bit 8 of frequency $f_0$. Since $f_0$ is already significant in bit plane 8, $f_0^8$ can be simply written into the codestream. Given that all other coefficients $f_k$ are zero in bit plane 8, only an EOP-symbol will be sent before moving to the next bit plane.

In the next bit plane 7, coefficient $f_0$ is refined again by outputting $f_0^7$ into the codestream. Next, profile encoding is performed for coefficients $f_1$-$f_4$ as explained in Section 1.3. Since coefficient $f_4$ gets significant, also its sign bit needs to be output. Finally the bit plane is terminated with an EOP symbol.

In bit plane 6, first coefficients $f_0$-$f_4$ are refined by putting bits $f_0^6$-$f_4^6$ into the codestream. Then profile encoding is continued as explained in Section 1.3. For coefficients $f_6$ and $f_9$, a sign bit needs to be added as well. After profile encoding, the bit plane is terminated with an EOP symbol.

For bit plane 5, bits $f_0^5$-$f_9^5$ are simply output to the codestream, followed by an EOP symbol. Bit plane 6 is handled in a similar way.

When refining bit plane 3 by putting the bits $f_0^3$-$f_9^3$ into the codestream, the sign bits for coefficients $f_5$ and $f_8$ need to be added as well, since both coefficients are getting significant.

2.2 Termination of Encoding and Decoding

Depending on the rate control strategy, different possibilities exist to decide when to stop encoding and decoding.

2.2.1 Bit Plane Based Coding Termination

For the bit plane based coding termination, both encoder and decoder agree on a number of bit planes that should not be transmitted. The number of dropped bit planes can also be expressed by a quantization factor. It can be computed by the encoder and signaled to the decoder on different levels of granularity, such as blocks, workgroups, lines, slices, or even images. Alternatively, the quantization factor can be computed on both the encoder and the decoder side.

In case the codestream layout imposes that the bit stream for a block, workgroup or slice terminates on a byte or word boundary, and the bits generated to include the desired bit plane would leave some spare bits, they can be simply used to refine the next bit plane for a small number of coefficients.

The decoder can detect this situation and is free to decode them or simply skip them for reasons of complexity.

2.2.2 Bit Budget based Coding Termination

In this case, coding termination is not controlled by a target bit plane, but by a target bit rate. This target bit rate can be a constant for the image, or it can be signaled by the encoder to the decoder on different levels of granularity, such as blocks, workgroups, lines or slices. Alternatively, both the encoder and the decoder can compute them in the same manner.

As a result, both the encoder and the decoder know how many bits are available to encode a certain block (or workgroup, see Section 2.3). Consequently, both of them simply stop when this target bit rate is met, which is very simply due to the bit plane based entropy encoding.

2.3 Bit Plane Coding for a Workgroup

Section 2.1 assumed that only a single transform block needs to be encoded or decoded. However, when combined with the bit budget based coding termination, this causes that the target rate needs to be met on a granularity of a block. Given, however, that some blocks might be more difficult to encode than other ones, this would result in low PSNR values, since the difficult block cannot be represented with enough precision.

Consequently, Section 2.3.1 explains how this challenge can be addressed. Then Section 2.3.2 discusses the situation for a bit plane based coding termination.

2.3.1 Bit Budget Based Coding Termination

As explained in Section 2.2.2, encoding and decoding shall be stopped when reaching a certain target bit budget. In the following, we assume that this budget is not given for a single block, but for a complete workgroup. By these means, difficult blocks in the workgroup can consume more bits than simple blocks, leading to an increased overall PSNR value.

Then, however, the question arises, how to distribute the bit budget over the different blocks. This question can be solved by interleaving encoding and decoding of the different blocks. In more detail, bit plane i is encoded in all blocks before moving to bit plane i–1 in any of the blocks. Within a bit plane i, first frequency coefficient $f_k^i$ is encoded for all blocks, before moving to frequency $f_a^i$, a>k in any block.

By these means, the bits are implicitly prioritized and the encoder continues coding the workgroup until the bit budget is exceeded.

7.3.2 Bit Plane based Coding Termination

For the bit plane based coding termination, the distribution of the rate between the different blocks within a workgroup is implicitly defined. Consequently, no interleaving of the different blocks is necessary. The only exception is the filling to the next byte or word boundary.

Here, ideally an interleaving of the frequency coefficients from the different blocks should happen. However, for complexity reasons, it is also possible to simply refine the blocks in sequential order.

2.4 Pseudo Code

The pseudo code of FIG. 10 summarizes the principles and concepts described in Section 1.2-2.3.

2.4.1 Definition of Functions bitplane(b,coeff): Returns bitplane b of coeff (in sign-magnitude representation) sign(coeff): Returns sign-bit of coeff 2.4.2 Encoding The encoding is illustrated in the pseudo code of FIG. 10.

3. Coefficient Based Embodiment with Two Passes 3.1 Problem Formulation

Low complexity compression as addressed by this invention typically targets compression ratios between 1:2 and 1:6.

TABLE 2

Relation between input bit depth and compression rates (bpc = bits per component)

|  | 1:2 | 1:4 | 1:6 |
| --- | --- | --- | --- |
| 8 bits per pixel component | 4 bpc | 2 bpc | 1.33 bpc |
| 10 bits per pixel component | 5 bpc | 2.5 bpc | 1.66 bpc |
| 12 bits per pixel component | 6 bpc | 3 bpc | 2 bpc |

This results in varying target compression rates in bits-per-component as shown by Table 2, ranging from 6 bpc (bits per component) up to 1.33 bpc. A worst cases analysis assuming that an input bit can be represented by a single output bit (like in refinement coding) then leads to the conclusion that a sample needs to be revisited in mean between 6 and 1.33 times when using the bit plane based embodiment of Section 2.

In order to evaluate the impact of this fact, we need to consider in addition the target resolution of 4 k60 fps. This results in a pixel frequency of 4096·2160·60≈531 MHz. Assuming a processing clock of 150-200 Mhz for the entropy coder, this means processing 3-4 pixels or 9-12 samples in parallel. Given that a sample needs to be revisited up to 6 times, this ends up with up to 54-72 instances for the entropy coder. Given that workgroups can only be processed sequentially, 54-72 workgroups need to be buffered.

Table 3 illustrates the resulting memory requirements, expressed in component rows. For instance, a value of 1.5 means that the buffer needs to be sufficiently large to hold 1.5 image rows with 3 components each. Please note that this memory has to be provided in addition to the memory used to perform the frequency transform.

TABLE 3

Number of component rows that need to be buffered in order to achieve sufficient throughput. Workgroup sizes are 64, 128 and 256 pixels.
Memory in component rows

| Zellenbeschrift- ungen | Spaltenbes 3 parallel units per comp | | | | 4 parallel units per comp | | | | Overall |
|---|---|---|---|---|---|---|---|---|---|
| | 64 | 128 | 256 | Max | 64 | 128 | 256 | Max | max |
| 8 bits per input comp | 0.5625 | 1.125 | 2.25 | 2.25 | 0.75 | 1.5 | 3 | 3 | 3 |
| 1:6 | 0.1875 | 0.375 | 0.75 | 0.75 | 0.25 | 0.5 | 1 | 1 | 1 |
| 1:4 | 0.28125 | 0.5625 | 1.125 | 1.125 | 0.375 | 0.75 | 1.5 | 1.5 | 1.5 |
| 1:2 | 0.5625 | 1.125 | 2.25 | 2.25 | 0.75 | 1.5 | 3 | 3 | 3 |
| 10 bits per input comp | 0.703125 | 1.40625 | 2.8125 | 2.8125 | 0.9375 | 1.875 | 3.75 | 3.75 | 3.75 |
| 1:6 | 0.234375 | 0.46875 | 0.9375 | 0.9375 | 0.3125 | 0.625 | 1.25 | 1.25 | 1.25 |
| 1:4 | 0.3515625 | 0.703125 | 1.40625 | 1.40625 | 0.46875 | 0.9375 | 1.875 | 1.875 | 1.875 |
| 1:2 | 0.703125 | 1.40625 | 2.8125 | 2.8125 | 0.9375 | 1.875 | 3.75 | 3.75 | 3.75 |
| 12 bits per input comp | 0.84375 | 1.6875 | 3.375 | 3.375 | 1.125 | 2.25 | 4.5 | 4.5 | 4.5 |
| 1:6 | 0.28125 | 0.5625 | 1.125 | 1.125 | 0.375 | 0.75 | 1.5 | 1.5 | 1.5 |
| 1:4 | 0.421875 | 0.84375 | 1.6875 | 1.6875 | 0.5625 | 1.125 | 2.25 | 2.25 | 2.25 |
| 1:2 | 0.84375 | 1.6875 | 3.375 | 3.375 | 1.125 | 2.25 | 4.5 | 4.5 | 4.5 |
| Overall max | 0.84375 | 1.6875 | 3.375 | 3.375 | 1.125 | 2.25 | 4.5 | 4.5 | 4.5 |

Table 4 illustrates the number of parallel accesses to this memory. They need to be compared to the number of RAM modules used without any parallel access. Assuming a memory block size of approximately 16 kbits [3] as available in modern FPGAs, and 14 bits per DCT coefficient for 8 bit input images (including the gain of the color and the frequency transform), a single component row uses approximately 4 memory blocks. For all components, 12 memory blocks are thus sufficient, which is slightly less than the parallelism needed.

TABLE 4

Number of entropy coder instances

| Maximum von instances parallel units per comp Zeilenbeschriftungen | 3 | 4 |
|---|---|---|
| 8 bits | 36 | 48 |
| 0.166666667 | 12 | 16 |
| 0.25 | 18 | 24 |
| 0.5 | 36 | 48 |
| 10 bits | 45 | 60 |
| 0.166666667 | 15 | 20 |
| 0.25 | 22.5 | 30 |
| 0.5 | 45 | 60 |
| 12 bits | 54 | 72 |
| 0.166666667 | 18 | 24 |
| 0.25 | 27 | 36 |
| 0.5 | 54 | 72 |
| Overall Max | 54 | 72 |

Consequently, for better hardware efficiency the throughput per entropy encoder needs be improved, which is subject to the next subsections.

3.2 General Strategy

From Table 2 it gets obvious that the bit plane based approach is particularly problematic for low compression ratios, since a coefficient needs to be revisited multiple times. As however a 1:2 compression leads to particularly good image quality, which allows much more subsequent editing operations than a 1:4 or even 1:6 compression, having a codec that also supports these operation points is very important.

This can be achieved by switching from the bit plane to a coefficient based approach. The goal is to ideally consider each coefficient only one time. Unfortunately, this is very difficult to achieve. However, at least the number of times a coefficient needs to be revisited can be bounded and made independent of the compression ratio.

The following subsections will describe a corresponding approach that can be used for bit budget based rate control as explained in Section 2.3.1. Section 4 then details an approach that is better suited for quantization based rate control as explained in Section 2.3.2.

3.3 Solution Concept for a Single Block

In the proposed solution, entropy coding of a block is performed in two passes. In the first pass, only the profile of a block is encoded without emitting any refinement bits (bits without shading in FIG. 9). The second pass (refinement coding) then outputs all refinement bits.

For a more detailed explanation, let's reconsider the block shown in FIG. 9. Again, zero bit planes (marked with an orange shading), and DC overhang bits (marked with a gray shading) are handled in a special fashion as described in Section 1.8. Consequently, they shall not be further considered here. Hence, the first bit to encode is bit 8 of frequency $f_0$. Since this bit however represents a refinement bit, it is not taken into account during the first coding pass. Instead, profile coding is started by outputting an EOP symbol in order to terminate bit plane 8.

Next, profile coding continues in bit plane 7 by considering frequency coefficients $f_1$-$f_4$ in the same way as explained in Section 1.3. Then, bit plane 7 is terminated by means of an EOP symbol.

The encoder continues this operation until the target bit budget which it is aware of is exceeded. To this end, it is important to notice that the encoder can easily determine the number of refinement bits used when terminating a bit plane. For instance, when terminating bit plane number 8, the encoder knows that in bit plane 7, only frequency coefficient $f_0$ needs to be refined. Hence, before starting to encode the profile in bit plane 7, the encoder needs to allocate one bit for $f_0^7$, although the latter is not directly output to the codestream.

Similarly, terminating bit plane 7, the encoder needs to allocate refinement bits for coefficients $f_0$-$f_6$ before starting to encode the profile of bit plane 6.

By these means, while encoding the profile, the encoder can track how many bits will be used including the refinement bits needed. Consequently, it can simply stop profile encoding, when the target bit budget is exceeded. Next, it simply outputs for every coefficient the number of refinement bits needed.

Overall, every coefficient needs to be revisited twice at most when assuming, that for every bit plane the maximum contributing frequency is computed beforehand as illustrated in FIG. 5.

Since each time a coefficient is visited at least one bit is output, for lower compression ratios, not all coefficients need to be revisited twice. For instance, when having an 8-bit input image and a compression ratio of 1:6, in the worst case each sample needs to be visited 1.33 times in mean. Consequently, encoding will be done much faster than for the bit plane based approach, because when refining a coefficient, much more bits can be output.

In order to interpret the codestream, the decoder decodes the profile and tracks the number of refinement bits needed in the same way than the encoder did. Moreover, it is also aware of the available bit budget for the current block. Consequently, the decoder knows when to stop profile decoding and interprets the remaining bits as refinement bits.

3.4 Sign Bit

The attentive reader might have observed that Section 3.3 did not discuss the sign bits. Ideally, a sign bit is only transmitted when the quantized coefficient is unequal zero. While for the encoder it is easily possible to determine exactly, when a sign bit needs to be emitted, the decoder cannot derive this information when decoding the profile, since the refinement bits will follow much later. This, however, is problematic, since during profile coding and decoding, also decision about coding abortion is performed, and this decision needs to be identical on encoder and decoder side.

In order to solve this problem, there exist two different strategies:
1. Whenever a coefficient is included in the profile, also allocate a sign bit. By these means, a corresponding worst case analysis is performed, since some of the coefficients will never get significant, and hence theoretically do not need any sign bit.
2. When performing profile coding, only allocate a sign bit for the coefficients whose profile bit is one. Allocate a sign bit for the other coefficients when they are first refined, independent what the refinement value is. Please note that this option is much more difficult to implement in hardware.

When doing the actual refinement coding, this sign bit might then indeed be emitted for every coefficient. Alternatively, the sign bit can be omitted when the quantized coefficient is zero. Then the block will not completely consume the available bit budget. Depending on the rate control, this bit budget can be allocated to the next block, or it can be used for refining some more coefficients. However, such an approach will significantly increase complexity.

Please note that the sign bit can be easily omitted for coefficients where already from profile coding it is obvious that the value will be zero (coefficients $f_{13}$-$f_{15}$ in FIG. 9).

3.5 Fractional Bit Planes

Assuming that every coefficient will have an associated sign bit (except when profile coding already signals them as zero), both encoder and decoder can predict exactly how many bits will be needed for both profile and refinement coding. This allows generating so called fractional bit planes.

Let's consider again FIG. 9 and assume that the encoder has just terminated bit plane 5. Let's furthermore assume that only 3 bits are left from the bit budget. Then both encoder and decoder can derive that for bit plane 4, only bits $f_0^4$-$f_2^4$ are included into the codestream. Hence, bit plane 4 is only reproduced partially, thus called fractional.

3.6 Encoding a Workgroup

The concept described so far assumed encoding of a single block. Consequently, the rate constraint needs to hold for a single block. As already discussed in Section 2.3, this might lead to reduced image quality in case not all blocks are of the same complexity.

Instead, the rate is better distributed within a workgroup. This can be achieved as described in the following.

3.6.1 Interleaving of Frequency Coefficients

In accordance with Section 2.3.1, the bit budget can be distributed between blocks by interleaving the frequencies of different blocks. To this end, the profile is encoded bit plane by bit plane. Moreover, within a bit plane, the profile is encoded frequency by frequency instead of block:

```
for bitplane bp = maxACbitplane -1 downto 0
    for each frequency f_i in increasing order
        foreach block b in current workgroup
            if f_i^bp of block b belongs to profile
                Emit profile bits for f_i of block b
            end if
        end for
    end for
    allocate refinement bits
end for
```

Only when all blocks of a workgroup have terminated a bit plane bp, the corresponding refinement bits are allocated. In case the bit budget is not sufficient to refine all blocks completely, the available bit budget needs to be distributed among the blocks. In this case, the rate control ideally solves the following problem: Given a workgroup consisting of n blocks with m frequencies, and the profile has been encoded till bit plane b for all blocks. Then find two numbers $n_1 \in [1, n]$ and $0 \le k < m$, such that for $n_1$ blocks all frequencies $f_i \le f_k$ having been included in the coded profile are refined until bit plane b−1 and for n−$n_1$ blocks, all frequencies $f_i \le f_{k-1}$ having been included in the coded profile are refined only till bit plane b.

Since this causes a certain complexity for hardware implementation, an alternative solution consists in attributing the refinement bits in a first-come-first-served basis. Start with the first block and allocate the refinement bits needed. Then continue with the next block until the bit budget is exceeded.

3.6.2 Encoding without Frequency Interleaving

Interleaving the frequencies as explained in Section 3.6.1 is rather complex to implement in hardware. The reason is that the hardware implementation needs to process one sample per clock. However, finding the block and frequency to process next is not obvious.

In order to solve this challenge, it is important to notice that the unique reason for interleaving the frequencies of the different blocks are a precise rate control. In fact, all blocks shall a priori be refined until the same bit plane, and the remaining bit budget should then be attributed to the "important" coefficients. In this context, the lower is the frequency, the more important is a coefficient. Moreover, coefficients that are signaled as zero by the profile coding should obviously be excluded from the refinement.

However, if this constraint is relaxed, it is also possible to process all frequencies of a block in a given bit plane before switching to the next bit plane:

```
for bitplane bp = maxACbitplane -1 downto 0
    foreach block b in current workgroup
        for each frequency f_i in increasing order
            if f_i^bp of block b belongs to profile
                Emit profile bits for f_i of block b
            end if
        end for
    end for
    allocate refinement bits
end for
```

Such an organization has the huge benefit of allowing high performance implementations as explained in Section 4.7.

3.7 Pseudo Code for the Encoder

The concepts described in the previous sections are clarified in the following by corresponding pseudo code assuming frequency interleaving. Moreover, it uses a the most simple sign bit allocation in that every coefficient being included into the profile coding will contain a sign bit (see also Section 3.4). In addition, refinements bits are allocated in a first-come-first-served method as described in Section 3.6.1. For reasons of simplicity, the special handling of DC coefficients is excluded from the pseudo code.

3.7.1 Input coeff[b][f]: Coefficient for block b, frequency f maxFreq[b][bp]: contains $f_{max}^{bp}$ for block b as defined in Equation (6-1)

maxNumACBitplanes: maximum number of AC bit planes in current workgroup (see Section 6.9)

bitbudget: Bit budget available for workgroup 3.7.2 Variables

```
// Maximum frequency for a given bit plane per block
Dim maxFreq[#BlocksPerWorkingGroup][#bitplanes] = {-1};
// which frequency has been encoded last
Dim tailPos[#BlocksPerWorkingGroup] = {-1};
// Indicates whether the current bit plane is in run mode, assuming that
// it contributes to the profile encoding
Dim zeroRun[#BlocksPerWorkingGroup] = {0};
```

3.7.3 Encode Working Group

The pseudo code is depicted in FIG. 11.

3.8 Pseudo Code for the Decoder 3.8.1 Input maxNumACBitplanes: maximum number of AC bit planes in current workgroup (see Section 1.8)

bitbudget: Bit budget available for workgroup 3.8.2 Definitions

Function peekBits(n) returns n bits from the buffer, but does not remove them from the buffer Function readBits(n) returns n bits from the buffer, and removes them from the buffer sign(coeff[c][b][f]) represents the sign associated with coeff[c][b][f]

abs(coeff[c][b][f]) represents the absolute value of the coefficient coeff[c][b][f]

3.8.3 Variables

```
// Maximum frequency for a given bit plane per block
Dim maxFreq[#BlocksPerWorkingGroup][#bitplanes] = {-1};
// Maximum frequency coded for a block
Dim tailPos[#BlocksPerWorkingGroup] = {-1};
// Indicates whether the current bit plane is in run mode, assuming that
// it contributes to the profile encoding
Dim zeroRun[#BlocksPerWorkingGroup] = {0};
```

3.8.4 Decode Working Group

The pseudo code for the decoder is depicted in FIG. 12.

4. Coefficient Based Embodiment with one Pass 4.1 Problem Formulation

While the bit plane based embodiment of Section 2 delivers good coding performance, it suffers from limited performance, in particular for small compression ratios like 1:2. This is solved by the coefficient based approach from Section 3, in that the maximum number of times a coefficient needs to be revisited is bounded to two.

Unfortunately, the control flow is still rather complex due to frequency interleaving as discussed in Section 3.6.1. But even when avoiding frequency interleaving as described in Section 3.6.2, profile coding needs to interleave between blocks, since profile encoding needs to be in descending bit plane order. Finally, rate control is combined with profile coding, which complicates flexible rate control schemes that distribute rate between different workgroups. In addition, control flow within the entropy coder is getting more complex.

In the following an alternative approach is presented that clearly distinguishes between rate control and entropy coding. The actual entropy coding is performed in one single pass. The rate control beforehand, on the other hand can easily be run in parallel, simplifying thus the hardware implementation.

3.2 Solution Concept

FIG. 13a illustrates the proposed overall block diagram for a coefficient based entropy coding. It differs from FIG. 28 in that the rate control is not performed during entropy encoding, but is a preprocessing step needed. Given that the rate control needs to know the correct order of the frequencies, it operates after the frequency coefficient reordering (entitled as block building in FIG. 13a).

Instead of a bit budget driven termination of the coding as discussed in Section 3, a bit plane based coding termination is applied. In other words, the decoder is informed about the performed quantization in terms of number of dropped bit planes. Signaling of the quantization factor can be achieved in the same manner than described in [4].

The number of dropped bit planes needs to be computed by the rate control. This rate control can work on a block or workgroup level. Alternatively, it can even consider multiple working groups, such as a complete line of working groups. In the following, we use the term rate control group to define the set of coefficients on which the rate control is operating. Given that rate control is quite simple (see Section 4.3) it can be run in parallel for all blocks within a rate control group. Hence, a single rate control block can maintain a high throughput. Moreover, given that the result of the rate control is signaled to the decoder, sign bits can be handled in a precise manner in that sign bits are only emitted when the coefficient value is not zero.

Once the entropy coder knows the desired quantization step size, entropy coding can happen on a coefficient base. First the entropy coder encodes the profile information for the current coefficient as explained in Section 1.3. Then it can immediately output the refinement bits, since the target quantization is already known before moving to the next coefficient.

Please note that the refinement bits can be interleaved with the profile bits, or they can be put into separate FIFOs and then output sequentially. The latter option simplifies execution on GPUs due to better parallelism. Moreover, it allows unequal error protection of the codestream, in that the profile bits are better protected than the data bits, since a bit error in the data bits only have a local impact, while a bit error in the profile bits causes decoding-errors in large pixel areas. On the other hand, slightly larger output buffers are used. In fact, without separating profile and refinement bits, a single entropy coder instance would not need any output buffer. On the other hand, as soon as multiple entropy coder instances are used, an output buffer is needed in any case. The only difference is that for separate output of profile and refinement bits, two instead of one buffer per entropy coder instance are needed. This, however, is not a big problem. For instance, in case throughput considerations allow for, even the same memory block can be used, when profile bits are stored with increasing addresses, starting at memory address zero, and refinement bits are stored with decreasing addresses, starting at the largest possible memory address. Moreover, the number of profile bits is bounded, since only one or two profile bits can be output per coefficient plus the EOP symbols used, which are bounded by the bit depth of the coefficients.

4.3 Fractional Bit Planes
4.3.1 Problem Formulation

With the insights of Section 1.5, the rate control of FIG. 13a is simple as long as all coefficients are quantized with the same quantization factor. This is equivalent to deciding whether a complete bit plane can be included or not.

FIG. 13b illustrates a corresponding example for a workgroup consisting of two frequency transform blocks. For every block, the rate control decides until which bit plane the bits can be included.

Consequently, for all blocks the bits bounded by a bold line are included. Moreover, the quantization factor for both blocks is typically set equal.

By these means, only a very limited set of quantization points need to be checked, making it easy to implement it in hardware and software. However, on the other hand, quantization is rather coarse. Consequently, typically the rate associated to a workgroup cannot be met exactly, limiting the PSNR coding performance.

The following subsections discuss a couple of strategies how to solve this issue.

4.3.2 Propagation of the Rate to the Next Rate Control Unit

Bits that are not used in one rate control group will be passed to the next rate control group.

Advantageously, this is simple to implement.

Disadvantageously, at the end of the image, there might be some bits left that cannot be used, and this propagation concept may not be possible when every block should have a strictly fixed size. Further, this may increase the end-to-end latency of the system, since an additional smoothing buffer is used, and it may limit parallelism on encoder side.

4.3.3 Refinement Based on Budget Signaling or Tracking

The rate control can compute the number of bits that will not be used for a rate control group.

If both the encoder and the decoder know this number, they can refine some coefficients with an additional bit plane and stop this additional refinement when the extra bits are completely used.

Advantageously, this also works when every block should have a strictly fixed size.

Disadvantageously, an ideal solution would use frequency interleaving between blocks. In case the decoder cannot derive the bit budget available for refinement bits, they need to be explicitly signaled, thereby causing a corresponding overhead: In the worst case, one data bit needs to be encoded with 3 bits. Having for instance a working group with three color components and four 4×4 DCT blocks, the maximum number of bits that are not allocated by the rate control when only considering complete bit planes equals 3·4·4·3−1=575 bits. Encoding such a number uses 10 bits. Assuming a target compression of 4 bits per pixel, a workgroup consists of 4·4·4=256 bits, such that the overhead is 3.9%. In case a workgroup consists of 16 DCT blocks, the overhead is only 1.2%

4.3.4 Use of Separate Output Buffer

In this case, the refinement bits are placed in a separate buffer and append later on to the bit stream. Then the decoder can decode them in a second phase. Since the decoder does not need any rate control phase, the number of phases in encoder and decoder is identical.

Advantageously, no signaling overhead is needed.

Disadvantageously, this complicates the decoder design in terms of, for example, hardware resources and memory. An additional buffer may be used at the encoder side.

4.4 Pseudo Code for Encoder

In order to clarify the descriptions of the previous sections, they are detailed in the following subsections by means of pseudo code. For the creation of fractional bit planes, the concepts of Section 4.3.3 are used.

In order to keep the code as simple as possible, the special handling of the DC coefficients as explained in Section 1.8 is not included, but it could be.

4.4.1 Definitions sign(coeff[c][b][f]) outputs the sign associated with coeff [c][b][f]

abs(coeff[c][b][f]) outputs the absolute value of the coefficient coeff[c][b][f]

4.4.2 Input to the Function coeff[c][b][f]: Coefficient for component c, block b, frequency f maxFreq[#components][#blocks][#bitplanes]. Signals for every bit plane and every block the maximum contributing frequency. If the complete bit plane is zero, the value equals−1.

lsbNumber: Result of the rate control defining to which bit plane the data are included remainingExtraBits: Number of bits left by the rate control that can be used for additional refinement

4.4.3 Variables

```
// stop when block has been finished
Dim BlockFinished[#components][#blocksPerWorkingGroup] = {0};
// Currently processed profile bit plane
Dim currentProfileBitplane[#components][#blocksPerWorkingGroup];
// Indicates whether the current bit plane is in run mode, assuming that
// it contributes to the, profile encoding
Dim zeroRun[#components][#blocksPerWorkingGroup] = {0};
```

4.4.4 Encoding a Workgroup with Precise Fractional Bit Planes

The pseudo code is depicted in FIG. 14A-D.

4.5 Pseudo Code for Decoder

4.5.1 Definitions

Function peekBits(n) returns n bits from the buffer, but does not remove them from the buffer Function readBits(n) returns n bits from the buffer, and removes them from the buffer

4.5.2 Input to the Function lsbNumber: Result of the rate control defining to which bit plane the data are included remainingExtraBits: Number of bits left by the rate control that can be used for additional refinement

4.5.3 Decoding a Workgroup with Precise Fractional Bit Planes

The pseudo code is depicted in FIG. 15.

4.6 Simplification of Fractional Bit Plane Encoding

Pseudo code marked at 10 in FIGS. 15 and 16 are related to fractional bit plane coding. For the encoder in particular, they contribute in a significant extend to the resulting complexity.

This can be prevented by using the bit budget for fractional coding only for refinement bits, but not for profile bits. In other words, fractional bit plane coding stops when reaching the hatched shaded bits in FIG. 13b.

4.6.1 Encoding a Workgroup with Limited Fractional Bit Planes

The pseudo code is depicted in FIG. 16A-C.

4.6.2 Decoding a Workgroup with Limited Fractional Bit Planes

The pseudo code is depicted in FIG. 17A-C.

4.7 Throughput Considerations and Codebook Reinterpretation

For high-speed hardware implementations, it is important that during both profile and refinement encoding, one coefficient can be processed per clock cycle. Thanks to the fact, that the codec operates coefficient by coefficient, this is indeed possible as explained in the following.

For refinement coding only the correct number of raw bits need to be output. Consequently, the throughput constraint is rather easily fulfilled for refinement coding.

For profile coding, coding of AC and DC coefficients need to be distinguished.

4.7.1 AC Coefficient Coding

For high performance hardware implementations, it is important to process only one variable length code word per clock cycle. Fortunately, this is easily possible by reinterpretation of the coding alphabet shown in Table 1.

When encoding the profile of coefficient $f_a$, and zero run state is active, a fixed code word of one bit needs to be emitted or read per coefficient. This is obviously trivial.

When encoding the profile of a coefficient $f_a$, and zero run state is not active, then the codeword consists of a variable number of zero bits, followed by a separating one-bit, followed by the bit value as depicted in FIG. 18.

The leading zeros correspond to EOP symbols. Their number hence determines how many bit planes need to be terminated and varies between zero and $n_{max}$, where $n_{max}$ is the maximum number of bitplanes a coefficient can have. These leading zero bits are separated by a one bit, before the value of the profile bit follows.

Thanks to this simple codeword structure, a high performance implementation is easily possible.

4.7.2 DC Coefficient Coding

Coding of the profiles is also easy. In case a workgroup consists only of one block per color component, the profile for a DC coefficient is simply a variable length code for the number of zero bit planes. In case the workgroup consists for more than one block per color, the number of zero bit planes is only signaled once for all DC coefficients of a component. In addition, the number of maximum AC bit planes need to be signaled. However, all together, less than one variable length code word per DC coefficient is used, enabling a high throughput implementation as well.

4.8 Limitation of Code Word Length

The maximum size of the variable codeword described in Section 3.8.1 equals $n_{max}+2$ bits. Since longer codewords use larger barrel shifters in hardware, the maximum codeword size can be limited by introduction of a clipping threshold. Let x be the number of EOP symbols to encode. Then instead of outputting x zero bits, followed by a one, the following variable length code can be applied:

---

If x < x0
  Output x zero bits, followed by a one bit
Else
  Output x0 zero bits, followed by a one bit, followed by x-x0 in binary representation

---

5. The above sections presented a motivation of the usage of the concept of coding the magnitude bits of spectral coefficients of a transform block in a manner distinguishing between profile on the one hand and magnitude bits enveloped by the profile on the other hand, and provided, in Sections 2 to 4, examples of how to exploit the concept of the separate coding of profile on the one hand and magnitude bits enveloped by the profile on the other hand, in a manner allowing for a less complex implementation of an encoder and decoder and/or an increase in coding efficiency. In the following, certain aspects applied in Sections 2 to 4 are specifically made the subject of embodiments described further below. Insofar, the embodiments for the encoder and decoder described below represent abstractions of the specific details set out in Sections 2 to 4. In order to alleviate associating the subsequently explained embodiments with the embodiments set out in Sections 2 to 4, the description outlined below contains references to Sections 2 to 4.

FIG. 19 shows a transform block encoder in accordance with an embodiment which uses the first aspect of the present application. The encoder is generally indicated using reference sign 12 and receives the transform block to be encoded. The transform block is indicated using reference sign 14. It is a block of spectral coefficients 16. The transform block 14 describes a spectral decomposition of a corresponding spatial block 18 of samples 20. The spectral decomposition 22 may, for instance, be a DCT leading, for example, to an n×n block 14 of coefficients 16, the coefficients 16 arranged in an array of columns and rows, wherein coefficients 16 arranged at a certain column correspond to a corresponding horizontal spatial frequency of the content of block 18, while coefficients 16 within a certain row of block 14 correspond to a certain corresponding vertical spatial frequency. Alternatively, the spatial decomposition 22 may, for instance, be a subband decomposition like a wavelet transform as depicted in FIG. 29. The corresponding inverse transformation, i.e. the spectral composition 24, may be applied at the decoding side to recover or reconstruct the content of block 18 on the basis of the transform block 14. As illustrated in FIG. 19 at the top right hand corner, sample block 18 may, in fact, merely be one of several blocks into which image or picture 26 is subdivided and all or a subset thereof might have been subject to spectral decomposition 22 in order to result into further transform blocks 14. Encoder 12 may code all of them or a subset thereof, into one data stream. FIG. 19 illustrates the exemplary case where the subdivision into sample blocks 18 is done regularly into sample blocks 18 of equal size, arranged in rows and columns, but a subdivision into blocks of different size in accordance with, for instance, a multi-tree subdivision, such as a quadtree subdivision, might be applied as well. As discussed later on, transform block 14 may be part of a transform block group 28. In coding the transform blocks of such a group 28, encoder 12 may apply some coding setting commonly. Later on, some examples mention, for instance, a commonly used predetermined bit plane. In FIG. 19 it has been illustrated that such a transform block group 28 may be composed of transform blocks corresponding to sample blocks within a certain row of image 26, but this is also merely an example and transform block groups may be defined differently with the definition being agreed between encoder and decoder by definition or by signalization from encoder to decoder, respectively. The latter issue also applies to the image's subdivision into sample blocks which may be agreed between encoder and decoder by definition or by signalization from encoder to decoder.

For the sake of completeness, it is noted that in case if the transform block 14 representing the result of a subband spectral decomposition 22 such as a wavelet transform, block 14 is, for instance, of size n×n with $n=2^N$. A set of $2^{(N-l)} \cdot 2^{(N-l)}$, registered to one corner of block 14, would represent, for example, the lower frequency portion of subband l in x and y. This set or subarray would represent a quadrant of a subarray of subband l which comprises three further subarrays of size $2^{(N-l)} \cdot 2^{(N-l)}$ of spectral coefficients of subband l concerning a higher frequency portion of subband l in the horizontal direction and/or vertical direction. The 2×2 array of these subband l subarrays would then, in turn, represent a quadrant of an even larger subarray of block 14, the other three quadrants of which would represent subarrays of size $2^{(n-l+1)} \cdot 2^{(N-l+1)}$ and relate to subband l−1 and so forth.

As already denoted above, the encoder 12 is for encoding transform block 14 into a data stream. The data stream is illustrated in FIG. 19 at reference sign 30. As will be outlined in more detail below, encoder 12 may be configured to encode more than one transform block into data stream 30. In doing so, encoder 12 may share some settings as will be described further below, but preliminarily encoder 12 and its functionality shall be described with respect to the encoding of transform block 14 only.

Encoder 12 is configured to code magnitude bits of spectral coefficients of transform block 14. That is, encoder 12 receives, or converts inbound spectral coefficients 16 into, a sign and magnitude representation. The sign is optional is, accordingly, not further taken into account in the following description of the encoder as well as with respect to the decoder described hereinafter. In order to efficiently code the magnitude bits, encoder 12 codes the magnitude bits by describing their distribution of zeros and ones in a matrix 32 in which the magnitude bits 34 of the spectral coefficients 16 are arranged, or into which the magnitude bits 34 are entered, column-wise with the spectral coefficients 16 of the transform block 14 ordered along a row direction 36 of the matrix 32. By dashed lines 38, FIG. 19 illustrates, for instance, the magnitude bits 34 belonging to a certain spectral coefficient 16. They form one column of matrix 32. In particular, they form the third column of matrix 32, as the respective spectral coefficient 16 is the third one along a scan order 40 used to sequentialize the two-dimensional arrangement of spectral coefficients 16 in block 14. In the same sense, all coefficients have their magnitude bits forming one column of matrix 32, namely the $i^{th}$ column with i denoting the rank of the coefficient in scan order 40. As described above, the scan order 40 may, for instance, lead from the DC spectral coefficient to the coefficient of highest frequency of block 14 and may be fixed or may be varied with the scan order selected being signaled by encoder 12 within data stream 30. The selection may be made in a brute force manner to select the scan order leading to an optimum weight/distortion ratio, or may be performed on the basis of some appropriate measure measuring the compactness of the transform block's spectral coefficients' energy along a certain area such as a measure measuring a predominance of vertical edges and/or horizontal edges within this corresponding spatial block 18. Along column direction 42, the magnitude bits 34 of matrix 32 may be ordered from most significance to least significance.

It should be noted here that encoder 12 may or may not be provided with, or have access to, block 14 in a manner where the transform coefficients' magnitude bits 34 are already arranged in a manner so as to correspond to matrix 32. If not, encoder 12 takes the order of the block's 14 spectral coefficients 16 in accordance with the scan order 40 into account when coding the magnitude bits of the spectral coefficients in the manner outlined further below.

When implementing encoder 12 in a manner complying with a first aspect of the present application, the encoder 12, in encoding the magnitude bits 34 of the spectral coefficients 16 into data stream 30, performs the coding of first magnitude bits of the spectral coefficients 16 into the data stream 30 first before coding second magnitude bits of the spectral coefficients 16 into data stream 30. The first magnitude bits were illustrated using hatching in FIGS. 1 and 9, which figures illustrated examples for matrix 32. First magnitude bits are thus also illustrated in FIG. 19 using hatching. Thus, first magnitude bits form a profile 44 in matrix 32, which envelops non-zero magnitude bits of the spectral coefficients 16 in matrix 32. As explained above, encoder 12 may be configured such that profile 44 contains one magnitude bit up to a certain spectral coefficient along scan order 40, so that no non-zero magnitude bit of the spectral coefficient 16 lies at a more significant side of profile 44 and so that profile 44 is convex so as to, along row direction 36, maintain the bit plane of the magnitude bit of the profile 44 of the immediately preceding spectral coefficient, or fall onto a lower significant bit plane. Moreover, advantageously, encoder 12 defines profile 44 to be, in terms of bit plane significance, the least significant profile line fulfilling the just mentioned constraints. As depicted in FIGS. 1 and 9, profile 44 may thus contain some of the spectral coefficients' most significant non-zero bits.

Besides coding the first magnitude bits 46 which form profile 44, encoder 12 codes second magnitude bits of the spectral coefficient 16, with these second magnitude bits being ones residing in the matrix 32 beneath, i.e. at a lower significance side of, profile 44. In FIG. 1, for instance, the second magnitude bits may be all or a subset of the non-shaded magnitude bits and the same applies to FIG. 9. Which fraction of the magnitude bits beneath the profile 44 are coded in data stream 30 may be determined on the basis of rate control, as already described above and as further illustrated below.

Before describing an embodiment for a decoder fitting to the encoder of FIG. 19, it is briefly described how encoder 12 could code the first and second magnitude bits. One of the first magnitude bits is illustratively denoted in FIG. 19 using reference sign 46, and in a like manner, reference sign 48 representatively indicates one of the second magnitude bits.

As already noted above, encoder 12 may code profile 44, and the magnitude bits 46 forming the same, using symbols which might be code words of a variable length code. An example of such code words has been set out above with respect to Table 1 and the usage and mode of operation in order to code profile 44 using these symbols has been described with respect to FIG. 2. Briefly repeating this description, encoder 12 may be configured to perform the coding of the first magnitude bits 46 which form the profile 44 in a manner traversing matrix 32 along column direction 42 pointing from higher to lower significance bit planes and along row direction 36 along which the coefficients 16 have their magnitude bits arranged in columns generally in an order leading from lowest to highest frequency. The encoder may issue, or code into data stream 30, the aforementioned symbols so as to code or describe profile 44, in a bit plane by bit plane manner, with starting at some, with respect to the profile coding, most significance bit plane. The start of the profile coding (and accordingly profile decoding at decoding side) could, for example, take place at the magnitude bit of the first coefficient in scan order, in the most significant bit plane. Later on, it is emphasized that the profile bit and enveloped refinement bit coding may be restricted to a certain subset of coefficient, such as the AC coefficients, as well as to bit planes below a certain non-profile bit plane set, in which case this upper left starting magnitude bit may be the most significant magnitude bit of the leading coefficient if the just-mentioned coefficient subset in scan order. If the currently traversed magnitude bit is one, 50 (compare FIG. 2) and the zero-run-mode is currently deactivated, 52, then as indicated at the sequence of no paths resulting from checks 50 and 52, symbol ONE is output at 54 and the profile coding continues with the next magnitude bit of the current row of matrix 32 as indicated at 56. Likewise, symbol SZR is output 58 in case of zero-run-mode being deactivated and the currently traversed magnitude bit being zero. In this case, the zero-run-mode is activated 60 and the profile coding is continued with respect to the next magnitude bit in the current row at 56. Should the zero-run-mode be activated as indicated at the yes path emerging from check 52, with the currently traversed magnitude bit being zero as checked in step 62, encoder 12 outputs 64 symbol EZR, deactivates the zero-run-mode at 66 and continues via 56 with the next magnitude bit of the current row of matrix 32 in row direction 36. In case of the zero mode being deactivated and the currently traversed magnitude bit being one as indicated by the sequence of yes paths of checks 52 and 62, symbol CZR is output at 68 and the profile coding continues at 56 with the next magnitude bit of the current row along row direction 36. At checks 52, 50 and 62, it is respectively checked whether the currently traversed magnitude bit is zero and the same applies to all following magnitude bits of the current row in row direction 36, such as is true for example with respect to magnitude bit in bit plane n−3 of coefficient $f_5$ in FIG. 1. If this check 70 is confirmed, symbol EOP is output 72 and the profile coding continues with the next less significant bit plane as indicated at 74, namely the magnitude bit of the same spectral coefficient as the currently traversed magnitude bit for which the EOP has been output at 72. If EOP has not been output, the checks 52, 50 and 62 are performed as previously described.

While profile 44 may be possibly encoded in this manner with using, for instance, a variable length code in order to code the symbols output thereby, encoder 12 may alternatively use another approach. For instance, the aforementioned symbols of Table 1 could be coded using arithmetic coding. In FIG. 19, the portion of data stream 30 into which the first magnitude bits 46 forming profile 44 are coded, is indicated using reference sign 76. Owing to the traversal of profile 44 from higher to lower significance and lower to higher frequency coefficients, with coding the profile by appropriately coding symbols into data stream 30, the size of data portion 76 monotonically grows bit plane by bit plane. It is even possible for encoder 12 to compute the amount of data in data portion 76 spent in order to code profile 44 up to a certain bit plane. It should be noted that the continuous increase of the amount of data in data portion 76 from bit plane to bit plane and the ability to compute the amount may be left off. For instance, in the subsequently explained alternative where encoder 12 conforms to the first aspect, data portion 76 having encoded thereinto profile 44 may precede another data portion 78 having the second magnitude bits 48 encoded thereinto, and accordingly, it is possible for encoder 12 and as well as the decoder to compute a remaining available data consumption or amount for data portion 78 after having coded/decoded data portion 76. The just mentioned data amount may be the one available, by bit rate control, for instance, for transform block 14, or for a whole transform block group to which transform block 14 belongs. Additionally, it should be taken into account that profile 44 may either be ceased upon encountering a certain first predetermined bit plane corresponding to the least significant completely coded bit plane of transform block 14, or profile 44 may be coded completely until the least significant bit plane of matrix 32 or the last coefficient in scan order 40, inevitably, i.e. irrespective of any available data rate for transform block 14, so that the decoder is able to detect the end of data portion 76 and, after having decoded data portion 76, its size. Alternatively, some coding profile ending symbol may be used in order to signal the ceasing of the coding of profile 44 from encoder 12 to the decoder within bit stream 30. Such a symbol is not depicted in FIG. 19, but could form the end of data portion 76. Finally, it should be noted that although FIG. 19 indicates that data portions 76 and 78 are coded into the data stream 30 in a non-interleaved manner with the first magnitude bits being coded into data stream 30 in advance of second magnitude bits 78 of transform block 14, this may be different in case of encoder 12 not conforming with respect to the first aspect of the present application, but with any of the second to fourth aspects of the present application.

As to the second magnitude bits 48, it has already been taught above that the magnitude bits 48 may be coded into data portion 78 of data stream 30 using a compression ratio of one, i.e.

for each magnitude bit 48 one bit is written into data stream 30. For instance, the second magnitude bits 48 may be written into the data stream as they are, i.e. in a plane manner. Moreover, the second magnitude bits 48 may be coded into data portion 78 in a non-interleaved manner with respect to their membership to spectral coefficients 16. For instance, magnitude bits 48 of transform block 14 belonging to one coefficient 16 may be coded into data portion 78 immediately consecutively. Second magnitude bits 78 belonging to different coefficients 16 would then not be interleaved within data stream 30. An interleaving could also be left off between coefficients of different transform blocks 14.

The description of the encoder of FIG. 19 is briefly interrupted in order to describe a corresponding decoder with respect to FIG. 20. FIG. 20 shows a decoder 80 configured to decode from data stream 30 transform block 14. Just as the encoder 12 of FIG. 19 does, decoder 80 decodes the coefficients 16 of block 14 in magnitude bit representation, and especially with internally assuming the magnitude bits to be arranged in matrix 32. Whether or not decoder 80 outputs the magnitude bits 34 of coefficients 16 in the form of matrix 32 or re-sorted to form a two-dimensional array of coefficients 16 as depicted in 14 is not important.

The decoder 80 is configured to decode the first magnitude bits 46 forming profile 44 and to decode the second magnitude bits 48 residing in matrix 32 at a lower significance side of profile 44, i.e. "behind" profile 44 when seen along the significance direction 42, or ones hit by the profile when the latter is projected along matrix column direction 42.

The details set out above with respect to the encoder of FIG. 19 with respect to matrix 32, transform block 14 and the correspondence between transform block 14 and the sample block 18 are valid with respect to the description of decoder 80 of FIG. 20 as well. This also pertains to the way the first magnitude bits 46 and the way the second magnitude bits 48 may be coded into data stream 30 as it directly translates into the respective ways decoder 80 may decode same from data stream 30. When using the sequential and symbolized manner of coding profile 44 into data stream 30, for instance, decoder 80 may act as depicted in FIG. 21. Decoder 80 would read the next symbol from data stream 30 at 82. As described before, the symbols described in profile 44 would be contained within data portion or data section 76 in data stream 30. If a check whether the symbol read is an EOP is answered by yes, decoder 80 knows that the currently traversed magnitude bit and the subsequent ones of the current row, i.e. the row within which the currently traversed magnitude bit resides, in row direction 36, are zero. Same do not belong to profile 44. Decoder 80 may have preset all magnitude bits of matrix 32 to zero. Otherwise, decoder may set them to zero at this occasion. Upon having recognized the EOP, decoder 80 steps to the next lower significance bit plane at 86 and returns to step 82 reading the next symbol. In case of the current symbol not being an EOP, decoder 80 checks 88 whether the zero-run-mode is active or not. If yes, decoder 80 checks at 90 whether the currently read symbol is a CZR or EZR and in case of the zero-run-mode being deactivated, decoder 80 checks whether the currently read symbol is an SZR or OME symbol. In case of the currently read symbol being an EZR or ONE, decoder 80 sets the currently traversed magnitude bit to one at 94 and 96, respectively, with setting, or leaving, zero the currently traversed magnitude bit in case of the currently read symbol being CZR or SZR. In case of FIG. 21, a presetting of the bits to zero has been assumed, thereby not showing any action for zero bits. In case of an EZR, decoder 80 deactivates the zero-run-mode at 98 and in case of an SZR, decoder 80 activates the zero-run-mode at 100. Upon detecting any of CZR, EZR, SZR, or ONE, decoder 80 finally steps to the next magnitude bit in the current row at 102 and the profile decoding is resumed with reading the next symbol at 82. All magnitude bits for which any of symbols CZR, EZR, SZR and ONE are contained in the data stream, i.e. is coded into the data stream or decoded from the data stream, forms one of the first magnitude bits 46 and is, thus, a member of profile 44.

However, as already indicated above, a different sort of coding/decoding of the profile magnitude bits 46 may be used. As far as the second magnitude bits 48 are concerned, the same is true. That is, decoder 80 may, in a plane manner, read the second magnitude bits 48 from data stream 30 and may, in this regard, read the magnitude bits 48 from the data stream in an non-interleaved manner with respect to the membership to transform coefficients 16, but alternatives would be available as well.

After having described the encoder of FIG. 19 and a corresponding decoder of FIG. 20 rather generally, same are described in more detail below. The description first of all relates to the case of implementing the encoder of FIG. 19 and the decoder of FIG. 20 in compliance with the first aspect of the present application. However, later on reference is made to FIGS. 19 and 20 again, but describing the encoder and decoder of FIGS. 19 and 20 in a manner complying with the second aspect of the present application, third aspect of the present application and fourth aspect of the present application, respectively. It should be noted that the encoder of FIG. 19 and the decoder of FIG. 20 could be implemented so as to comply with any combination of the first to fourth aspects of the present application, with this also being exemplified below.

In accordance with a first aspect of the present application, encoder 12 codes the first magnitude bits 46 into data stream 30 prior to, and in a non-interleaved manner to, the second magnitude bits 48, and likewise decoder 80 decodes the first magnitude bits 46 from the data stream 30 prior to, and in a non-interleaved manner relative to, the second magnitude bits 48 from data stream 30. As a result, the corresponding data sections or data portions 46 and 78 of data stream 30 do not interleave and are accordingly illustrated in a corresponding manner in FIGS. 19 and 20.

An example of a mode of operation of encoder 12 and decoder 80 when corresponding to the first aspect of the present application is explained below with respects to FIGS. 22a and 22b. FIG. 22a illustrates the steps performed by encoder 12 in coding transform block 14 and FIG. 22b indicates the corresponding mode of operation of decoder 80 in decoding transform block 14 from data stream 30.

Both tasks, i.e. the coding task of encoder 12 and the decoding task of decoder 80, start with obtaining a data rate target at step 110 and 112, respectively, or in alternative terms, a data amount, data consumption or bit budget reserved in the data stream 30 for the transform block or a transform block group to which the transform block belongs. Step 110 at the encoder side may involve encoder 12 receiving a data amount target from, for example, a rate control such as the rate control depicted in FIG. 3. The data amount target may indicate an available data amount for coding transform block 14 individually or for coding a transform block group 28 including transform block 14. The data amount target may be given in the form of a fixed data amount which may not be exceeded and may not be succeeded. Alternatively, the data amount target may be given in a form of a maximum data amount available from which the actually and finally consumed data amount for coding the corresponding data, i.e. transform block or transform block group, may deviate by a certain amount. In another alternative, the data amount target may be given in the form of an interval of allowed data amounts for the corresponding data, i.e. transform block or transform block group. The data amount target may be determined or computed in a manner uniquely depending on the data amount spent for, or consumed by, the previously coded portion of data stream 30. Alternatively, some signalization may be contained within data stream 30, which allows a determination of the data amount target. By the decoder based thereon. For further details, see, for example, sections 2.2.1 and 2.2.2, 2.3 and 2.3.1 as well as 2.3.2. Accordingly, the corresponding step of obtaining the data amount target at the decoder side, 112, may involve determining this data amount target on the basis of the just mentioned signalization or on the basis of the data amount of a previously decoded portion of data stream 30. That is, as an outcome of steps 110 and 112, encoder and decoder know how much data may be spent within data stream 30 for coding transform block 14 or the corresponding transform block group.

This knowledge may be used or may not be used in the subsequent step of coding the first magnitude bits 114 at the encoder side and decoding the first magnitude bits 116 at the decoder side. For example, the codec may be designed such that the data amount target suffices inevitably to completely code profile 44 down to the least significance bit plane, i.e. bit plane zero in FIGS. 1 and 9, into data stream 30. At least after steps 114 and 116 it would thus be clear for the encoder and decoder which amount of data has been consumed by coding the first magnitude bits. It would thus be clear for encoder and decoder how much data is available in data stream 30 for the subsequent coding 118 of the second magnitude bits and the subsequent decoding of the second magnitude bits 120 at the decoder side, namely by taking the data amount target and the data amount already consumed for coding the first magnitude bits, or decoding the first magnitude bits, into account. For example, as an outcome of knowing the amount of data consumed by data section 76, i.e. the first magnitude bits coded into data stream 30, encoder and decoder 110 and 112 may determine a least significant non-fractional bit plane (first predetermined bit plane) so that all magnitude bits confined by profile on the one hand, and this least significant non-fractional bit plane on the other hand, are able to be encompassed by data portion 78 containing the second magnitude bits without compromising the data amount target. Some "remainder data amount" beyond the data amount resulting from coding the second magnitude bits till the least significant non-fractional bit plane could be determined on encoder and decoder in a predetermined manner, known to both encoder and decoder. In this manner, the second magnitude bits to be coded in step 118 or decoded in step 120 could be identified in the encoder and decoder so as to end up in the same identified set of second magnitude bits. The thus identified second magnitude bits could be coded and decoded coefficient-wise as already denoted above, thereby resulting in an implementation complexity reduction. However, another order among the identified coefficients may be used as well. Moreover, some remaining, not consumed data amount may be used to include magnitude bits into the identified second magnitude bits, which lie in a next less significant fractional bit plane.

Alternatively, the data amount target is taken into account when performing coding/decoding 114/116 of the first magnitude bits in the sense that the data rate target controls when to stop coding the profile 44. In other words, the data rate target may also be used in steps 114/116 to determine or identify the first magnitude bits until which same are coded into, or decoded from, the data stream such as, for instance, along the direction generally pointing along directions 36 and 42, respectively. As described above, the encoder could determine for each bit plane how much data would have to spent for coding the second magnitude bits completely within the respective bit plane in addition to coding the profile completely with respect to this bit plane, and accordingly encoder 12 is able to choose the least significant non-fractional bit plane till which it is feasible to code both the first magnitude bits and the second magnitude bits into the data stream 30 while complying with the data rate target. The decoder may determine at each transition from one bit plane to the next in decoding the profile bits, as to when the lest significant non-fractional bit plane has been reached. Again, potential remaining data amount still complying with the data rate target may distributed onto additional second magnitude bits below the least significant non-fractional bit plane. Further, the second magnitude bits thus identified at the encoder and decoder may be coded/decoded columnwise, i.e. without interleaving magnitude bits of different spectral coefficients.

The concept presented in section 2 represents an example for the process described with respect to FIGS. 22a and 22b.

Before proceeding with describing implementation of encoder 12 of FIG. 19 and decoder 80 of FIG. 20 corresponding to, or complying with, any of the other aspects of the present application, it is noted for completeness that the encoder and decoder could both be designed to restrict the coding of the magnitude bits of the transform block, separated into first and second magnitude bits, to a subset of all transform coefficients of transform block 14. For instance, the first, such as the DC coefficient, in scan order 40, or a number of leading spectral coefficients including the DC coefficient along the scan order 40, could be coded separately while restricting the separate coding in the form of profile and enveloped magnitude bits to a set comprising the remaining coefficients.

In accordance with the second aspect of the present application, encoder 12 is configured to determine, in the manner described above with respect to the first steps in FIGS. 22a and 22b, for instance, a first predetermined bit plane, which may be the least significant non-fractional bit plane, among the bit planes of the spectral coefficients with signaling information revealing the first predetermined bit plane in the data stream or performing the determination uniquely depending on an amount of data consumed by a previously coded portion of the data stream, wherein the second magnitude bits are identified out of the magnitude bits of the spectral coefficients using this first predetermined bit plane. Likewise, decoder 80 determines the first predetermined bit plane by deriving same from information signaled in data stream 30, or by performing the determination uniquely depending on the amount of data consumed by a previously decoded portion of the data stream, wherein the second magnitude bits are identified out of the magnitude bits of the spectral coefficients using this predetermined bit plane. The previously coded/decoded portion may, for instance, relate to previously coded transform blocks of the same image or picture 26 to which transform block 14 belongs.

As it turns out from the description brought forward above with respect to an implementation of encoder and decoder FIGS. 19 and 20 in accordance with the first aspect of the present application, this previously described implementation coinciding with the first aspect of the present application as described with respect to FIGS. 22*a* and 22*b* may form an example complying with the second aspect of the present application, too. However, encoder and decoder implementations of FIGS. 19 and 20 complying with the second aspect of the present application do not necessarily need to code first and second magnitude bits one after the other without interleaving. In other words, sections 76 and 78 of FIGS. 19 and 20 may, in accordance with an alternative implementation of the encoder and decoder complying with the second aspect of the present application, be interleaved with one another. In order to explain this in more detail, reference is made to FIGS. 23*a* and 23*c* showing the mode of operation of the encoder and decoder of FIGS. 19 and 20 in accordance with an exemplary implementation complying with the second aspect.

As shown in FIG. 23*a* for the encoder 12, and in FIG. 23*b* for the decoder 80, the coding/decoding of the transform block starts with obtaining a predetermined bit plane in step 130 and 132, respectively. This step corresponds to steps 110 and 112, here specifically resulting in an indication of the predetermined bit plane which could be called, as denoted above, a least significant non-fractional, i.e. completely coded (and then decoded), bit plane. However, the coding/decoding of the first and second magnitude bits is interleaved in that first and second magnitude bits relating to a certain coefficient are coded/decoded before coding/decoding the first and second magnitude bits relating to a next coefficient in scan order. Such interleaving has been, for example, used in the concept taught in section 3. That is, the encoder codes in step 134 the first magnitude bit of a current spectral coefficient followed by coding 136 the second magnitude bits of the current coefficient. In between, encoder identifies 135 the second magnitude bits to be coded for the current coefficient on the basis of the predetermined bit plane. For example, encoder identifies in step 134 all magnitude bits of the current coefficient between its profile bit coded in step 134 and the predetermined bit plane. The identified second magnitude bits are then coded in step 136. The decoder acts the same as shown in FIG. 23*b*: the first magnitude bit of the current coefficient is decoded in step 138, whereupon in step 139 the second magnitude bits of the current coefficient to be decoded are identified in step 139 on the basis of the predetermined bit plane, namely all magnitude bits between profile and predetermined bit plane, whereupon the thus identified second magnitude bits are decoded from the data stream from the current coefficient in step 140. Thereinafter, encoder and decoder check whether a certain available data amount reserved for the current transform block 14 in the data stream has been reached in steps 142 and 144, respectively, and as long as this check does not indicate that the data amount has already been consumed, the coding/decoding proceeds with the next coefficient (compare steps 146 and 148, respectively). Although it is not explicitly stated, it is clear that in steps 134 and 138 encoder and decoder respectively continuously check whether the predetermined bit plane is reached so as to stop coding/decoding the profile at a certain coefficient along with not further coding/decoding the corresponding second magnitude bits of this coefficient.

Again, it is clear that FIGS. 23*a* and 23*b* were merely examples for a (further) implementation of an encoder and decoder corresponding to the second aspect of the present application. In an alternative embodiment, an encoder and a decoder complying with the second aspect also complies with the first aspect so as to code the first magnitude bits before coding the second magnitude bits. In that case, the bit consumption associate with coding the first and second magnitude bits associated with a certain bit plane may be more easily forecast and accordingly, the cyclic check 142 and 144, respectively, may be left off completely.

The statement performed with respect to the first aspect, according to which the coding of the first and second magnitude bits may be restricted to a certain subset of the coefficients of block 14, such as all but the DC coefficient and/or all but a subset of lowest frequency coefficients in scan order, is applicable to implementations of encoder and decoder corresponding to the second aspect of the present application as well.

Similar statements performed above with respect to the second aspect of the present application or, to be more precise, when starting the description of implementations of the encoder and decoder of FIGS. 19 and 20 complying with the second aspect of the present application, are true with respect to implementations of the encoder and decoder of FIGS. 19 and 20 complying with the third aspect of the present application, described below. That is, encoders and decoders complying with the third aspect of the present application described below may or may not use the non-interleaving coding concept between first and second magnitude bits in accordance with a first aspect of the present application, and may or may not involve the identification of second magnitude bits via a determined predetermined bit plane at en/decoder in accordance with the second aspect of the present application.

In order to examples of implementations of the encoder and decoder of FIGS. 19 and 20 complying with the third aspect of the present application, reference is made to FIG. 24 showing an example of a matrix 32. The matrix specifically highlights the left-most column in matrix 32, comprising the magnitude bits of the DC coefficient. As already indicated above, the spread of DC coefficients' most significant non-zero bits, i.e. their spread with respect to the bit claim within which their most significant non-zero magnitude bit result, is larger than compared to subsequent AC coefficients. Accordingly, although it would be possible to signal within the data stream for a certain transform block group as to which most significant bit planes are zero for all transform blocks within the transform block group, in order to thereby save coding amount in order to code the first and second magnitude bits of the corresponding transform blocks, it is more efficient, and accordingly practiced in accordance with the third aspect, to signal "beyond profile" bit planes for the transform block group with respect to the AC coefficients only and to treat the DC coefficient or the set of lowest frequency coefficients separately. In FIG. 24, for instance, such beyond profile bit planes of a transform block group have been illustratively marked using hatching. These beyond profile bit planes 150 do not restrict, or do not relate to, a set 152 of one or more lowest frequency coefficients which, in the example of FIG. 24, merely comprises the DC coefficient. Rather, the values of coefficients within set 152 are coded extra in addition to the first and second magnitude coefficients 46 and 48 the coding of which is restricted to the submatrix containing the magnitude bits 34 of coefficients within the set 159 residing in the bit planes except for, or positioned at the lower significance side of, bit planes 150. The coding of the latter values of coefficients in set 152 takes place in such manner that their magnitude bits in bit planes within the beyond profile bit planes 150, such as magnitude bit 154, are taken into account. For illustration purposes, profile magnitude bits 46 are shown in a cross-hatched manner, while enveloped magnitude bits 48 are illustrated using a circle.

This means that all the above described embodiments may be used to code the first and second magnitude bits, i.e. the profile magnitude bits 46 and enveloped magnitude bits 48, with merely restricting the coding to the sub array of matrix 32 relating to bit planes other than bit planes 150 and to coefficients of set 158. The first and second magnitude bits 46 and 48 merely lie within this sub array. The coding of the value of any coefficients within set 152 may take place before in coding order, the same applying to decoding.

Taking into accounts bits 154 in coding the value of a coefficient in set 154 mans the following. For example, on a per coefficient basis, VLC coding may be used for coding the value and decoding the value. A predetermined spectral coefficient of the set 152 is, for example, coded by the encoder by mapping a value of the predetermined spectral coefficient, as represented by at least a subset of the magnitude bits of this predetermined spectral coefficient, which includes at least one magnitudes bit lying in bit planes 150, onto a variable length code 160 and writing the variable length code 160 into the data stream 30. For example, the value of this coefficient in set 152, is determined by the sequence 162 of magnitude bits from some most significant bit plane 164 among coefficients within set 152 within a certain set of transform blocks, to a least significant bit plane 166. In other words, the just-mentioned most significant bit plane 164 of bit sequence 162 may be signaled in the data stream 30 for a set of transform blocks which, for instance, covers all transform blocks of an image, is a the transform block group relating to the signalization of the least significant non-fractional bit plane, or is the transform block group, for which plane 156 is signaled in the data stream 30, i.e. the group of transform blocks relating to group 28. The latter groups may all be the same. Alternatively, the most significant bit plane 164 may be the most significant bit plane of all bit planes irrespective of the values of coefficients, i.e. bit plane n−1 in nomenclature of FIG. 9, for instance. The just-mentioned least significant bit plane 166 may be the least significant non-fractional bit plane, the least significant bit plane of matrix 32, i.e. bit plane 0, or, depending on the amount of data remaining for coding a fractional bit plane, the bit plane next less significant than the least significant non-fractional bit plane, for example. This corresponds to VLC coding the values of coefficients within set 152 in a version quantized according to leaving away magnitude bits below the just-mentioned least significant bit plane 166. The decoder reverses the VLC coding, i.e. performs VLC decoding. Naturally, a different approach may be applied as well.

That is, in accordance with the third aspect of the present application, the encoder signals in the data stream a second predetermined bit claim, such as the most significant non "beyond profile" bit plane indicated 156 in FIG. 24 for a transform block group such as 28 in FIG. 19, and restricts the coding of the first magnitude bits to planes not more significant than the signaled predetermined bit plane 156. The same applies with respect to the second magnitude bits 48. The one or more coefficients within set 152 are coded separately. For these coefficients, a variable length code may, for instance, be used which maps the value of the respective coefficient onto a variable length code. This mapping may take into account all magnitude bits up to the most significant bit plane of each coefficient in set 152, or up to a predetermined maximum bit plane which may, in turn, be signaled for the same transform block group 28 or another one or for transform block 14 individually.

An alternative is illustrated in FIG. 24B. Exemplarily, again, merely the sequence 162 of magnitude bits from some most significant bit plane 164 among coefficients within set 152 within a certain set of transform blocks, to a least significant bit plane 166 is coded. In other words, the just-mentioned most significant bit plane 164 of bit sequence 162 may be signaled in the data stream 30 for a set of transform blocks which, for instance, covers all transform blocks of an image, is a the transform block group relating to the signalization of the least significant non-fractional bit plane, or is the transform block group, for which plane 156 is signaled in the data stream 30, i.e. the group of transform blocks relating to group 28. The latter groups may all be the same. Alternatively, the most significant bit plane 164 may be the most significant bit plane of all bit planes irrespective of the values of coefficients, i.e. bit plane n−1 in nomenclature of FIG. 9, for instance. The just-mentioned least significant bit plane 166 may be the least significant non-fractional bit plane, the least significant bit plane of matrix 32, i.e. bit plane 0, or, depending on the amount of data remaining for coding a fractional bit plane, the bit plane next less significant than the least significant non-fractional bit plane, for example. However, VLC coding is merely applied to code into the data stream 30, by way of code 160, the number of leading (most significant) zero magnitude bits within sequence 162. The possible values of this count illustrated using arrow 167 is the difference between plane number of bit planes 156 and 164 plus 1, as the most significant non-zero magnitude bit of a certain coefficient within set 152 may lie within any of planes 150 or in even less significant planes. A truncated unary code may be used to this end. The remaining magnitude bits of sequence 162, i.e. those within planes beneath the most significant magnitude bit of sequence 162 as indicated by count 167 starting from plane 164, or, if none of the magnitude bits within planes 150 is non-zero, beneath (in terms of significance) planes 150, may be coded into the bit stream in one of the manners taught with respect to the refinement magnitude bits 48, i.e. they may simply be written into the bitstream, up to bit plane 166—along direction 42, for instance. The decoder reverses the VLC coding, i.e. performs VLC decoding, in order to obtain the count 167, sets the indicated magnitude bit of sequence 166 within planes 150 to one, or, if none is indicated to be non-zero, none of the magnitude bits of sequence 166 within planes 150, and decoder, such as reads, the remaining subsequent less significant magnitude bits of sequence 162 from the data stream. Naturally, a different approach may be applied as well For example, the count could be extended till reaching either the most significant magnitude bit of sequence 166 to indicate the count till reaching same from plane 164 onwards, or indicate the all magnitude bits of sequence 162 are zero.

Instead of coding the VLC code directly, prediction, such as spatial prediction from a transform block corresponding to a neighboring sample block, and/or temporal prediction from a transform block corresponding to a spatially collocated sample block of a previously coded image of a video to which both images belong, may be used with restricting VLC coding to the prediction residual, i.e. the prediction of the count 167 with treating the plane written magnitude bits as they are (FIG. 24B) or the prediction of the sequence 162 (FIG. 24A).

A possible implementation involving the aspect of possibly treating with more than one color component, is described above in section 1.8.2.

Finally, the fourth aspect of the present application relates to an implementation of the encoder and decoder of FIGS. 19 and 20, where the encoder and decoder do not necessarily separately code first and second magnitude bits in a non-interleaved manner according to the first aspect, do not necessarily use a determination of a least significant non-fragmented plane according to the second aspect of the present application, and do not necessarily restrict the coding of first and second magnitude bits to a certain fraction the coefficients along the scan order according to the third aspect. Rather, in accordance with the fourth aspect the encoder and decoder achieve increased coding efficiency by the encoder signaling, as depicted in FIG. 25, an information 190 on a selected scan order out of a plurality 192 of scan orders supported by encoder and decoder, to the decoder, with the details of how the encoder may select the scan order having been described above such as, but not exclusively, in section 1.9.

With respect to the third and fourth aspects, it is noted that it may very well be that the first and second magnitude bits may be transmitted within a data stream in a bit plane manner rather than in a coefficient by coefficient manner. A similar statement would also be true for first and second aspects, respectively.

Finally, FIG. 26 shows an image encoder 200 configured to encode a two-dimensional image 26. Same comprises a spectral decomposer 202 configured to spectrally decompose portions 18 into which the two-dimensional image 26 is subdivided, into a plurality of transform blocks and an encoder 12 for coding a transform block of the plurality of transform blocks into data stream 30 according to any of the previously described embodiments complying with any of, or any combination of, the aspects of the present application. Optionally, encoder 200 may comprise a rate control 204. Same may be part of encoder 12 or a separate part of encoder 200. Referring to FIGS. 3 and 13a, the transform block encoder 12 may, for instance, corresponds to block "entropy encoding" only, or may additionally inherit functionality of blocks "Coeff Buffer", "Scan Order Analysis" and "$f^1$ comp" as well as "Block Building". Likewise, FIG. 27 shows a corresponding image decoder 220 configured to decode the two-dimensional image 26 from the data stream and comprising a decoder 80 for decoding the transform blocks from the data stream and a spectral decomposition inverter 222 configured to spectrally compose portions 18 into which the two-dimensional image 26 is subdivided, from the plurality of transform blocks decoded from the data stream 30 by transform block decoder 80. Transform block decoder 80 may by embodied according to any of the previously described embodiments and comply with any of, or any combination of, the aspects of the present application. An optional rate control 204 may also be comprised by decoder 220 or transform block decoder 80, respectively.

Even though the above described embodiments comprise varying specific features, the main components of the encoder and decoder of the embodiments may be mutually applicable to within all embodiments.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] AMBROISE RENAUD; BUYSSCHAERT CHARLES; PELLEGRIN PASCAL; ROUVROY GAEL, "Method and Device for Display Stream Compression", U.S. Pat. No. 9,332,258 BB.
[2] Thomas Richter, Sven Simon, "Comparison of CPU and GPU Based Coding on Low-Complexity Algorithms for Display Signals", Proc. SPIE 8856, Applications of Digital Image Processing XXXVI, September 2013.
[3] Xilinx, "7 Series FPGAs Overview", http://www.xilinx.com/support/documentation/data_sheets/ds180_7Series_Overview.pdf, accessed Oct. 8, 2014.
[4] Joachim Keinert, Thomas Richter, Herbert Thoma, Miguel Angel Martinez del Amor, Sergej Wtjurin, Siegfried Fößel, Christian Scherl, Manuel de Frutos López, Wolfgang Heppner, "Low complexity entropy coder for image/video coding", Patent submission.
[5] AMBROISE RENAUD; BUYSSCHAERT CHARLES; PELLEGRIN PASCAL; ROUVROY GAEL, "Method and Device for Display Stream Compression", U.S. Pat. No. 9,332,258 BB.
[6] AMBROISE RENAUD; BUYSSCHAERT CHARLES; PELLEGRIN PASCAL; ROUVROY GAEL, "Method and Device for display stream compression", EP2773122 A1.
[7] Jean-Baptiste Lorent, "TICO Lightweight Codec Used in IP Networked or in SDI Infrastructure", SMPTE RDD 35:2016.
[8] Toshiaki Kojima, "LLVC—Low Latency Video Codec for Network Transfer", SMPTE RDD 34:2015.
[9] D. A. Huffman, "A method for the construction of minimum-redundancy codes", Proceedings of the I.R.E. September 1952, pp. 1098-1101.
[10] W. B. Pennebaker, J. L. Mitchell, G. G. Langdon and R. B. Arps, "An overview of the basic principles of the Q-Coder adaptive binary arithmetic coder," in IBM Journal of Research and Development, vol. 32, no. 6, pp. 717-726, November 1988.
[11] Solomon W. Golomb, "Run-Length Encodings", IEEE Transactions on Information Theory IT-12 (3). 1966, pp. 399-401.
[12] Elias, Peter (March 1975), "Universal codeword sets and representations of the integers". IEEE Transactions on Information Theory. 21 (2): 194-203. doi:10.1109/tit.1975.1055349

The invention claimed is:

1. A decoder for decoding a transform block from a data stream, comprising a microprocessor:
the microprocessor is configured to,
decode, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and
decode, second magnitude bits of the spectral coefficients residing in the matrix at a lower significance side of the profile,
wherein the decoder is further configured to
determine, a first predetermined bit plane among bit planes of the spectral coefficients with
deriving, the first predetermined bit plane from information signaled in the data stream, or
performing, the determination uniquely depending on an amount of data consumed in the data stream by a previously decoded portion of the data stream; and
identify, the second magnitude bits out of the magnitude bits of the spectral coefficients using the first predetermined bit plane.

2. The decoder according to claim 1, wherein the decoder comprising the microprocessor, is configured to determine the first predetermined bit plane by computing, for each of several bit planes, a data coding consumption associated with coding the first magnitude bits and the second magnitude bits up to the respective bit plane completely, and selecting one of the several bit planes as the first predetermined bit plane by comparison of the data coding consumption for the several bit planes with a data consumption target.

3. The decoder according to claim 2, wherein the decoder comprising the microprocessor is configured to a) derive the data consumption target from information signaled in the data stream, or b) compute the data consumption target uniquely depending on an amount of data consumed in the data stream by a previously decoded portion of the data stream.

4. A decoder for decoding a transform block from a data stream, comprising a microprocessor:
the microprocessor is configured to,
decode, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and
decode, second magnitude bits of the spectral coefficients residing in the matrix at a lower significance side of the profile,
wherein the decoder is further configured to
derive, from a signalization in the data stream a second predetermined bit plane for a transform block group to which the transform block belongs, and which represents spectral decompositions of a group of different portions of a two-dimensional image, and
restrict, the decoding of the first magnitude bits and the decoding of the second magnitude bits to bit planes which are not more significant than the second predetermined bit plane and to spectral coefficients of a first subset of spectral coefficients, and
further decode a second subset of spectral coefficients, at least comprising a DC coefficient, from the data stream, the further decoding revealing magnitude bits of the second subset of spectral coefficients lying in bit planes more significant than the second predetermined bit plane.

5. The decoder according to claim 4, wherein the decoder comprising the microprocessor is configured to,
derive from a signalization in the data stream a third predetermined bit plane for a further transform block group to which the transform block belongs, and which represents spectral decompositions of a further group of different portions of the two-dimensional image, and
perform the decoding of the second subset of spectral coefficients in a manner recovering magnitude bits of the second subset of spectral coefficients lying in bit planes more significant than the second predetermined bit plane, but non-indicative of magnitude bits of the second subset of spectral coefficients lying in bit planes more significant than the third predetermined bit plane.

6. The decoder according to claim 4, wherein the decoder is to decode a predetermined spectral coefficient of the code second subset of spectral coefficients from the data stream by VLC decoding a count of leading zero magnitude bits of the predetermined spectral coefficient from the data stream and decoding less significant magnitude bits of the predetermined spectral coefficient which pertain bit planes less significant than a bit plane determined by the count, from the data stream.

7. A decoder for decoding a transform block from a data stream, comprising a microprocessor:
the microprocessor is configured to,
decode, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and
decode, second magnitude bits of the spectral coefficients residing in the matrix at a lower significance side of the profile,
wherein the decoder is further configured to
decode, a signalization from the data stream which identifies a selected scan order out of a plurality of scan orders, and
use the selected scan order so that the magnitude bits of the spectral coefficients are entered into the matrix with the spectral coefficients of the transform block ordered along the row direction of the matrix in accordance with the selected scan order.

8. A method for decoding a transform block from a data stream, the method comprising the steps of:
decoding, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and
decoding, second magnitude bits of the spectral coefficients residing in the matrix at a lower significance side of the profile,
wherein the method further comprises
determining, a first predetermined bit plane among bit planes of the spectral coefficients with
deriving, the first predetermined bit plane from information signaled in the data stream, or
performing, the determination uniquely depending on an amount of data consumed in the data stream by a previously decoded portion of the data stream; and
identifying, the second magnitude bits out of the magnitude bits of the spectral coefficients using the first predetermined bit plane.

9. A method for decoding a transform block from a data stream, the method comprising the steps of:
decoding, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and
decoding, second magnitude bits of the spectral coefficients residing in the matrix at a lower significance side of the profile,
wherein the method further comprises deriving from a signalization in the data stream a second predetermined bit plane for a transform block group to which the transform block belongs, and which represents spectral decompositions of a group of different portions of a two-dimensional image, and
the decoding of the first magnitude bits and the decoding of the second magnitude bits to bit planes which are not more significant than the second predetermined bit plane and to spectral coefficients of a first subset of spectral coefficients, and
the method further comprises decoding a second subset of spectral coefficients, at least comprising a DC coefficient, from the data stream, the further decoding revealing magnitude bits of the second subset of spectral coefficients lying in bit planes more significant than the second predetermined bit plane.

10. A method for decoding a transform block from a data stream, the method comprising the steps of:

decoding, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and decoding, second magnitude bits of the spectral coefficients residing in the matrix at a lower significance side of the profile, wherein the method further comprises decoding, a signalization from the data stream which identifies a selected scan order out of a plurality of scan orders, and using the selected scan order so that the magnitude bits of the spectral coefficients are entered into the matrix with the spectral coefficients of the transform block ordered along the row direction of the matrix in accordance with the selected scan order.

11. A non-transitory computer storage medium having stored thereon a computer program for performing method steps for, decoding a transform block from a data stream, executing by a microprocessor, comprising:

decoding, from the data stream, a profile leading through a matrix in which magnitude bits of spectral coefficients of the transform block are arranged column-wise with the spectral coefficients of the transform block ordered along a row direction of the matrix, so that the profile indicates, in terms of position and value, first magnitude bits of the spectral coefficients of the transform block and the profile envelopes non-zero magnitude bits of the spectral coefficients in the matrix; and decoding, second magnitude bits of the spectral coefficients residing in the matrix at a lower significance side of the profile, wherein the method further comprises:

determining, a first predetermined bit plane among bit planes of the spectral coefficients with deriving, the first predetermined bit plane from information signaled in the data stream, or performing, the determination uniquely depending on an amount of data consumed in the data stream by a previously decoded portion of the data stream; and identifying, the second magnitude bits out of the magnitude bits of the spectral coefficients using the first predetermined bit plane, when said computer program is run by a computer.

* * * * *

UNITED STATES PATENT AND TRADEMARK OFFICE
CERTIFICATE OF CORRECTION

| | |
|---|---|
| PATENT NO. | : 10,887,610 B2 |
| APPLICATION NO. | : 16/360634 |
| DATED | : January 5, 2021 |
| INVENTOR(S) | : Joachim Keinert et al. |

It is certified that error appears in the above-identified patent and that said Letters Patent is hereby corrected as shown below:

On the Title Page

Column 1, (71) Applicant name incorrectly listed as: Fraunholder-Gesellschaft zur Foerderung der angewandten Forschung e.V.

Please change same to read: Fraunhofer-Gesellschaft zur Foerderung der angewandten Forschung e.V.

Signed and Sealed this
Seventh Day of June, 2022

Katherine Kelly Vidal
*Director of the United States Patent and Trademark Office*